United States Patent
Katagami et al.

(10) Patent No.: US 7,298,435 B2
(45) Date of Patent: Nov. 20, 2007

(54) METHOD OF DEPOSITING LIQUID MATERIAL TO MANUFACTURE COLOR FILTER

(75) Inventors: Satoru Katagami, Hara-mura (JP); Toshihiro Ushiyama, Chino (JP); Hisashi Aruga, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 10/890,516

(22) Filed: Jul. 14, 2004

(65) Prior Publication Data

US 2005/0024599 A1 Feb. 3, 2005

(30) Foreign Application Priority Data

| Jul. 23, 2003 | (JP) | ............................... 2003-278433 |
| Aug. 28, 2003 | (JP) | ............................... 2003-304566 |
| Jun. 3, 2004 | (JP) | ............................... 2004-165776 |

(51) Int. Cl.
  *G02F 1/1335* (2006.01)
  *G03F 1/00* (2006.01)
(52) U.S. Cl. ........................... 349/106; 349/114; 430/7
(58) Field of Classification Search ..................... None
  See application file for complete search history.

(56) References Cited

U.S. PATENT DOCUMENTS

| 6,870,584 | B2 | 3/2005 | Kawase et al. |
| 6,887,631 | B2 | 5/2005 | Kiguchi et al. |
| 2003/0016321 | A1* | 1/2003 | Takizawa .................... 349/113 |
| 2003/0016459 | A1 | 1/2003 | Takizawa et al. |
| 2003/0030767 | A1* | 2/2003 | Takizawa et al. ........... 349/113 |
| 2003/0063239 | A1* | 4/2003 | Suzuki ....................... 349/106 |
| 2005/0063081 | A1 | 3/2005 | Katagami et al. |

FOREIGN PATENT DOCUMENTS

| CN | 1365891 A | 8/2002 |
| CN | 1389745 A | 1/2003 |
| CN | 1397820 A | 2/2003 |
| EP | 1225472 A | 7/2002 |
| JP | 09203803 A * | 8/1997 |
| JP | H09-329706 A | 12/1997 |
| JP | 11-183892 A | 7/1999 |
| JP | H11-194211 A | 7/1999 |
| JP | 2001-033778 A | 2/2001 |
| JP | 2001-066416 A | 3/2001 |
| JP | 2003-121635 | 4/2003 |
| KR | 2003-003078 | 1/2003 |
| KR | 2003-0029631 | 4/2003 |

* cited by examiner

*Primary Examiner*—Andrew Schechter
*Assistant Examiner*—W. Patty Chen
(74) *Attorney, Agent, or Firm*—Global IP Counselors, LLP

(57) ABSTRACT

A color filter 40 has a light-transmissive substrate 2, a reflecting layer 3 formed on the back substrate 2 and provided with openings 4, boundary layers 5 and 21 formed on the reflecting layer 3, and a plurality of coloring layers 6 enclosed by the boundary layers 5 and 21. A transparent coat layer 25 is provided between the reflecting layer 3 and the boundary layers 5 and 21. A step is formed between the openings 4 and the transparent coat layer 25. The coloring layers 6 are formed by applying the droplets 150 of colored fluid to the openings 4 first, and then to the transparent coat layer 25. The difference in color saturation of the color filter 40 in a reflective display mode and a transmissive display mode is reduced. Also, a liquid material is appropriately applied to the color filter 40, to enhance color balance.

4 Claims, 33 Drawing Sheets

METHOD OF DEPOSITING LIQUID MATERIAL TO MANUFACTURE COLOR FILTER

BACKGROUND OF THE INVENTION

1. Field of the Invention

The present invention relates to a color filter that functions both in a reflective display mode and a transmissive display mode, a method of manufacturing such color filter, a method of depositing a liquid material to manufacture such color filter, a display device having such color filter, a method of manufacturing a liquid crystal display device having such color filter, an electro-optic device having such color filter, an electronic instrument having such color filter, and to a method of manufacturing such electronic instrument.

2. Background Information

A liquid crystal display device is known to be equipped with a color filter that functions both as a reflective display by using external light and a transmissive display by using a backlight. When such conventional liquid crystal display device functions as a reflective display, colored light is obtained when the incoming light from outside passes through coloring layers that are provided for color-display purposes. Accordingly, the display is inevitably darkened because the incoming light is partially absorbed by the coloring layers. To prevent this problem, it has been known to provide in portions of the coloring layers colorless openings and reflecting films that correspond to the openings, such that part of the incoming light passes through the openings to be reflected at the reflecting films as colorless light without being absorbed by the coloring layers. By mixing the colorless light with the colored light, it is possible to obtain a brighter display than the case where all incoming light passes through the coloring layers and becomes colored. For example, Japanese Laid-open Patent Application No. H11-183892 (FIG. 1) shows such structure.

A liquid crystal display device is also known to be able to switch between the reflective display mode and the transmissive display mode as needed, as seen in, for example, Japanese Laid-open Patent Application No. 2001-33778 (FIGS. 1 and 2).

However, in the known arrangements described above, in the reflective display mode, the light entering from outside is reflected after passing through the coloring layers and again passes through the coloring layers, thus passing through the coloring layers twice, such that the outputted colored light has enough color saturation. On the other hand, in the transmissive display mode, the light from the light source passes through the coloring layers only once, resulting in different degrees of color saturation in the reflective display mode and the transmissive display mode. More specifically, the colored light in the reflective display mode is perceived as being more saturated. In other words, the display device has a different color balances in the reflective display mode and in the transmissive display mode.

Furthermore, since each coloring layer has a reflective portion and a transmissive portion and the transmissive portion is an opening within the reflective portion, a step portion at the boundary between the reflective portion and the transmissive portion is inevitably formed. When a color filter element is formed on such step portion using an inkjet device or other discharging device, the area near the step portion is sometimes not covered by the color filter material.

In view of the above, it will be apparent to those skilled in the art from this disclosure that there exists a need for an improved a color filter, a method for manufacturing a color filter, a display device having such color filter, a method of discharging a liquid material to manufacture such color filter, an electro-optic device having such color filter, an electronic instrument having such color filter; a method of manufacturing a liquid crystal display device, and a method of manufacturing an electronic instrument, that overcome the problems of the aforementioned known art. This invention addresses this need in the art as well as other needs, which will become apparent to those skilled in the art from this disclosure.

SUMMARY OF THE INVENTION

Therefore, an object of the present invention is to provide a color filter that has good color balances in a reflective display mode and in a transmissive display mode. Such color filter is configured so that a liquid material can be appropriately coated thereon. Another object of the present invention is to provide a manufacturing method for a color filter, a discharging method, a display device, a method for manufacturing a liquid crystal display device, an electro-optic device, an electronic instrument, and a method for manufacturing an electronic instrument.

In the discharging method of the present invention, a liquid material is discharged in a deposit portion having a reflective portion and a transmissive portion. The transmissive portion is concaved from the reflective portion. The discharging method includes discharging the liquid material in the transmissive portion; and discharging the liquid material in the reflective portion after discharging the liquid material in the transmissive portion.

The color filter of another aspect of the present invention is provided with a light-transmissive substrate, a reflecting layer formed on the substrate and provided with openings, a boundary layer formed on the reflecting layer, and a plurality of coloring layers enclosed by the boundary layer. A light-transmissive transparent coat layer is provided between the reflecting layer and the boundary layer.

The color filter of still another aspect of the present invention is provided with a light-transmissive substrate, a reflecting layer formed on the substrate and provided with openings, a boundary layer formed on the reflecting layer, a plurality of coloring layers enclosed by the boundary layer, and a first overcoat layer formed so as to cover the boundary layer and the coloring layers. The surface of the reflecting layer on which the boundary layer is formed has an irregular surface that scatters light, and a second overcoat layer is formed on the first overcoat layer.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. Furthermore, not all of the configurations described in these embodiments are necessarily indispensable as a means of embodying the inventions as defined in the claims. This liquid crystal display device is a low-energy, so-called semi light-transmissive reflecting liquid crystal display device for performing a display function in an optimal display mode, which is selected based on the brightness of the surrounding from a reflective display mode in which external light is collected to display images with reflected light, and a transmissive display mode in which images are displayed with light from a backlight. The liquid crystal display device has a color filter provided with coloring layers for color display.

First Embodiment

Figure 1:
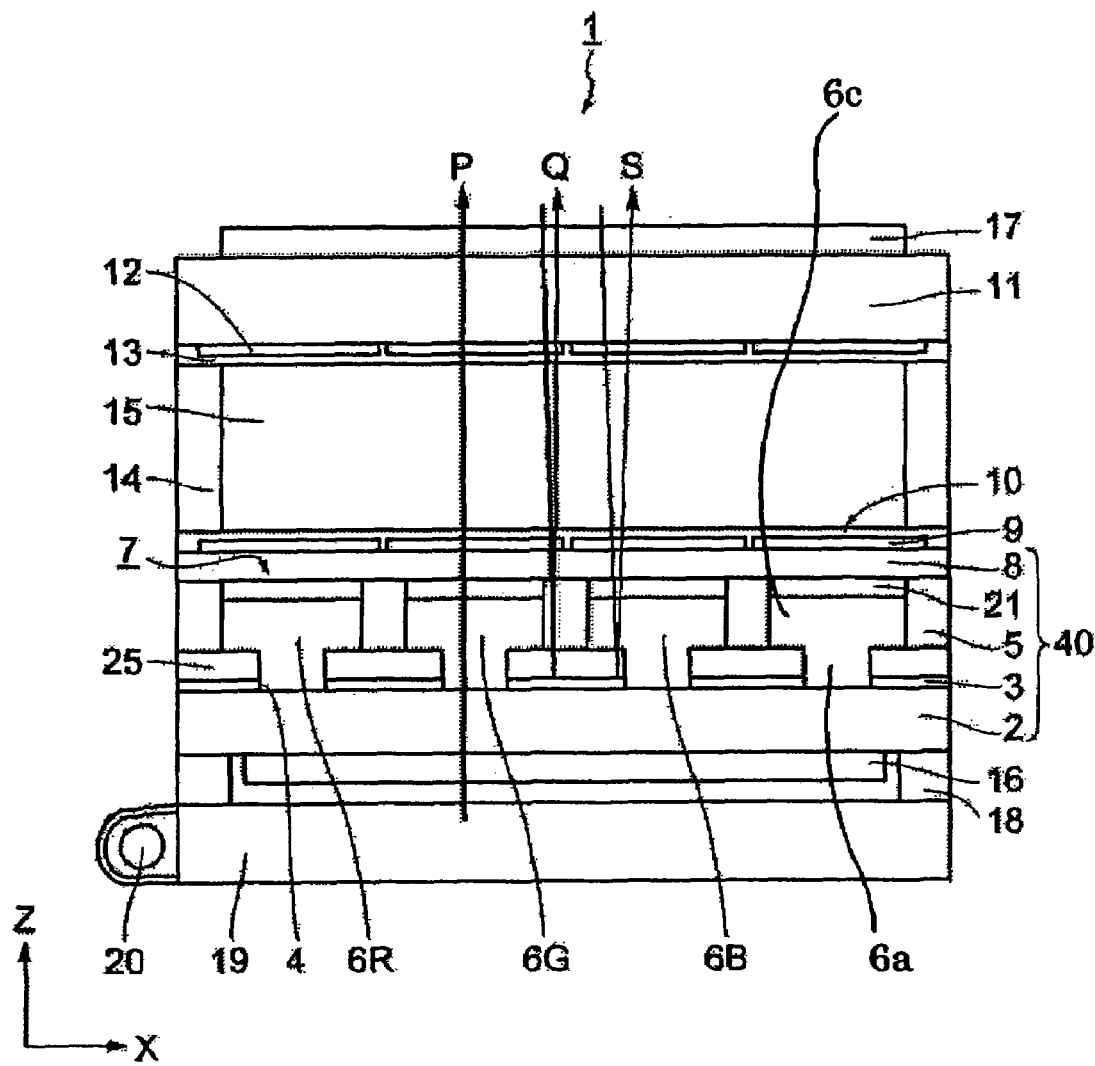
FIG. 1 is a cross-sectional view of the semi light-transmissive reflective display device according to the first embodiment of the present invention.
Figure 2:
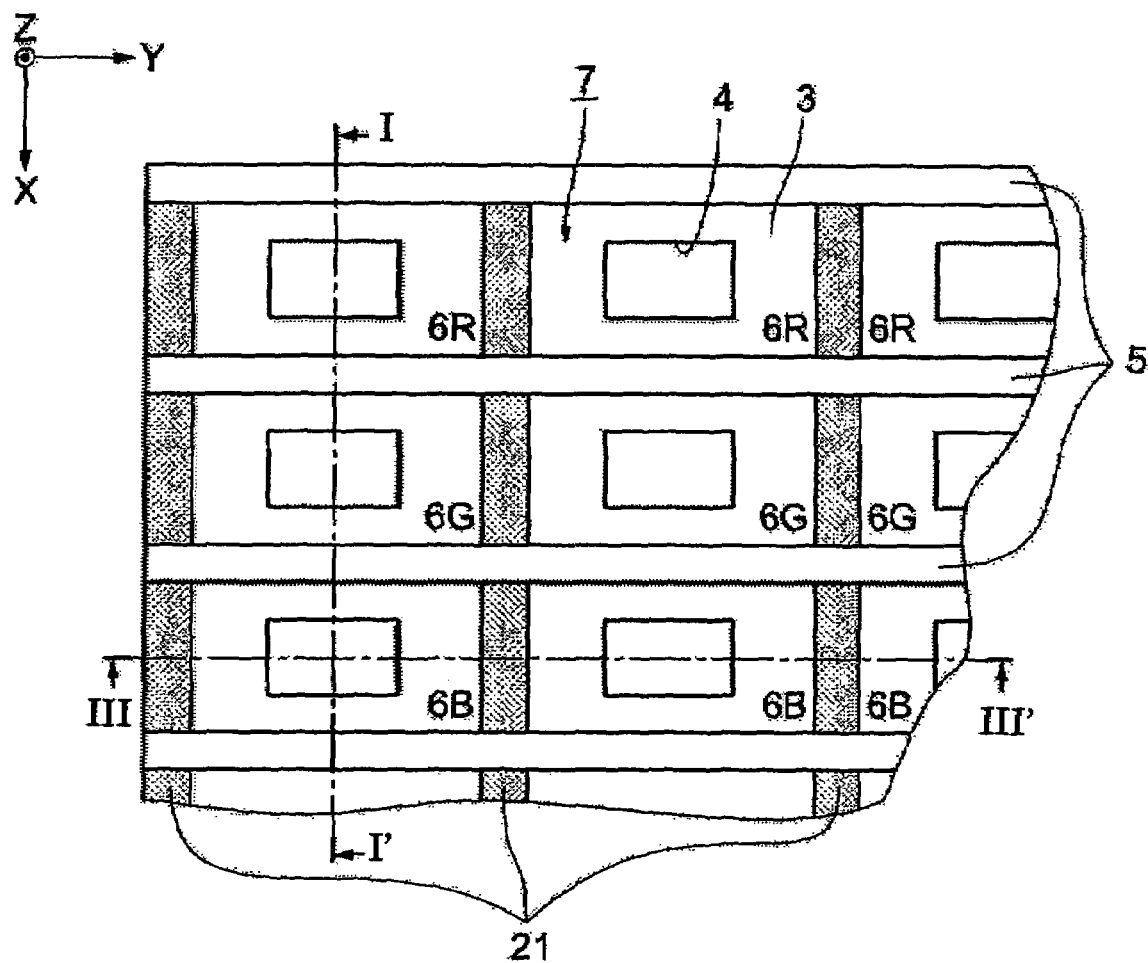
FIG. 2 is a planar view of the boundary layers in the semi light-transmissive reflective display device according to various embodiments of the present invention.
Figure 3:
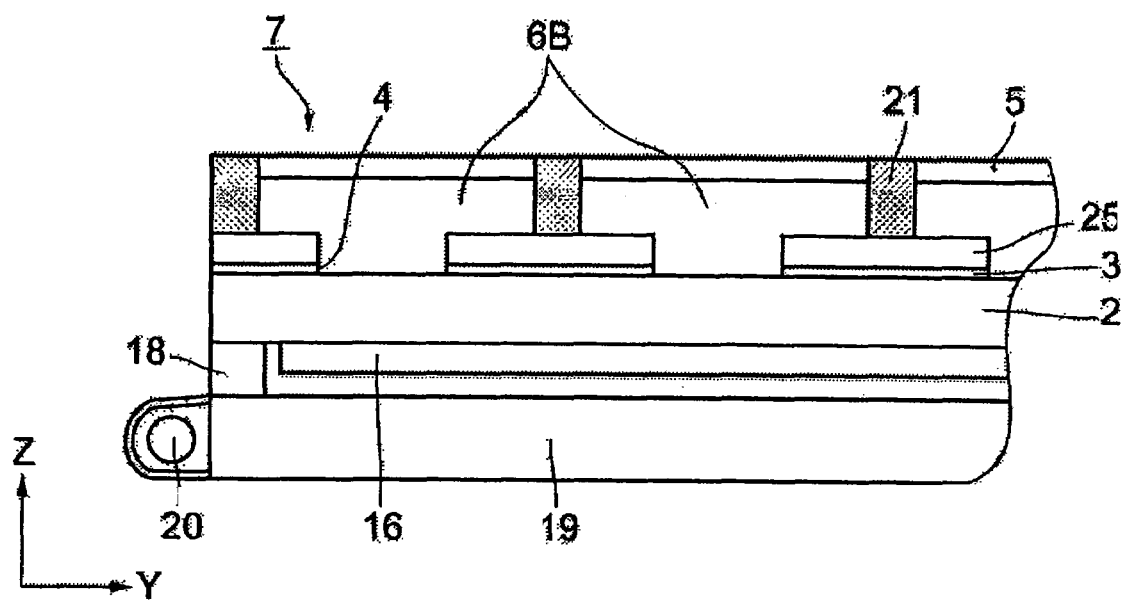
FIG. 3 is an enlarged partial cross-sectional view of the colored boundary layer according to the first embodiment of the present invention.

FIG. 1 is a cross-sectional view of the semi light-transmissive reflecting liquid crystal display device according to the first embodiment of the present invention. In this cross-sectional view, the side of the liquid crystal 15 on which the light source (backlight) 20 is disposed is referred to as the back side, and the opposite side as the front side. The display is usually viewed from the front side. FIG. 2 is a diagram in which the positioning of boundary layers 5 and 21 with the colored layers 6 of the present invention is depicted from the front side. A grid is formed with light-transmissive colorless boundary layers 5 that extend in the direction of the Y-axis at a plurality of locations, and non light-transmissive colored boundary layers 21 that extend at a plurality of locations in the direction of the X-axis, which is orthogonal to the Y-axis. FIG. 1 is a diagram depicting a cross section (I-I') of the colorless boundary layers 5, and FIG. 3 is a diagram depicting a cross section (III-III') of the colored boundary layers 21.

As depicted in FIGS. 1 and 2, the semi light-transmissive reflecting liquid crystal display device 1 includes a light-transmissive back substrate 2 and a front substrate 11 which are disposed facing each other, and a color filter 40 for enabling color display. The color filter 40 includes a reflecting layer 3 that is formed on the front side of the back substrate 2 and has openings 4; a light-transmissive transparent coat layer 25 that is formed on the reflecting layer 3; colorless boundary layers 5 and colored boundary layers 21 that are formed in a grid so as to define the openings 4 above the transparent coat layer 25; a plurality of deposit portions 7 that are defined by the colorless boundary layers 5 and the colored boundary layers 21 to allow a prescribed colored liquid to be deposited by a discharging device described hereinafter; coloring layers 6R, 6G, and 6B that are layers of the colored liquid applied to the deposit portions 7; and an overcoat layer 8 for entirely covering the colorless boundary layer 5, the colored boundary layer 21, and the coloring layers 6R, 6G, and 6B.

The liquid crystal display device 1 further includes pixel electrodes 12 disposed opposite the coloring layers 6R, 6G, and 6B; an orientation film 13 for covering the pixel electrodes 12; and counter electrodes 9 disposed opposite the pixel electrodes 12, and an orientation film 10 for covering the counter electrodes 9. The pixel electrodes 12 and the orientation film 13 are formed on the back side of the front substrate 11, while the counter electrodes 9 and the orientation film 10 are formed on the overcoat layer 8 described above. A seal 14 is formed along the external periphery of the front substrate 11 between the orientation film 10 and the orientation film 13, such that liquid crystal 15 is sealed in the space defined by the seal 14, the orientation film 10, and the orientation film 13. Also provided are a front-face polarizing plate 17 attached to the front side of the front substrate 11, a back-face polarizing plate 16 attached to the back side of the back substrate 2, an optical waveguide plate 19 provided via a buffer 18 so as to cover the entire back side of the back-face polarizing plate 16, and a light source 20 for supplying light to the optical waveguide plate 19.

The coloring layers 6R, 6G, and 6B are arranged in an orderly fashion in a grid, with coloring layers 6 of the same color forming a row in the Y-axis direction. Coloring layers 6R, 6G, and 6B of different colors are lined up in sequence in the X-axis direction. The colorless boundary layers 5 are arranged at borders between coloring layers 6 of differing colors, while the colored boundary layers 21 are arranged at borders between coloring layers 6 of the same color. In other words, the coloring layers 6 are compartmentalized by the boundary layers 5 and 21. Therefore, it is possible to prevent such drawbacks as poor color contrast due to colors overlapping one another, and gaps being formed between the coloring layers 6. Thus, sharp display can be obtained. The colorless boundary layers 5, the counter electrodes 9, the pixel electrodes 12, the orientation films 10 and 13, the overcoat layer 8, and the transparent coat layer 25 are also light-transmissive.

Reflective Display Mode

The reflective display in the semi light-transmissive reflecting liquid crystal display device 1 thus configured will first be described with reference to FIG. 4. Among various lights that enter the front-face polarizing plate 17, only the external lights Q and S that enter the front-face polarizing plate 17 in the transmission direction (transmission axis direction) of the front-face polarizing plate 17 are allowed to pass through, and the lights entering in other directions are absorbed by the front-face polarizing plate 17. The external lights Q and S that passed through the front-face polarizing plate 17 pass through the liquid crystal display device 1 through: the pixel electrodes 12→the orientation film 13→the liquid crystal 15→the orientation film 10→the counter electrodes 9→the overcoat layer 8, in this order. Thereafter, the external light S in this arrangement passes through any one of the coloring layers 6R, 6G, and 6B (the coloring layer 6B in the example of FIG. 1) and reaches the reflecting layer 3 via the transparent coat layer 25, is reflected by the reflecting layer 3 and again passes through the transparent coat layer 25 and the coloring layer 6, becomes a colored light that is colored by the colored layer 6 twice, and exits from the front side of the liquid crystal display device 1 in a reverse order through the pathway through which the external light S entered. On the other hand, the external light Q passes through the colorless boundary layer 5 and the transparent coat layer 25 and reaches the reflecting layer 3 after passing through the counter electrodes 9, is reflected by the reflecting layer 3 and again passes through the transparent coat layer 25 and the colorless boundary layer 5, and exits from the front side of the liquid crystal display device 1 as colorless light, passing through in a reverse direction the pathway through which the external light Q entered.

As the external light S passes through the coloring layer 6, the coloring layer 6 absorbs lights that are included in the external light S and have a wavelength other than that of the color of the coloring layer 6. Accordingly, the brightness of the external light S is reduced as the external light S passes through the coloring layer 6. The brightness of the external light S is reduced further due to the fact that the external light S passes through the coloring layer 6 twice. The brightness tends to be even further reduced if the thickness of the coloring layers 6 is increased in order to increase color saturation. However, because the colorless external light Q passes through the colorless boundary layer 5 without passing through the coloring layers 6, the external light Q exits while preserving its original brightness. Consequently, in order to increase the brightness of the external light S, the external lights Q and S are caused to exit simultaneously from the front. Accordingly, the external lights Q and S in combination maintain the overall brightness of the display. The brightened mixture of the colored light and the colorless light is perceived as colored light by human eyes, since human eyes cannot distinguish colored light from colorless light.

The colorless boundary layers 5 as described above are made of an acrylic resin or an epoxy resin that has good transparency, and are aligned in an orderly fashion at the boundaries of coloring layers 6 of different colors. Accordingly, the overall brightness of the coloring layers 6 is balanced and an easily readable display is obtained. The colored boundary layers 21 formed at the boundaries between colored layers 6 of the same color are black and yield good color contrast. Also, even when a colored liquid is deposited onto the colored boundary layers 21 during the formation of the colored layers 6 by a hereinafter described discharging device, there is no effect on the resulting display. Accordingly, it is possible to deposit the colored liquid in a continuous manner. Both of these boundary layers are usually formed by a dispenser, screen printing, or the like.

The reflecting layer 3 formed on the back substrate 2 is made of a thin film of silver, aluminum, nickel, chrome, or another metal to reflect light. The overcoat layer 8 flattens the irregular surface that was formed during the formation of the colorless boundary layer 5, the colored boundary layer 21, and the coloring layers 6R, 6G, and 6B. In this manner, the overcoat layer 8 facilitates the formation of the counter electrodes 9. The orientation films 10 and 13 cover and protect the counter electrodes 9 and pixel electrodes 12 respectively, and are designed to prevent organic ingredients and the like from exuding into and degrading the liquid crystal 15.

In the liquid crystal 15, the orientation of liquid crystal molecules is varied according to the electric field applied between the counter electrodes 9 and the pixel electrodes 12, which sandwich the liquid crystal 15 from both sides. In this manner, the orientation of the transmitted light can be controlled. Each pair of the counter electrode 9 and the pixel electrode 12 is arranged at positions opposite each of the coloring layers 6R, 6G, and 6B and its bordering colorless boundary layers 5, such that the transmission and blockage of light and the brightness of each color are controlled to depict the prescribed display. Where the counter electrodes overlap with the colorless boundary layers 5, each of adjacent counter electrodes 9 is arranged to cover half the width of each colorless boundary layer 5. Specifically, the transmission, blockage, and the like of the external light Q and S are controlled for each area in which the pair of the counter electrode 9 and pixel electrode 12 is disposed. The external light Q and S also pass through the liquid crystal 15 twice.

Transmissive Display Mode

A brief description of the transmissive display mode will next be given still referring to FIG. 1. In the transmissive display mode, transmission light P emitted from the light source 20 is used instead of the external lights Q and S which are used in the reflective display mode. The transmission light P is guided to the back-face polarizing plate 16 by the optical waveguide plate 19, such that only light in the transmission direction (transmission axis direction) of the back-face polarizing plate 16 is allowed to pass through the back-face polarizing plate 16. The resultant light then passes through the back substrate 2 and enters the coloring layers 6R, 6G, and 6B through the openings 4. The light P that enters the coloring layers 6R, 6G, and 6B is colored in the color of the coloring layer 6 in which the light P entered (green in the example of FIG. 1), and is emitted from the front side passing through: the overcoat layer 8→the counter electrodes 9→the orientation film 10→the liquid crystal 15→the orientation film 13→the pixel electrodes 12→the front substrate 11→the front-face polarizing plate 17, in this order. Usually, the transmission light P passes through the coloring layers 6 and the liquid crystal 15 once. Accordingly, if the external light S that enters the liquid crystal display device 1 from the front face and the transmission light P that enters from the light source 20 are of the same brightness, the transmission light P will be brighter when it exits from the front face. The present invention is designed so that the brightness of the display in the reflective display mode is increased by adding the bright external light Q to the external light S, such that the difference in brightness between the transmissive display mode and the transmissive display mode is extremely small.

In contrast, when there is no transparent coat layer 25, the external light S passes through the coloring layers 6 and is colored twice, while the transmission light P passes through the coloring layer 6 of the same thickness and is colored only once. The thickness of the coloring layers 6 through which the light passes can be considered to be substantially equal to or less than the thickness of the reflecting layer 3, which is a thin metal film having a thickness of 0.2 μm. Since the external light S passes through the coloring layer 6 by a distance that is twice as long as the distance by which the transmissive light P passes, the color saturation of the external light S is proportionately higher than that of the transmissive light. Specifically, when the same color is displayed in the reflective display mode and the transmissive display mode, human eyes can perceive the difference in color saturation. Although the difference in color saturation may be difficult to perceive when the viewer singularly views the display either in the reflective display mode or in the transmissive display mode, the difference in color saturation is more evident when two displays, one in the transmissive display mode and one in the reflective display mode, are viewed together in a darkened environment.

In the arrangement of the present embodiment, the transparent coat layer 25 reduces the distance by which the external light S passes through the coloring layer 6. Accordingly, the difference in the color saturation in the reflective display mode and the transmissive display mode, which is a result of the difference in the number of times the light passes through the coloring layers 6, is cancelled out. Therefore, the liquid crystal display device 1 of the present embodiment has little difference in the brightness of display in the reflective display mode and the transmissive display mode.

More specifically, as depicted in FIGS. 1 and 3, the transparent coat layer 25 is provided between the reflecting layer 3 and the boundary layers 5 and 21, such that portions 6c of the coloring layers 6 above the reflecting layer 3, through which the external light S passes, are made half as thick as portions 6a of the coloring layers 6 through which the transmission light P passes. By this arrangement, the external light S passing twice through the portion 6a of the coloring layers 6 and the transmission light P passing once through the portion 6c of the coloring layers 6 travel the same distance through the coloring layers 6, and colored to the same degree of color saturation. The transparent coat layer 25 is composed of acrylic resin, epoxy resin, or the like having good transparency. The transparent layer 25 is formed on the reflecting layer 3 so as to entirely cover the reflecting layer 3, and is set so that all of the external light Q and S passing through the transparent coat layer 25 is reflected by the reflecting layer 3. Although the transparent coat layer 25 is formed between the reflecting layer 3 and the boundary layers 5 and 21 in the example shown in FIG. 1, the transparent layer 25 can be alternatively formed between the reflecting layer 3 and the back substrate 2.

As described above, by forming the transparent coat layer 25 in the semi light-transmissive reflecting liquid crystal display device 1 as described above, the thickness of the coloring layers 6 in the area above the reflecting layer 3 can be reduced by a factor equivalent to the thickness of the transparent coat layer 25. Specifically, the thickness of the portions 6c of the coloring layers 6 above the reflecting layer 3 becomes thinner than the thickness of the other portions 6a of the coloring layers 6 by a factor equivalent to the thickness of the transparent coat layer 25. Consequently, by adjusting the thickness of this transparent coat layer 25, it is possible to freely adjust the balance between the color saturation in the reflective display mode, in which external light is reflected by the reflecting layer 3 and passes twice through the coloring layers 6, and the color saturation in the transmissive display mode, in which light passes through the coloring layers 6 only once. In the embodiment above, the distance that the external light S and the transmission light P pass through in the coloring layer 6 is made substantially equal, and therefore the color saturation of the colored light can be made substantially equal. By also forming a colorless boundary layer 5 whereby bright, colorless light is obtained, a display device can be provided having good visibility and substantially the same level of brightness in the a reflective display mode and the transmissive display mode.

Also, by providing a light-transmissive boundary layer 5, bright, colorless light can be obtained that does not pass through the coloring layers 6. Accordingly, the brightness in the reflective display mode can be enhanced. The color contrast is also enhanced by the colored boundary layer 21, which is a non light-transmissive boundary layer. Furthermore, by using a discharging device to form the coloring layers 6 that are enclosed by the boundary layers 5 and 21, droplets 150 can be uniformly applied and a boundary layer with uniform coating thickness and coating surface area can be obtained.

Second Embodiment

Figure 4:
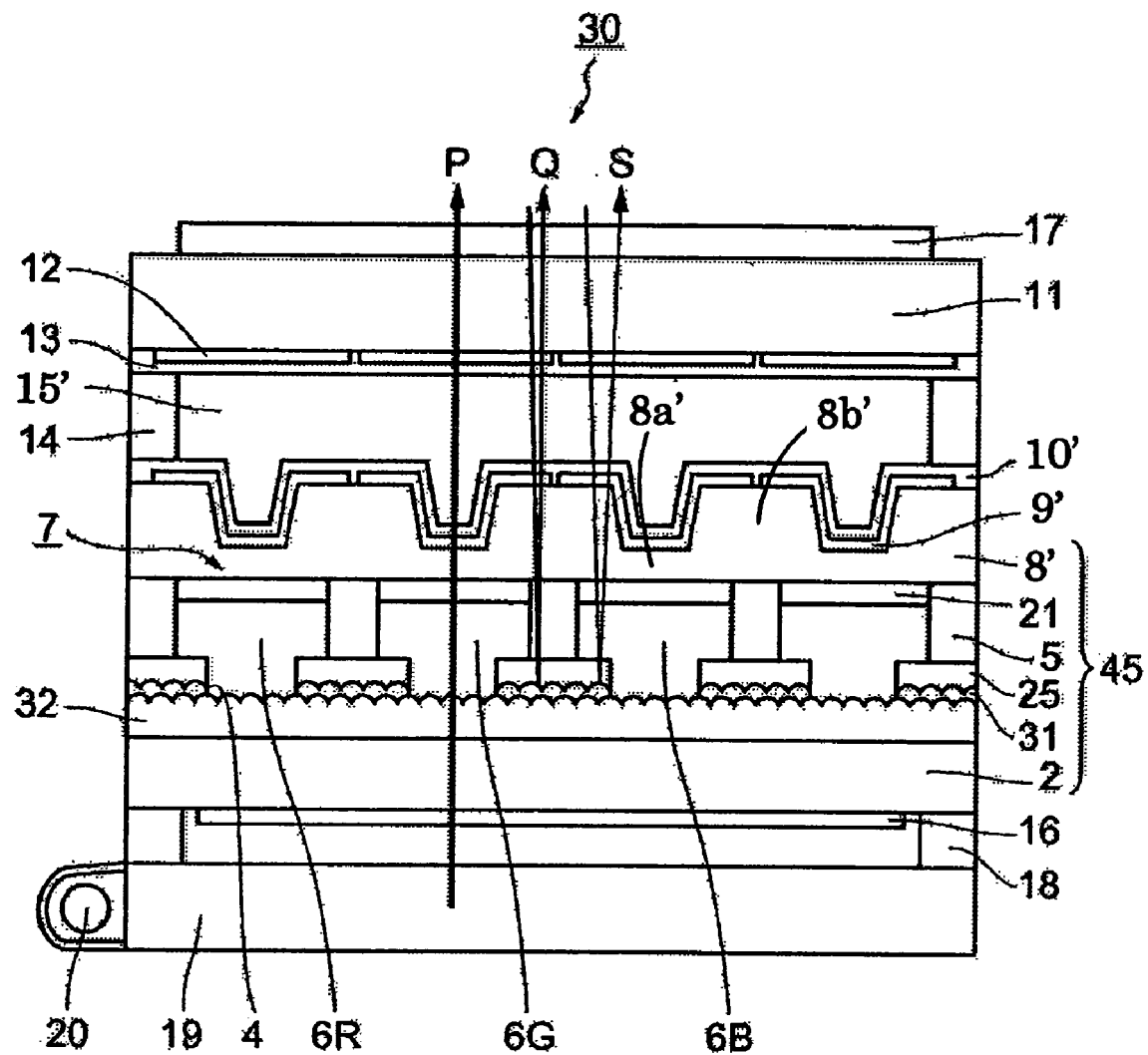
FIG. 4 is a cross-sectional view of the semi light-transmissive reflective display device according to the second embodiment of the present invention.
Figure 5:
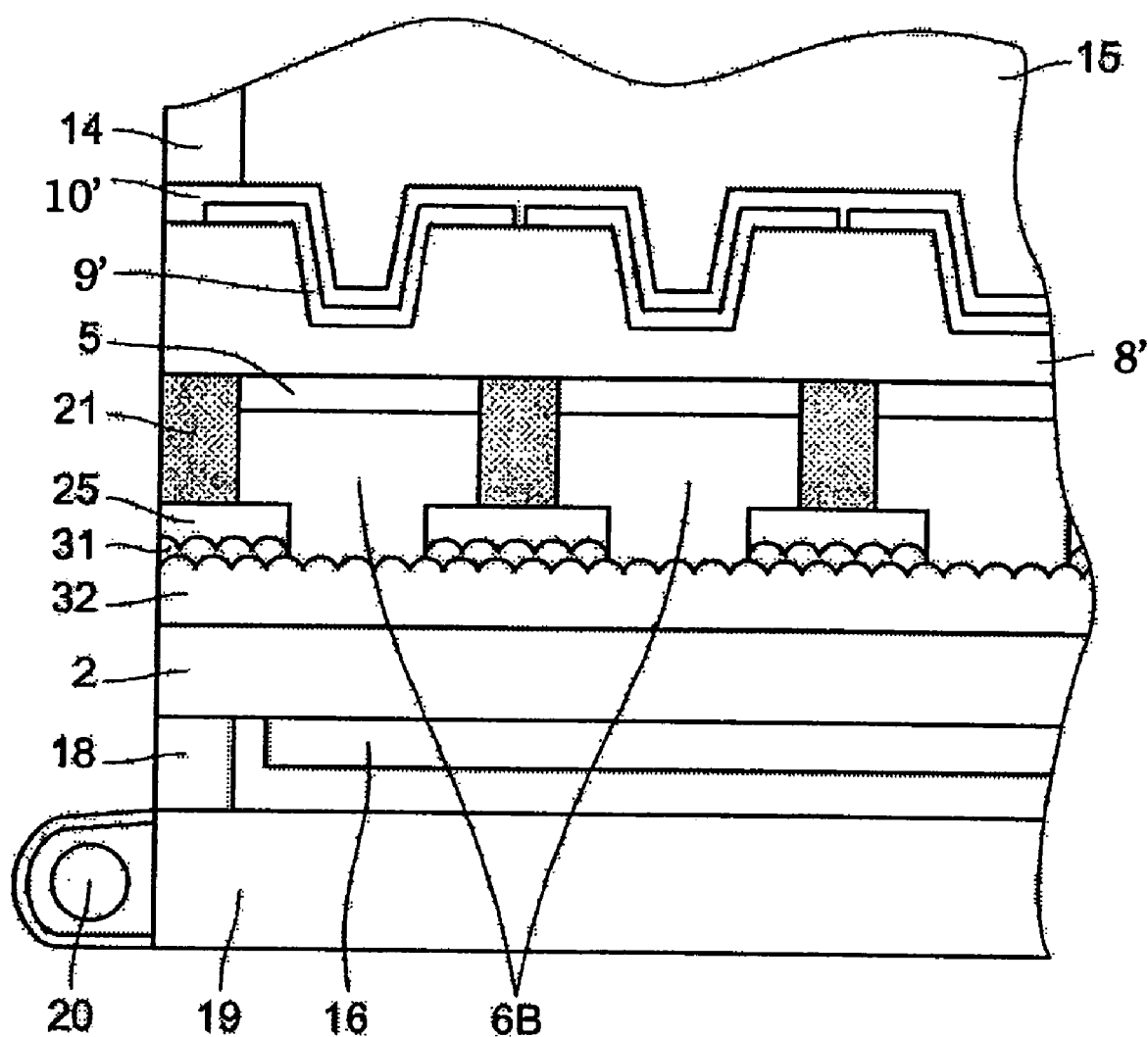
FIG. 5 is an enlarged partial cross-sectional view of the coloring portion according to the second embodiment of the present invention.

Referring now to FIG. 4-5, a liquid crystal display 30 in accordance with a second embodiment will now be explained. In view of the similarity between the first and second embodiments, the parts of the second embodiment that are identical to the parts of the first embodiment will be given the same reference numerals as those of the first embodiment.

The second embodiment of the present invention will next be described referring to FIGS. 2 and 4-5. FIG. 4 is a cross-sectional view depicting the semi light-transmissive reflecting liquid crystal display device 30 in accordance with the second embodiment of the present invention. As in the first embodiment, the side of the liquid crystal 15 on which the light source 20 is disposed is referred to as the back side, and the opposite side as the front side in this cross-sectional view. A grid is formed with light-transmissive colorless boundary layers 5 that extend in the direction of the Y-axis at a plurality of locations, and non light-transmissive colored boundary layers 21 that extend at a plurality of locations in the direction of the X-axis, as seen in the arrangement of the boundary layers of FIG. 2. FIG. 4 is a diagram depicting a cross section (I-I') of the colorless boundary layer 5, and FIG. 5 is a diagram depicting a cross section (III-III') of the colored boundary layer 21. This embodiment differs from the first embodiment in that a resin scattering layer 32 is newly provided, the front face of the reflecting layer 3 is given an irregular rugged shape and made into a scattering and reflecting layer 31, and the thickness of the overcoat layer 8 is partially changed.

As depicted in FIGS. 4 and 5, in the semi light-transmissive reflecting liquid crystal display device 30 includes a light-transmissive back substrate 2 and a front substrate 11 that are disposed facing each other, and a color filter 45 that enables color display. The color filter 45 includes a resin scattering layer 32 that is formed on the front side of the back substrate 2 and is provided with an irregular surface on the front side; a scattering and reflecting layer 31 that is formed on the resin scattering layer 32 and has an irregular surface on its front face side for scattering light and the openings 4; a transparent coat layer 25 formed on the scattering and reflecting layer 31; colorless boundary layers 5 and colored boundary layers 21 formed so as to enclose the openings 4 formed in the transparent coat layer 25; a plurality of deposit portions 7 which are defined by the colorless boundary layers 5 and the colored boundary layers 21 and to which a prescribed colored liquid is applied by a discharging device described hereinafter; coloring layers 6R, 6G, and 6B which are layers of the colored liquid applied to the deposit portions 7; and an overcoat layer 8' that is designed to completely cover the colorless boundary layers 5, the colored boundary layers 21, and the coloring layers 6R, 6G, and 6B and is formed thicker in portions corresponding to the scattering and reflecting layer 31. The overcoat layer 8' includes a first overcoat layer 8a' for directly and completely covering the colorless boundary layers 5, the colored boundary layers 21, and the coloring layers 6R, 6G, and 6B, and a second overcoat layer portion 8b' formed only on portions of the first overcoat layer portion 8a' that correspond to the scattering and reflecting layer 31.

Pixel electrodes 12 disposed opposite the coloring layers 6R, 6G, and 6B, and an orientation film 13 for covering the pixel electrodes 12 are formed on the back side of the front substrate 11. Counter electrodes 9' disposed in a concave shape opposite the pixel electrodes 12, and an orientation film 10' for covering the counter electrodes 9 are formed on the overcoat layer 8' described above. Seals 14 are formed along the external periphery of the front substrate 11 between the orientation films 10 and 13, such that liquid crystal 15 is sealed in the space formed by the seals, 14 and the orientation films 10 and 13. Also, the semi light-transmissive reflecting liquid crystal display device 30 has a front-face polarizing plate 17 attached to the front side of the front substrate 11, a back-face polarizing plate 16 attached to the back side of the back substrate 2, an optical waveguide plate 19 provided on the back of the back-face polarizing plate 16 via a buffer 18 so as to cover the entire back side of the back-face polarizing plate 16, and a light source 20 for supplying light to the optical waveguide plate 19.

The coloring layers 6R, 6G, and 6B are aligned in an orderly fashion in a grid. Coloring layers 6 of the same color form a row in the Y-axis direction, while coloring layers 6R, 6G, and 6B of different colors are lined up next to one another in the X-axis direction. The colorless boundary layers 5 are arranged at the borders between coloring layers 6 of different colors; while the colored boundary layers 21 are arranged at the borders of coloring layers 6 of the same color. The colorless boundary layers 5, the counter electrodes 9', the pixel electrodes 12, the orientation films 10' and 13, the overcoat layer 8', the resin scattering layer 32, and the transparent coat layer 25 are also light-transmissive.

Reflective Display Mode

The reflective display in the semi light-transmissive reflecting liquid crystal display device 30 thus configured will first be described. Among various lights that enter the front-face polarizing plate 17, only the external lights Q and S that enter the front-face polarizing plate 17 in the transmission direction (transmission axis direction) of the front-face polarizing plate 17 are allowed to pass through, and the lights entering in other directions are absorbed by the front-face polarizing plate 17. The external lights Q and S that have passed through the front-face polarizing plate 17 pass through the liquid crystal display device 30 through: the pixel electrodes 12→the orientation film 13→the liquid crystal 15→the orientation film 10'→the counter electrodes 9→the overcoat layer 8' in this order. The external light S in this arrangement passes through any one of the coloring layers 6R, 6G, and 6B (the coloring layer 6B in FIG. 4), reaches the scattering and reflecting layer 31 via the transparent coat layer 25, is reflected by the scattering and reflecting layer 31, again passes through the transparent coat layer 25 and the coloring layer 6, becomes a colored light that is colored in the color of the coloring layer 6, and exits from the front side of the liquid crystal display device 30 in a reverse order through the pathway through which the external light S entered. On the other hand, the external light Q passes through the colorless boundary layer 5 and the transparent coat layer 25, reaches the scattering and reflecting layer 31, is reflected by the scattering and reflecting layer 31, again passes through the transparent coat layer 25 and the colorless boundary layer 5, and exits from the front side as a colorless light in a reverse order through the pathway through which the external light S entered reverse pathway from which the external light S entered.

In this arrangement, the external light Q and S are scattered in various directions by the irregular surface of the scattering and reflecting layer 31 when reflected by the scattering and reflecting layer 31. Reflection of a viewer's eyes, face, or the like from the front surface that occurs when there is no irregular surface is thereby prevented, and a clearer display is obtained. This scattering and reflecting layer 31 uses silver, aluminum, nickel, chrome, or another thin film to reflect light. Irregularities are also formed on the surface of the scattering and reflecting layer 31 by oxygen plasma treatment or the like to scatter light. Furthermore, almost none of the external light entering the openings 4 is reflected, and irregularities are provided to the front face of the resin scattering layer 32 in order to prevent slight reflections and to yield a clear display.

The external light S, which is now a colored light, reduces its brightness when it passes through the coloring layers 6 and is colored with a prescribed color up to prescribed color saturation. The external light Q, which is a colorless light, passes through the colorless boundary layers 5 without passing through the coloring layers 6, and exits with no change in its original brightness. The external light Q and the external light S are caused to exit from the front face simultaneously, such that the overall brightness is maintained. The second overcoat layer portions 8*b*' of the overcoat layer 8' that correspond to the scattering and reflecting layer 31 is formed thick in order to maintain the brightness of the external light Q and S that are scattered and reflected by the scattering and reflecting layer 31. In the mean time, the thickness of portions of the liquid crystal 15 above the reflecting layer 31, through which the external light Q and S that are reflected by the, scattering and reflecting layer 31 are transmitted, is set smaller than other portions of the liquid crystal 15. Accordingly, it is possible to reduce the degree if brightness that is lost due to passage through the liquid crystal 15, and the brightness of light emitted from the front can be enhanced. The colored boundary layers 21 formed from resin at the boundaries between coloring layers 6 of the same color are black and yield good color contrast.

Transmissive Display Mode

The transmissive display mode is the same as the semi light-transmissive reflecting liquid crystal display device 1 already described in the foregoing. The length of the portion of the liquid crystal 15 where the external light Q and S are transmitted is shortened to minimize reduction in brightness in the liquid crystal display device 30 of the second embodiment. If it is assumed that the brightness of the mixture of the incoming external lights Q and S is the same as the brightness of the transmission light P that comes from the light source 20, there will be substantially no difference in brightness between the transmission light P emitted at the front face and the external light Q and S. Specifically, the semi light-transmissive reflecting liquid crystal display device 30 is a display device having a good display balance whereby the variance in brightness of the transmission light P and the external light Q and S is reduced significantly.

Furthermore, due to the transparent coat layer 25 of the present embodiment, a display can be obtained having substantially no difference in color saturation between the reflective display mode and the transmissive display mode. If there were no transparent coat layer 25, the thickness of each of the coloring layers 6 through which the light passes can be considered to be substantially the same because the reflecting layer 3 is a thin film of metal. Consequently, when light is emitted from the front face, the color saturation of the external light S, which passes through the coloring layers 6 twice, is greater than that of the transmission light P, which passes through the coloring layers 6 once.

In the present embodiment, however, as depicted in FIGS. 4 and 5, the transparent coat layer 25 is provided between the scattering and reflecting layer 31 and the boundary layers 5 and 21, and the coloring layers 6 through which the external light S passes are made about half as thick as the coloring layers 6 through which the transmission light P passes. By this arrangement, the external light S and the transmission light P travel the same distance through the coloring layers 6, and become colored to the same color saturation. The transparent coat layer 25 is made of acrylic resin, epoxy resin, or other highly light-transmissive material. The transparent coat layer 25 is formed on the scattering and reflecting layer 31 so as to entirely cover the scattering and reflecting layer 31, such that all of the external light Q and S passing through the transparent coat layer 25 are reflected by the scattering and reflecting layer 31. The transparent coat layer 25 is formed between the reflecting layer 3 and the boundary layers 5 and 21, but the same effects can be obtained by forming the coat layer between the scattering and reflecting layer 31 and the back substrate 2.

As described above, by partially forming the second overcoat portions 8*b*' over the first overcoat portions 8*a*' such that the overcoat layer 8' has different thicknesses in the semi light-transmissive reflecting liquid crystal display device 30, the thickness of the liquid crystal 15 in the area above the reflecting layer 31 is reduced by a factor equivalent to the thickness of the second overcoat layer 8*b*'. In this manner, the distance traveled by the external light Q and S and the transmission light P through the liquid crystal 15 is adjusted, such that the color brightness of the mixture of the external light Q and S and that of the transmission light P are equal. Accordingly, a display also has good visibility whereby reflections of external objects are prevented by the irregularity of the surfaces of the resin scattering layer 32 and the scattering and reflecting layer 31.

Also in this embodiment, light is scattered and reflected due to the irregular surface of the reflecting layer 31, it is possible to prevent a reflection of, for example, eyes, face, or the like of the viewer on the display.

Droplet Discharging Device 100

In the semi light-transmissive reflecting liquid crystal display devices 1 and 30 described in the first and second embodiments, the coloring layers 6R, 6G, and 6B as elements of the color display can be uniformly formed by depositing a colored liquid in a droplet form onto the deposit portions 7 using a droplet-discharging device. In this case, the overcoat layer 8 can also be formed with the droplet-discharging device.

Figure 6:
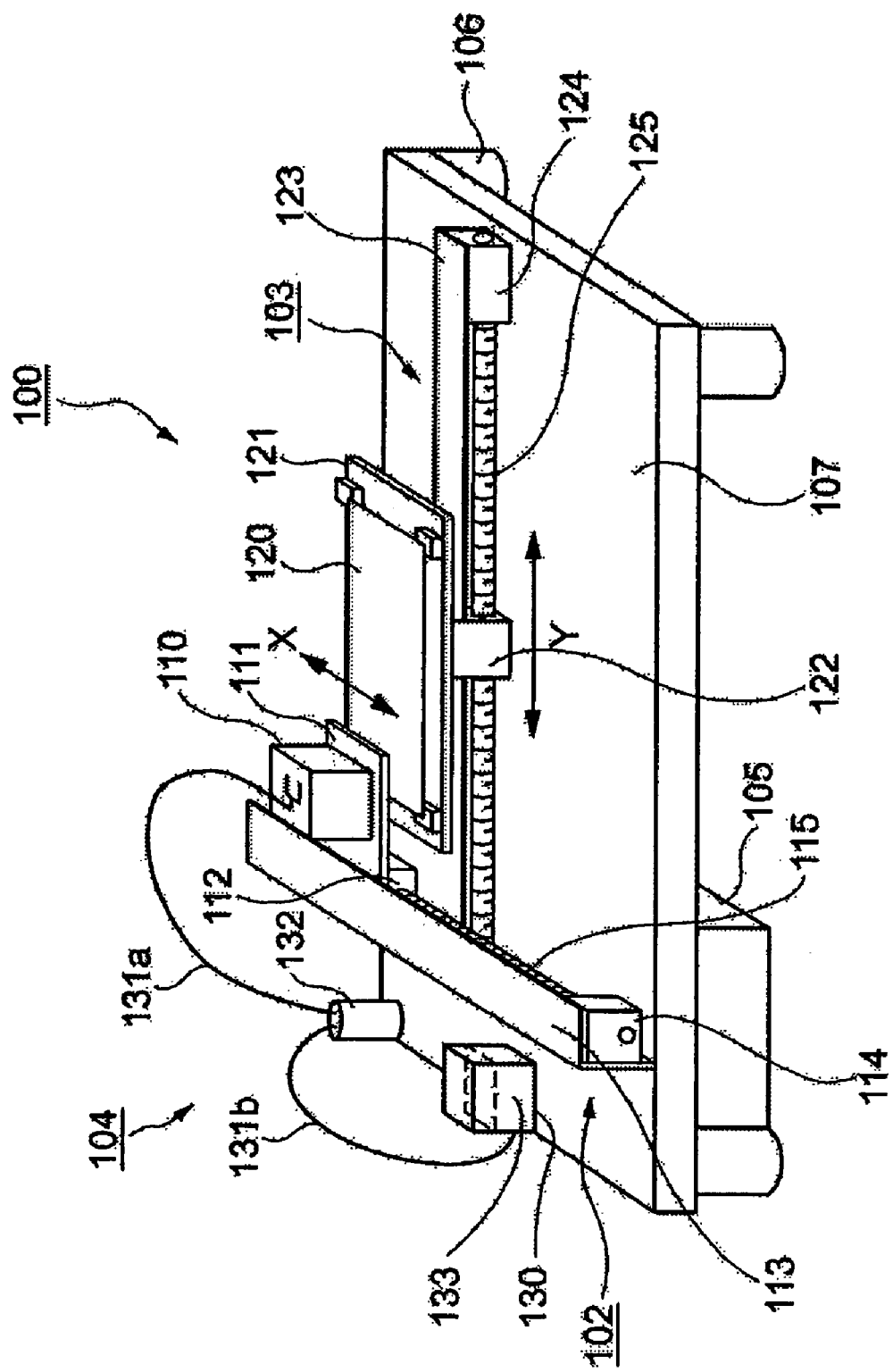
FIG. 6 is an oblique external view of the droplet-discharging device.

As depicted in FIG. 6, the droplet-discharging device 100 includes a head mechanism 102 having a head unit 110 for discharging the droplets; a work mechanism 103 for supporting a work 102 so that droplets can be discharged onto a discharge target of a work 120 from the head unit 110; a fluid feeding unit 104 for feeding liquid 133 to the head unit 110; and a controller 105 for performing overall control of these mechanisms and the feeding unit 104.

The droplet-discharging device 100 is provided with a plurality of support legs 106 attached to the floor, and a table 107 attached to the tops of the support legs 106. At the top of the table 107, the work mechanism 103 is disposed so as to extend in the longitudinal direction (Y-axis direction) of the table 107, and the head mechanism 102 supported by both of two pillars fixedly coupled to the table 107 is disposed above the work mechanism 103 so as to extend in the direction orthogonal to the work mechanism 103 (in the X-axis direction). A fluid feeding unit 104 for feeding the liquid 133 is connected from the head unit 110 of the head mechanism 102 and is disposed on one end of the table 107. Furthermore, the controller 105 is accommodated on the underside of the table 107.

The head mechanism 102 is provided with a head unit 110 for discharging the liquid 133, a carriage 111 on which the head unit 110 is mounted, an X-axis guide 113 for guiding the movement of the carriage 111 in the X-axis direction, an X-axis bore screw 115 mounted in the X-axis direction under the X-axis guide 113, an X-axis motor 114 for rotating the X-axis bore screw 115 forward and backward, and a carriage screwing unit 112 at the bottom of the carriage 111 in which a female screw is formed for engaging with the X-axis bore screw 115 and moving the carriage 111.

The work mechanism 103 is positioned below the head mechanism 102, has substantially the same structure as the head mechanism 102. The work mechanism 103 is disposed in the Y-axis direction, and includes a mounting platform 121 on which the work 120 is mounted, a Y-axis guide 123 for guiding the movement of the mounting platform 121, a Y-axis bore screw 125 mounted under the Y-axis guide 123, a Y-axis motor 124 for rotating the Y-axis bore screw 125 forward and backward, and a mounting platform screwing unit 122 at the bottom of the mounting platform 121 for engaging with the Y-axis bore screw 125 and moving the mounting platform 121.

Although not shown in the Figures, position detection devices for detecting the positions to which the head unit 110 and mounting platform 121 have moved are respectively provided to the head mechanism 102 and the work mechanism 103. Mechanisms for adjusting the direction of rotation (so-called Θ-axis) are installed in the carriage 111 and the mounting platform 121 to adjust the direction of rotation around the center of the head unit 110 and to adjust the direction of rotation of the mounting platform 121.

With these configurations, the head unit 110 and the work 120 can be moved back and forth in the X-axis and Y-axis directions. The movement of the head unit 110 will first be described. The X-axis bore screw 115 is rotated forward and backward by the forward and backward rotation of the X-axis motor 114, and the carriage 111 that is integrated with the carriage screwing unit 112 moves to any desired position by the carriage screwing unit 112 engaged with the X-axis bore screw 115 moving along the X-axis guide 113. Specifically, the head unit 110 mounted on the carriage 111 is moved freely in the X-axis direction with the aid of the drive of the X-axis motor 114. In the same manner, the work 120 mounted on the mounting platform 121 also moves freely in the Y-axis direction.

Accordingly, the head unit 110 is moved up to the discharge position in the X-axis and stopped, and caused to discharge droplets while being synchronized with the Y-axis direction movement of the work 120, which is below the head unit 110. A desired pattern can be formed on the work 120 by controlling the work 120, which moves in the Y-axis direction, and the head unit 110, which moves in the X-axis direction relative to each other.

The fluid feeding unit 104 for feeding the liquid 133 to the head unit 110 includes a tube 131a that forms a flow channel connected to the head unit 110; a pump 132 for pumping fluid to the tube 131a; a tube 131b (flow channel) for feeding the liquid 133 to the pump 132; and a tank 130 for storing the liquid 133 that is connected to the tube 131b and is disposed at one end on the table 107. Although it is preferable to mount the tank 130 on top of or below the table 107 to make it easy to refill or exchange the liquid 133, it is also possible to naturally supply the fluid 133 via gravity without the pump 132 by connecting the tank 130 and the head unit 110 via a flexible tube as long as the tank 130 is disposed above the head unit 110.

Figure 7:
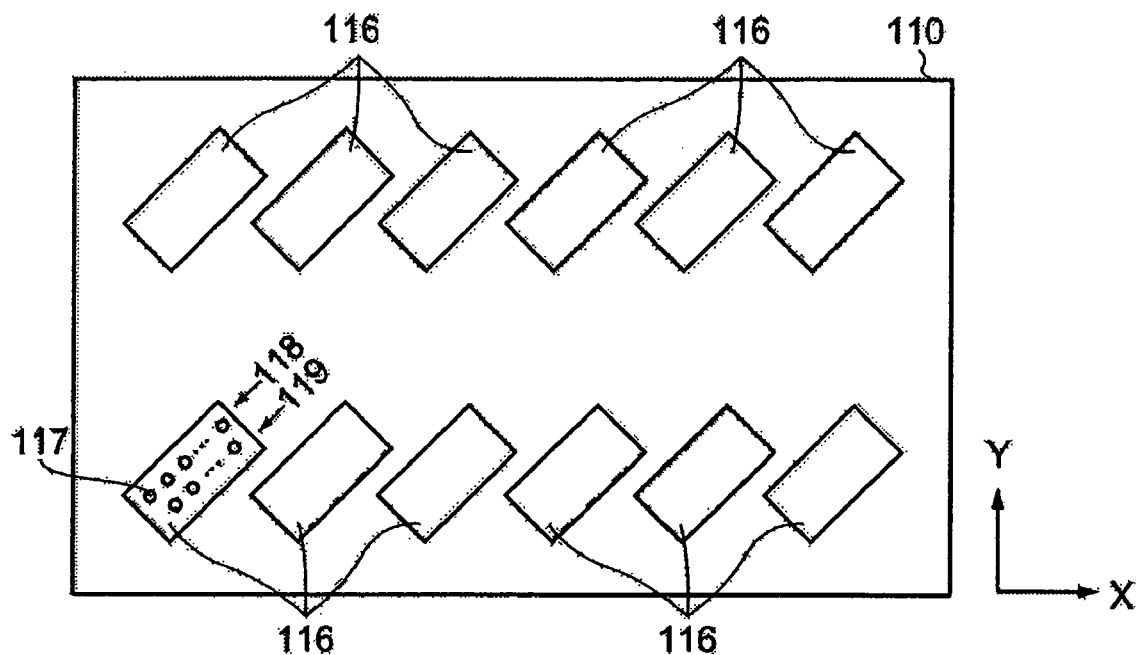
FIG. 7(a) is a planar diagram of the arrangement of the nozzles in the discharge head of the droplet-discharging device.
FIG. 7(b) is a detailed oblique view of the structure of the discharge head of the droplet-discharging device.
Figure 7:
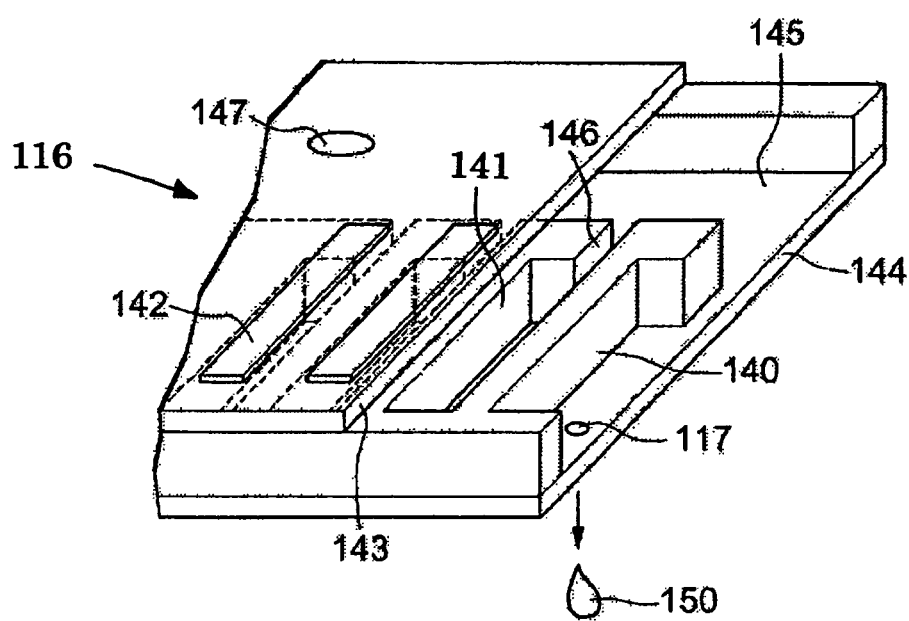

As depicted in FIG. 7(a), the head unit 110 contains a plurality of discharge heads 116 each having the same structure. FIG. 7(a) is a diagram depicting the head unit 110 as viewed from the mounting platform 121. Two rows of six discharge heads 116 of the head unit 110 are arranged such that the longitudinal direction of each of the discharge heads 116 is at an angle with respect to the X-axis direction. Each of the discharge heads 116 for discharging the liquid 133 also has two nozzle rows 118 and 119 extending in the longitudinal direction of the discharge heads 116. Each of the nozzle rows has 180 nozzles 117 lined up in a row. Each of the intervals between the nozzles 117 along the direction of the nozzle rows 118 and 119 is approximately 140 μm. The nozzles 117 of the two nozzle rows 118 and 119 are arranged with a half-pitch offset (approximately 70 μm).

As depicted in FIG. 7(b), each of the discharge heads 116 is provided with a diaphragm 143 and a nozzle plate 144. A fluid reservoir 145 that is continually filled with the liquid 133 fed from the tank 130 via a hole 147 is positioned between the diaphragm 143 and the nozzle plate 144. A plurality of barriers 141 is also positioned in the space between the diaphragm 143 and the nozzle plate 144. The area enclosed by the diaphragm 143, the nozzle plate 144, and a pair of barriers 141 constitutes a cavity 140. The cavities 140 are provided opposite the nozzles 117, such that the number of cavities 140 is the same as the number of nozzles 117. The liquid 133 is fed to the cavities 140 from the fluid reservoir 145 via a feeding port 146 positioned between the pair of barriers 141.

Figure 8:
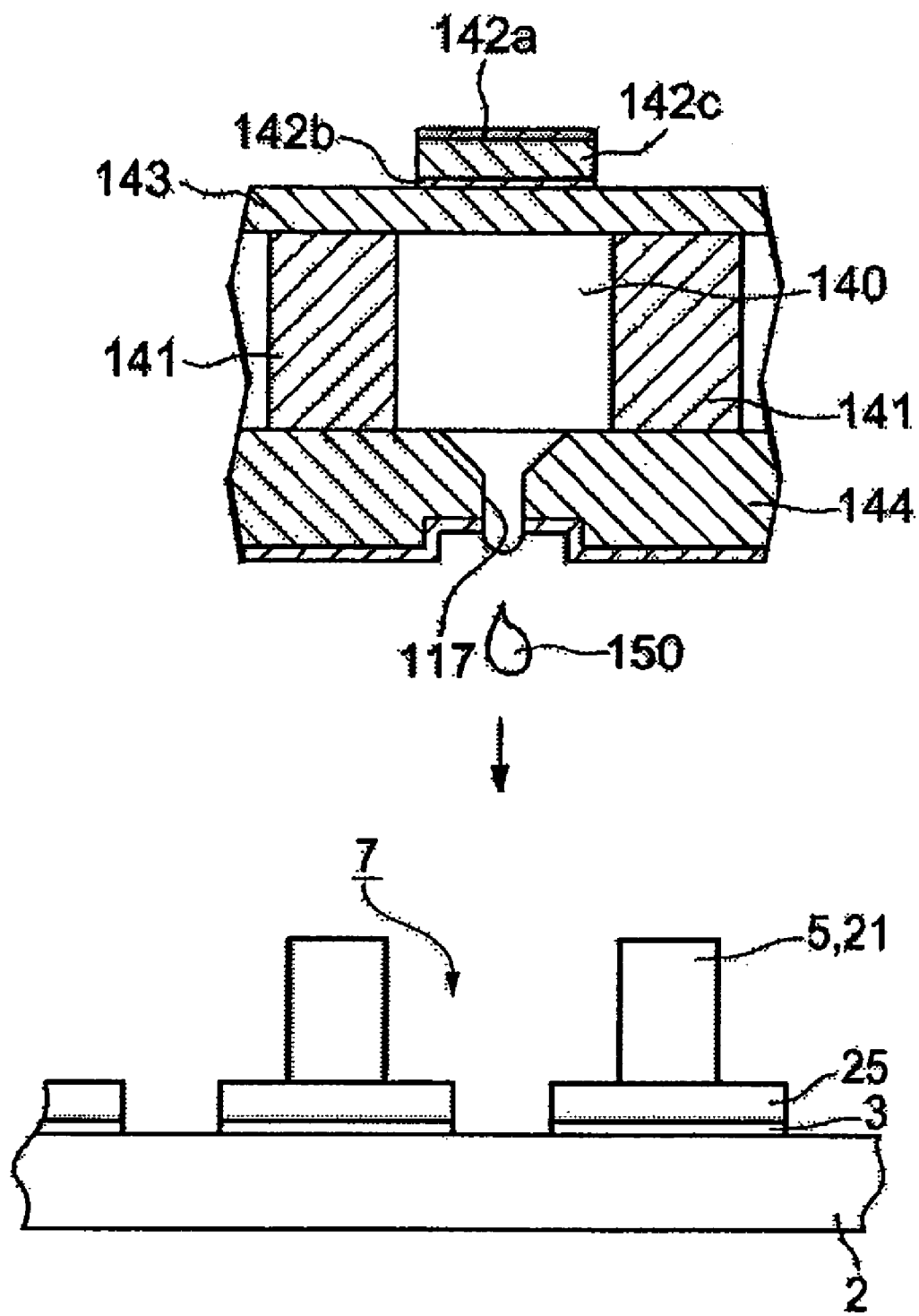
FIG. 8 is a cross-sectional view of a droplet being discharged into the deposit portion.

As depicted in FIG. 8, a transducer 142 is positioned opposite each of the cavities 140 on the diaphragm 143. The transducer 142 includes a piezoelement 142c and a pair of electrodes 142a and 142b that sandwich the piezoelement 142c. The liquid 133 is formed into droplets 150 and discharged from corresponding nozzles 117 by a drive voltage being applied to the pair of electrodes 142a and 142b. In the case of the semi light-transmissive reflecting liquid crystal display devices 1 and 30, the droplets 150 of colored liquid are discharged onto the deposit portions 7, which are enclosed by the colorless boundary layers 5 and 21. In this way, the coloring layers 6R, 6G, and 6B are formed.

Figure 10:
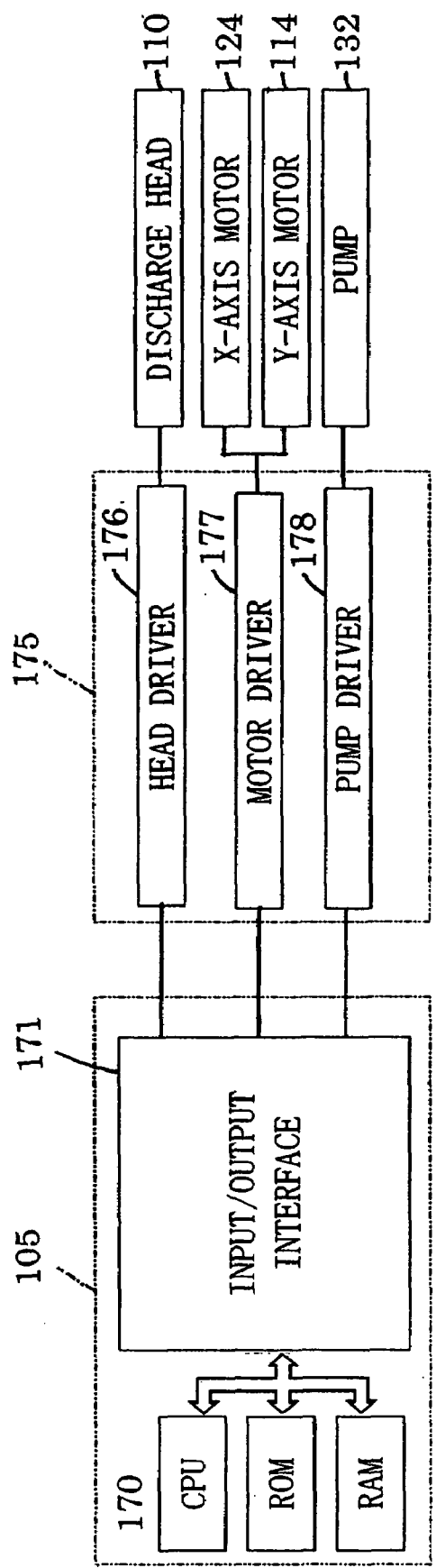
FIG. 10 is a block diagram of the control system of the droplet-discharging device.

The control system for controlling the configuration described above will next be described with reference to FIG. 10. The control system includes a controller 105 and a drive unit 175. The controller 105 includes a CPU 170, a ROM, a RAM, and an input/output interface 171. The CPU 170 processes various signals inputted via the input/output interface 171 on the basis of the data in the ROM and RAM, outputs a control signal to the drive unit 175 via the input/output interface 171, and selectively controls each component operatively connected to the controller 105.

The drive unit 175 includes a head driver 176, a motor driver 177, and a pump driver 178. The motor driver 177 rotates the X-axis motor 114 and the Y-axis motor 124 forward and backward with the control signal of the controller 105, and thereby controls the movement of the work 120 and the head unit 110. The head driver 176 controls discharge of the liquid 133 from the discharge heads 116 and creates a prescribed pattern on the work 120 by synchronizing the control of the motor driver 177. The pump driver 178 controls the pump 132 in coordination with the discharge state of the liquid 133 and optimally controls the fluid supply to the discharge heads 116.

The controller 105 is configured so as to give an independent signal via the head driver 176 to each of the plurality of transducers 142. The volume of droplet 150 to be discharged from the nozzles 117 is controlled for each of the nozzles 117 according to the signal from the head driver 176. Furthermore, the volume of droplet 150 discharged by each of the nozzles 117 can be varied between 0 pL to 42 pL (pico liters).

Method of Manufacturing Color Filter 40

Figure 11:
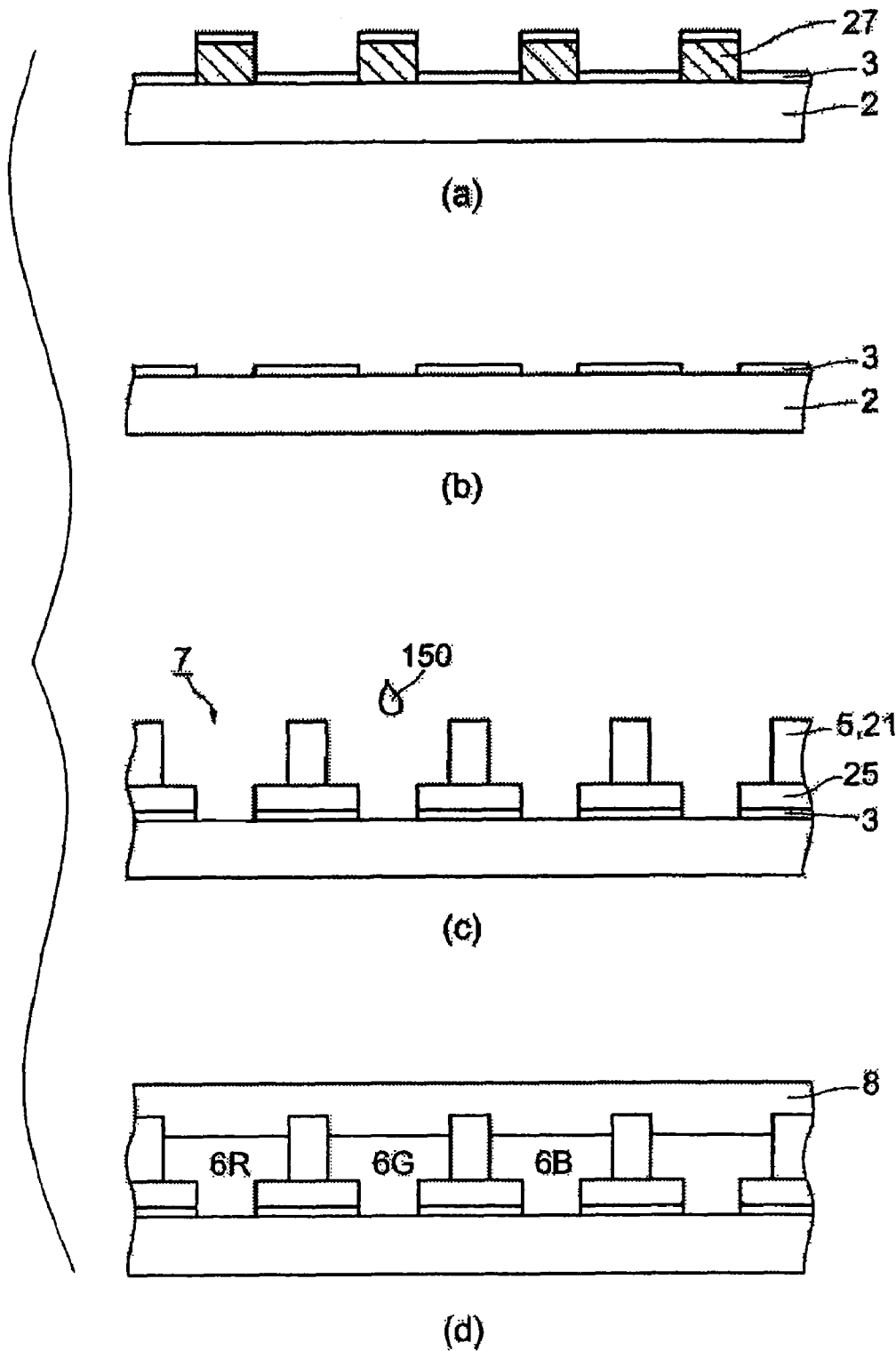
FIG. 11 is a schematic view of the process of manufacturing the color filter according to the first embodiment of the present invention.

The method of manufacturing the color filter 40 of the first embodiment, which includes the back substrate 2, the reflecting layer 3, the transparent coat layer 25, the openings 4, the colorless boundary layer 5, the colored boundary layer 21, the deposit portions 7, the coloring layers 6R, 6G, and 6B, and the overcoat layer 8 will be described in detail with reference to FIG. 11. First, as depicted in FIG. 11(a), an organic resist film 27 for forming the openings 4 is formed on the back substrate 2. Then, a thin metallic film of aluminum, chrome, or other metal is formed on the resist film 27 and the back substrate 2 by vapor deposition or the like to form the reflecting layer 3. The metallic thin film is bonded to the back substrate 2, but not to the resist film 27. The resist film 27 and the metallic thin film on the resist film 27 are removed by a solvent after the metallic thin film is formed, whereupon the reflecting layer 3 is formed as depicted in FIG. 11(b). The transparent coat layer 25 made of an acrylic or other light-transmissive resin, the colorless boundary layer 5 made of a similar type of light-transmissive resin, and the colored boundary layer 21 made of a black resin are applied to the reflecting layer 3 to form a grid as depicted in FIG. 2 by screen printing or the like. The deposit portions 7 in the areas enclosed by the back substrate 2, the reflecting layer 3, the colorless boundary layer 5, and the colored boundary layer 21 are also formed as depicted in FIG. 11(c).

The method whereby the droplets 150 of colored liquid are discharged by the droplet-discharging device 100 onto the deposit portions 7 to form the coloring layers 6 will be described using an example in which red colored liquid is discharged to form the coloring layers 6R. First, the back substrate 2 on which the reflecting layer 3, transparent coat layer 25, colorless boundary layer 5, and colored boundary layer 21 are formed is mounted on the mounting platform 121 as the work 120. The mounting direction is such that the direction in which the colorless boundary layers 5 extend is the Y-axis, and the direction in which the colored boundary layers 21 extend is the X-axis, as depicted in FIG. 2. Droplets 150 of red colored liquid are discharged from the nozzle 117 as depicted in FIG. 8, and the droplets 150 are dropped in an order from one end of a row of deposit portions 7 of a red colored layer, working its way up in the Y-axis direction to the other end of the row of the deposit portions 7, with the discharge head 116 moving in a relative fashion in the Y-axis direction.

The coloring layers 6 are formed by applying the droplets 150 of colored fluid to the openings 4 first, and then to the transparent coat layer 25. More detailed explanation of how the droplets 150 are deposited onto each of the deposit portions 7 will be given below with reference to FIGS. 21-23.

Droplets 150 can also be simultaneously deposited at this time by another nozzle 117 onto another row of deposit portions 7 of the red coloring layers 6R. The red coloring layers 6R are completed by repeating this operation as necessary. The number of times this operation needs to be repeated is determined by the number of rows of deposit portions 7 that are to become the red coloring layers 6R.

In this case, the boundaries of the red coloring layers 6R that are lined up in the Y-axis direction become the non-light-transmissive colored boundary layer 21 that extend in the X-axis direction. Accordingly, there is no effect on performance of the display device even if droplets 150 are inadvertently dropped on the colored boundary layer 21. Therefore, droplets 150 can be discharged continuously and efficiently in the Y-axis direction without having to avoid the colored boundary layer 21. On the other hand, the boundary between the row of green coloring layers 6G and the row of red coloring layers 6R is the colorless boundary layer 5, so droplets 150 must be prevented from landing thereon. However, since the colorless boundary layer 5 is parallel to the Y-axis, and the nozzles 117 move only in the Y-axis direction relative to the work 120, it is easy to prevent the droplets 150 from being accidentally deposited onto the colorless boundary layer 5. In a conventional structure, however, a colorless portion that performs the functions of the colorless boundary layer 5 is provided in an area inside each of the deposit portions 7. Accordingly, it is necessary to prevent the droplets 150 from being deposited to the colorless portion each time the droplets 150 are deposited to the deposit portion 7. Therefore, control of the discharge operation becomes complicated. The arrangement of the colorless boundary layers 5 of the present invention is effective in this regard. The description of method of forming the coloring layer 6R described above also applies to formation of the coloring layers 6G and 6B. After the coloring layers 6R, 6G, and 6B are formed as described above, the overcoat layer 8 is provided so as to cover the coloring layers 6R, 6G, and 6B, the colorless boundary layer 5, and the colored boundary layer 21 (FIG. 11(d)). In this manner, the color filter 40 is completed.

Method of Manufacturing Color Filter 45

The method for manufacturing the color filter 45 according to the second embodiment is basically the same as that of the color filter 40 of the first embodiment. Accordingly, only the main differences between the two methods will be described. A light-transmissive resin scattering layer 32 having an irregular front face is affixed over the entire front side of the back substrate 2, and a resist film 27 and a scattering and reflecting layer 31 are formed on the resin scattering layer 32. Since the scattering and reflecting layer 31 is a metallic thin film, the scattering and reflecting layer 31 is formed so as to conform to the surface irregularity of the resin scattering layer 32. More over, further irregularity is provided to the surface of the scattering and reflecting layer 31 by oxygen plasma treatment or the like to enhance its scattering effects. The resist film 27 is then removed and the transparent coat layer 25 is formed on the scattering and reflecting layer 31 by screen printing or the like. The subsequent process is the same as manufacturing the color filter 45 of the first embodiment.

Manufacturing Apparatus for Manufacturing Liquid Crystal Display Device 1

Figure 9:
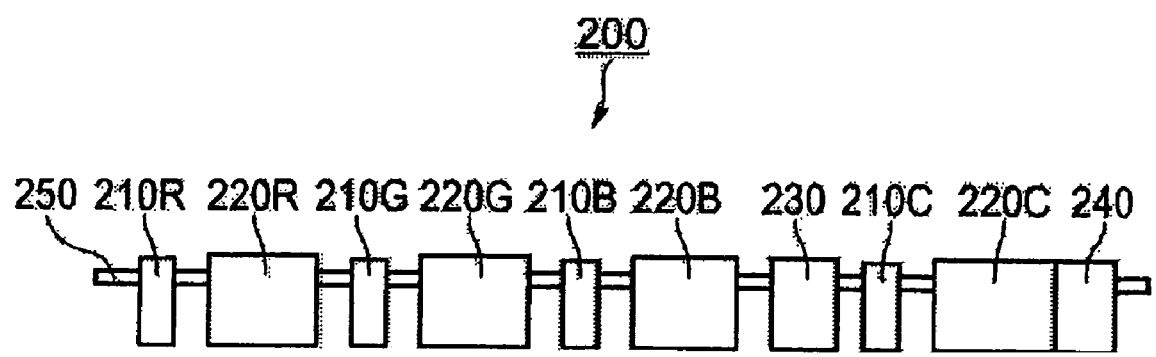
FIG. 9 is a schematic diagram of the device for manufacturing the liquid crystal display device according to the first and second embodiments of the present invention.

It is even more effective to use a manufacturing apparatus described below in order to efficiently form the coloring layers 6R, 6G, and 6B with this droplet-discharging device 100. The manufacturing apparatus 200 depicted in FIG. 9 is a group of devices for manufacturing the semi light-transmissive reflecting liquid crystal display devices 1 and 30. The droplet-discharging device 100 for discharging the droplets 150 of a corresponding colored liquid to each of the coloring layers 6R, 6G, and 6B shown in FIGS. 1 and 4 is used as a device herein. The manufacturing apparatus 200 is provided with a discharging device 210R for applying red colored liquid to all of the deposit portions 7 to which red colored liquid is to be applied; a drying device 220R for drying the red colored liquid; a discharging device 210G for applying green colored liquid to all of the deposit portions 7 to which green colored liquid is to be applied; a drying device 220G for drying the green colored liquid; a discharging device 210B for similarly applying blue colored liquid to all of the deposit portions 7 to which blue colored liquid is to be applied; a drying device 220B for drying the blue colored liquid; an oven 230 for reheating (post-baking) the colored liquid of each color; a discharging device 210C for forming the overcoat layer 8 on the post-baked layers of colored liquid; a drying device 220C for drying the overcoat layer 8; and a curing device 240 for reheating and curing the dried overcoat layer 8. The manufacturing apparatus 200 is further provided with a transport device 250 for transporting the coloring layers 6R, 6G, and 6B in the following sequence: the discharging device 210R, the drying device 220R, the discharging device 210G, the drying device 220G, the discharging device 210B, the drying device 220B, the oven 230, the discharging device 210C, the drying device 220C, and the curing device 240.

In manufacturing a prototype or the like, the same droplet-discharging device 100 may be used as the discharging devices 210R, 210G, 2101B, and 210C. Also, the head unit 110 in this case may be configured so as to discharge droplets of colored liquid by the discharge heads 116 for red (R), green (G), blue (B), and the overcoat. For example, the droplet-discharging device 100 can perform the same function as the discharging device 210R of the manufacturing apparatus 200 by using the discharge heads 116 to which red (R) colored liquid is fed to form the red colored layers 6R. The same function may be performed as the discharging device 210G of the manufacturing apparatus 200 by using the discharge heads 116 to which green (G) colored liquid is fed to form the green coloring layers 6G. The blue coloring layer 6B and the overcoat layer 8 may also be manufactured in the same manner. Furthermore, the formation of the transparent coat layer 25, colorless boundary layer 5, and colored boundary layer 21 of the color filters 40 and 45 with the aid of a dispenser or by screen printing, the formation of the orientation films 10 and 13 of the semi light-transmissive reflecting liquid crystal display devices 1 and 30, and application of the liquid crystal 15 may all be performed with the droplet-discharging device 100, and these functions can be added to the manufacturing apparatus 200 described above.

Method of Manufacturing Liquid Crystal Display Device

The method of manufacturing the semi light-transmissive reflecting liquid crystal display devices 1 and 30, on which the color filters 40 and 45 of the first and second embodiments are respectively mounted as described in the foregoing, will be described using the semi light-transmissive reflecting liquid crystal display device 1 of FIG. 1 as an example. First, counter electrodes 9 made of light-transmissive ITO (indium tin oxide) are formed opposite the coloring layers 6 on the overcoat layer 8 of the color filter 40, which includes the back substrate 2, the reflecting layer 3, the openings 4, the light-transmissive coat layers 25, the colorless boundary layers 5, the colored boundary layers 21, the deposit portions 7, the coloring layers 6R, 6G, and 6B, and the overcoat layer 8. Furthermore, an orientation film 10 of polyimide or the like is formed covering the entire surface of the counter electrodes 9 and the overcoat layer 8 to provide a finish to the back substrate 2.

Then, pixel electrodes 12 made of the same ITO as the counter electrodes 9 and arranged in positions opposite the counter electrodes are formed on the back side of the front substrate 11. An orientation film 13 made of polyimide or the like is formed covering the entire surface of the pixel electrodes 12 and the front substrate 11 to provide a finish to the front substrate 11. A rectangular seal 14 that has a notch and is formed in the area of the liquid crystal 15 is formed by screen printing or the like on the orientation film 10 of the back substrate 2. The liquid crystal 15 that is maintained at a temperature suitable for discharge is discharged from the nozzles 117 of the discharge heads 116 to the inside of the seal 14 by using the droplet-discharging device 100. After the liquid crystal 15 is filled, the surface of the orientation film 13 of the front substrate 11 is bonded to the seal 14. The notch is then sealed after the liquid crystal leaking from the notch is removed. The amount of liquid crystal 15 to be deposited at this time is preferably 100% to 110% of the volume of the liquid crystal area so that gaps do not form in the liquid crystal area and extra leakage does not occur.

The front-face polarizing plate 17 and back-face polarizing plate 16 are then bonded to the front substrate 11 and the back substrate 2, respectively. A buffer 18 is further provided on the periphery of the back-face polarizing plate 16. An optical waveguide plate 19 is affixed facing the entire surface of the back-face polarizing plate 16 via the buffer 18. A light source 20 is disposed so as to be directly connected to the optical waveguide plate 19. A semi light-transmissive reflecting liquid crystal display device 1 having excellent color contrast is thus manufactured. The same manufacturing process is performed to manufacture the semi light-transmissive reflecting liquid crystal display device 30.

Third Embodiment

Figure 12:
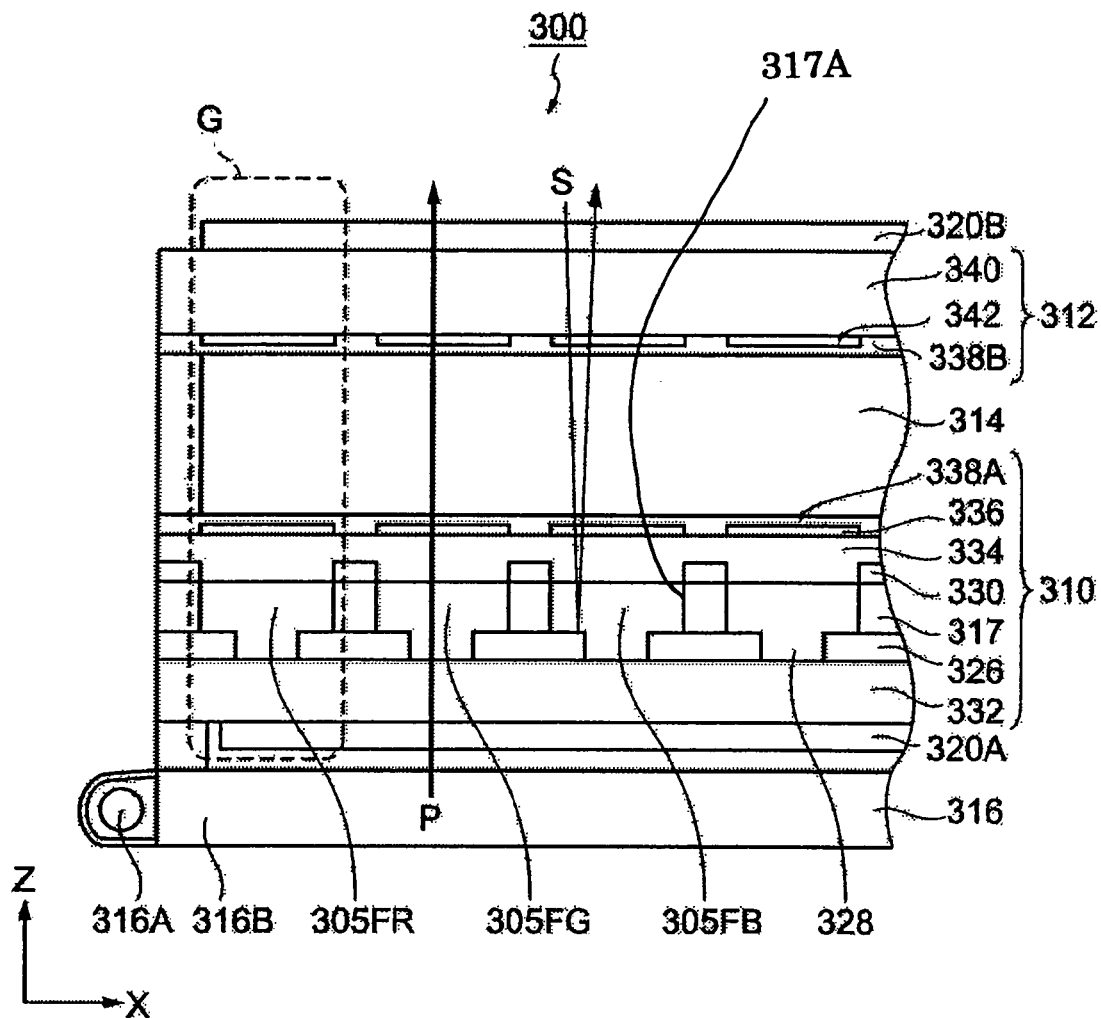
FIG. 12 is a cross-sectional view of the liquid crystal display device according to the third embodiment of the present invention.

The liquid crystal display device 300 depicted in FIG. 12 is a display device provided with a TFD (Thin Film Diode), which is a two-terminal element, as a switching element. The liquid crystal display device 300 is provided with a polarizing plate 320A, a polarizing plate 320B, a color filter substrate 310, an opposing substrate 312, a liquid crystal layer 314, and a light source 316. The liquid crystal layer 314 is positioned between the color filter substrate 310 and the opposing substrate 312. The color filter substrate 310 is also positioned between the liquid crystal layer 314 and the light source 316. The color filter substrate 310, the liquid crystal layer 314, and the opposing substrate 312 are positioned between the polarizing plate 320A and the polarizing plate 320B. The color filter substrate 310 is also sometimes referred to simply as the "color filter."

The color filter substrate 310 includes a light-transmissive substrate 332; a reflective portion 326; a transmissive portion 328; a plurality of filter layers 305FR, 305FG, and 305FB; a black matrix 317; banks 330; a flattening layer 334; a plurality of light-transmissive electrodes 336; and an orientation film 338A. In the present embodiment, the light-transmissive substrate 332 is positioned between the polarizing plate 320A on one side, and the reflective portion 326 and transmissive portion 328 on the other side. The filter layers 305FR, 305FG, and 305FB are also referred to as "coloring layers." The black matrix 317, the banks 330, and the flattening layer 334 are also referred to as the "colored boundary layer," "colorless boundary layer," and "overcoat layer," respectively.

The polarizing plate 320A is positioned so as to substantially cover the entire face of the substrate 332. The polarizing plate 320A and the substrate 332 are attached to one another in the present embodiment, but the polarizing plate 320A may alternatively be separate from the substrate 332.

The reflective portions 326 and transmissive portions 328 are both positioned on the substrate 332. The reflective portions 326 and the transmissive portion 328 are both positioned in areas corresponding to each of the plurality of filter layers 305FR, 305FG, and 305FB. In the present embodiment, the reflective portions 326 are aluminum films formed on the substrate 332, while the transmissive portions 328 are openings formed on the aluminum film.

The black matrix 317 has a plurality of opening surfaces 317A. Specifically, the black matrix 317 is a light-blocking portion having a shape that defines the plurality of opening surfaces 317A. The plurality of opening surfaces 317A is arranged in a matrix, and the opening surfaces 317A each correspond to a pixel area G described hereinafter. The black matrix 317 is formed opposite each of the reflective portions 326. The black matrix 317 is also an example of the "first layer" of the present invention.

Each of the plurality of filter layers 305FR, 305FG, and 305FB corresponds to one of the three colors. Specifically, the filter layer 305FR is a filter corresponding to red, the filter layer 305FG is a filter corresponding to green, and the filter layer 305FB is a filter corresponding to blue. The plurality of filter layers 305FR, 305FG, and 305FB is positioned opposite each of the plurality of opening surfaces 317A.

The banks 330 are formed on the black matrix 317. The planar shape of the banks 330 is the same as the planar shape of the black matrix 317. As described in detail hereinafter, the liquid repellency of the banks 330 against the liquid color filter material for forming the filter layers 305FR, 305FG, and 305FB is higher than its liquid repellency against the color filter material. The banks 330 are an example of the "second layer" of the present invention.

The flattening layer 334 is positioned so as to cover the plurality of filter layers 305FR, 305FG, and 305FB and the banks 330. Specifically, the flattening layer 334 covers the steps formed between the filter layers 305FR, 305FG, and 305FB and the banks 330 so that a substantially flat surface is obtained. A plurality of electrodes 336 is positioned on the flattening layer 334. The electrodes 336 are arranged in stripes that extend in the Y-axis direction (the direction perpendicular to the plane of the paper in FIG. 12), and are parallel to one another. The orientation film 338A is positioned so as to cover the plurality of electrodes 336 and the flattening layer 334, and rubbing treatment is performed on the orientation film 338A in a prescribed direction.

The opposing substrate 312 includes a light-transmissive substrate 340, a plurality of light-transmissive electrodes (pixel electrodes) 342, and an orientation film 338B. The substrate 340 is positioned between the polarizing plate 320B and the plurality of electrodes 342. The polarizing plate 320B is positioned so as to substantially cover the entire substrate 340. The polarizing plate 320B and the substrate 340 are attached to one another in the present embodiment, but the polarizing plate 320B may also be separate from the substrate 340. Although not illustrated in FIG. 12, the opposing substrate 312 is provided with a plurality of two-terminal elements to which each of the plurality of electrodes 342 is electrically connected.

The plurality of electrodes 342 is arranged in a matrix. The orientation film 338B is arranged so as to cover the plurality of electrodes 342 and the substrate 340, and is rubbed in a prescribed direction. In the present embodiment, the rubbing direction of the orientation film 338B and the rubbing direction of the orientation film 338A described above are set so that the liquid crystal has a TN orientation between the orientation film 338A and the orientation film 338B.

The liquid crystal layer 314 is positioned between the color filter substrate 310 and the opposing substrate 312. Specifically, the liquid crystal layer 314 is positioned in a space defined by a plurality of spacers between the orientation film 338A and the orientation film 338B, and is in contact with the orientation film 338A and orientation film 338B.

Each of the overlapping portions between the plurality of electrodes 336 and the plurality of electrodes 342 corresponds to a pixel area G. Each pixel area G also corresponds to one of the filter layers 305FR, 305FG, and 305FB.

The light source 316 is provided so that the color filter substrate 310 is positioned between the light source 316 and the liquid crystal layer 314. The light source 316 of the present embodiment is also referred to as a backlight. The light source 316 includes a light source 316A for emitting white light, and an optical waveguide 316B. The optical waveguide 316B acts as an optical guide while diffusing the light from the light source 316A so as to evenly illuminate the substrate 332 from behind. The rear surface of the substrate 332 is the opposite surface from the surface on which the filter layers 305FR, 305FG, and 305FB, the black matrix 317, the reflective portions 326, and the transmissive portions 328 are formed. Therefore, the substrate 332 can also be described as being positioned between the filter layers 305FR, 305FG, and 305FB and the light source 316, for example.

As described above, a reflective portion 326 and a transmissive portion 328 are each positioned on the color filter substrate 310 opposite each of the filter layers 305FR, 305FG, and 305FB. The liquid crystal display device 300 having this type of color filter substrate 310 functions in the manner described below.

When the backlight (light source 316) is used, a light beam P passes through the transmissive portion 328 after being transmitted through the polarizing plate 320A and the substrate 332. The light beam that has passed through the transmissive portion 328 then enters the filter layers 305FR, 305FG, and 305FB, and a light beam of the corresponding wavelengths exits from the filter layers 305FR, 305FG, and 305FB. The light beam (colored light) from the filter layers 305FR, 305FG, and 305FB is transmitted through the liquid crystal layer 314 and the opposing substrate 312 and exits from the polarizing plate 320B. The intensity of the exiting light beam that originates in the backlight 316A can be adjusted by adjusting the voltage applied between the electrodes 336 and the electrodes 342.

On the other hand, when external light is used, the external light beam S is transmitted through the polarizing plate 320B, the opposing substrate 312, and the liquid crystal layer 314, and is directed to the corresponding filter layers 305FR, 305FG, and 305FB. From among the light beams transmitted through the filter layers 305FR, 305FG, and 305FB, only light beams that are reflected by the reflective portion 326 are transmitted again through the filter layers 305FR, 305FG, and 305FB, and are colored in the corresponding color. Each type of colored light is again transmitted through the liquid crystal layer 314 and the opposing substrate 312, and is emitted from the polarizing plate 320B. The intensity of the light beam that originates as the external light beam and exits from the polarizing plate 320B is adjusted by adjusting the voltage applied between the electrodes 336 and the electrodes 342.

With the configuration described above, the first light beam that enters from the first side (upper side in FIG. 12) of the black matrix 317 and passes through the corresponding filter layers 305FR, 305FG, and 305FB is reflected back to the first side by the reflective portion 326. On the other hand, the second light beam that enters from the second side (bottom side if FIG. 12) of the black matrix 317 exits to the first side via the transmissive portion 328 and corresponding filter layers 305FR, 305FG, and 305FB. The first side of the black matrix 317 is defined as the side on which the flattening layer 334 and liquid crystal layer 314 are positioned. The second side of the black matrix 317 is defined as the side on which the light source 316 is positioned.

Thus, the liquid crystal display device 300 is capable of displaying an image using both external light as well as light from a backlight. The liquid crystal display device 300 having this type of functionality is referred to as a semi light-transmissive reflective display device.

The filter layers 305FR, 305FG, and 305FB in the color filter substrate 310 are formed on the opening surfaces 317A of the black matrix 317 by discharging a color filter material from an inkjet device or other discharging device.

In the present embodiment, the color filter substrate 310 prior to being provided with the filter layers 305FR, 305FG, and 305FB is sometimes referred to as the "substrate 310A." The areas in which the filter layers 305FR, 305FG, and 305FB are to be provided are also referred to as the "deposit portions 350R, 350G, and 350B" in the present embodiment. According to this notation, the concave portions in the substrate 310A enclosed by the banks 330, the black matrix 317, the reflective portion 326, and the transmissive portion 328 correspond to the deposit portions 350R, 350G, and 350B, in the present embodiment.

Manufacturing Apparatus for Manufacturing Liquid Crystal Display Device 300

The manufacturing apparatus for manufacturing the liquid crystal display device 300 will be described hereinafter.

Figure 13:
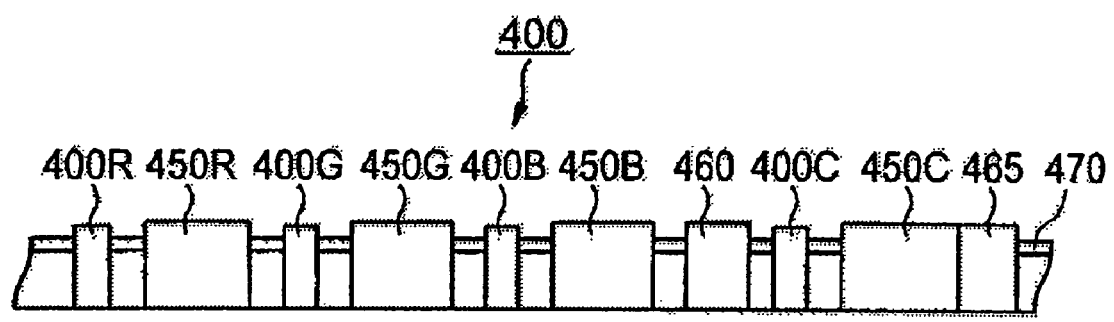
FIG. 13 is a schematic view of the apparatus for manufacturing the liquid crystal display device according to the third and fourth embodiments of the present invention.

The manufacturing apparatus 400 depicted in FIG. 13 is a device for discharging the corresponding color filter material onto the deposit portions 350R, 350G, and 350B of the substrate 310A. Specifically, the manufacturing apparatus 400 is provided with a discharging device 400R for applying the color filter material 305R to all of the deposit portions 350R; a drying device 450R for drying the color filter material 305R on the deposit portions 350R; a discharging device 400G for applying the color filter material 305G to all of the deposit portions 350G; a drying device 450G for drying the color filter material 305G on the deposit portions 350G; a discharge device 400B for applying the color filter material 305B to all of the deposit portions 350B; a drying device 450B for drying the color filter material 305B on the deposit portions 350B; an oven 460 for reheating (post-baking) the color filter materials 305R, 305G, and 305B; a discharging device 400C for providing a flattening layer 334 on the layer of post-baked color filter materials 305R, 305G, and 305B; a drying device 450C for drying the flattening layer 334; and a curing device 465 for reheating and curing the dried flattening layer 334. The manufacturing apparatus 400 is further provided with a transport device 470 for transporting the substrate 310A in the following sequence: the discharging device 400R, the drying device 450R, the discharging device 400G, the drying device 450G, the discharging device 400B, the drying device 450B, the oven 460, the discharging device 400C, the drying device 450C, and the curing device 465.

Figure 14:
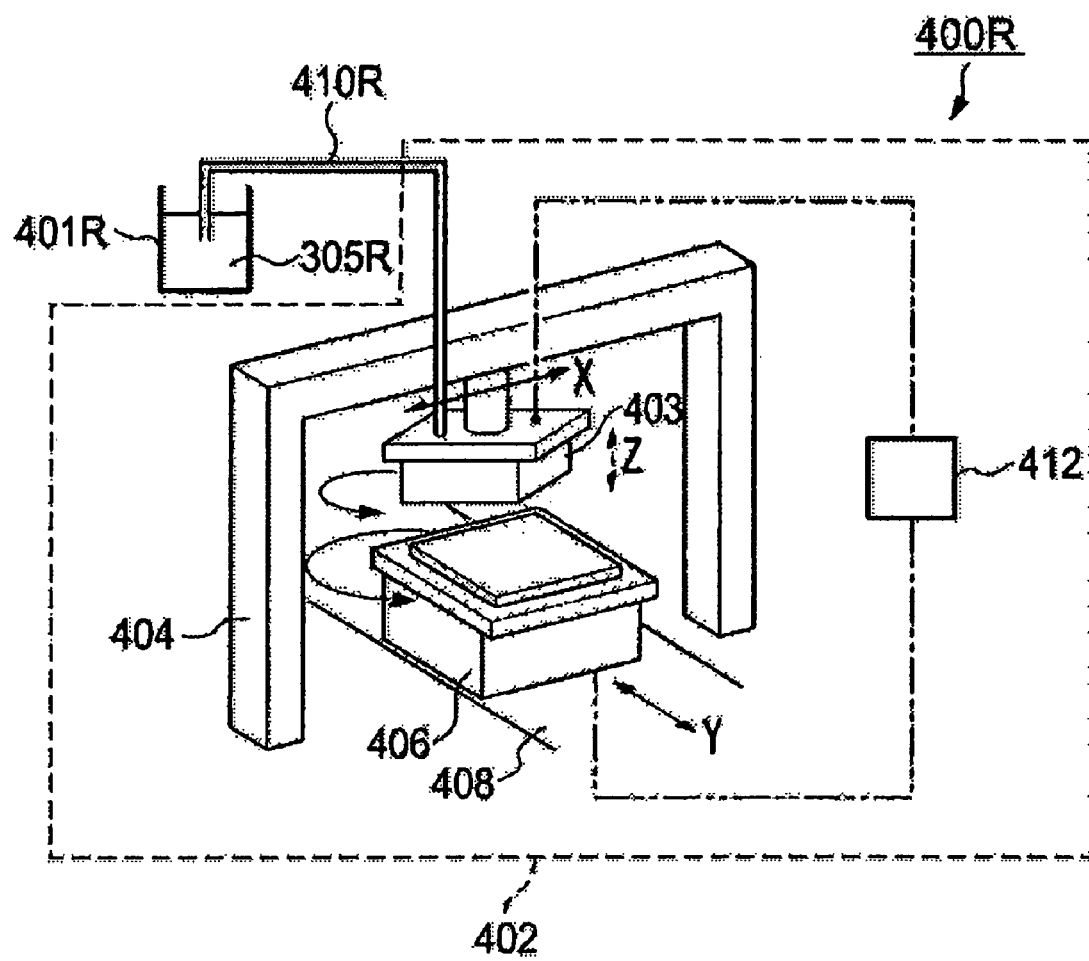
FIG. 14 is a schematic view of the discharging device.

As depicted in FIG. 14, the discharging device 400R includes a tank 401R containing the liquid color filter material 305R therein and a discharge scanning unit 402 to which the color filter material 305R is supplied via a tube 410R from the tank 401R. The discharge scanning unit 402 is provided with a carriage 403 having a plurality of heads 414 (FIG. 15) that are capable of discharging each type of color filter material, a first position control device 404 for controlling the position of the carriage 403, a stage 406 for retaining the substrate 310A, a second position control device 408 for controlling the position of the stage 406, and a controller 412. The tank 401R is connected to the plurality of heads 414 in the carriage 403 by the tube 410R, and the color filter material 305R is fed from the tank 401R to each of the plurality of heads 414 by compressed air.

The liquid color filter material 305R in the present embodiment is an example of the "liquid material" of the present invention. The term "liquid material" refers to a material having a viscosity that can be discharged from a nozzle. In this case, the material may be water-based or oil-based. It is sufficient if the material is provided with fluidity (viscosity) whereby it can be discharged from a nozzle, and a solid substance may be intermixed therein as long as the mixed material has enough viscosity.

The first position control device 404 is provided with a linear motor and moves the carriage 403 in the X-axis direction and the Z-axis direction, which is orthogonal to the X-axis direction, according to a signal from the controller 412. The second position control device 408 is provided with a linear motor and moves the stage 406 along the Y-axis direction, which is orthogonal to both the X-axis direction and the Z-axis direction, according to a signal from the controller 412. The stage 406 has a flat surface that is parallel to both the X-axis direction and the Y-axis direction and is configured such that the substrate 310A can be fixedly supported on this flat surface. The stage 406 fixedly supports the substrate 310A, so that the stage 406 can determine the positions of the deposit portions 350R, 350G, and 350B. The substrate 310A in the present embodiment is also an example of a recipient substrate.

The first position control device 404 also has functionality of rotating the carriage 403 about a prescribed axis parallel to the Z-axis direction. The Z-axis direction is the direction parallel to the vertical direction (in other words, the direction of gravitational acceleration). The X-axis and the Y-axis in the coordinate system of the recipient substrate can be made respectively parallel to the X-axis direction and Y-axis direction relative to the discharging device 400 through the first position control device 404, by being rotated about an axis parallel to the Z-axis direction of the carriage 403. In the present embodiment, the X-axis direction and the Y-axis direction are both directions in which the carriage 403 moves relative to the stage 406. The first position control device 404 and the second position control device 408 are also referred to as "scanning units" in the present specification.

The carriage 403 and the stage 406 are also free to move in other ways besides the parallel and rotational movements described above. However, in the present embodiment, disclosure regarding movement of the carriage 403 and the stage 406 in directions other than those described above is omitted to simplify description.

The controller 412 is adapted to receive from an external information-processing device discharge data that indicate relative position at which the color filter material 305R is to be discharged. A detailed description of the functioning of the controller 412 is given hereinafter.

Figure 15:
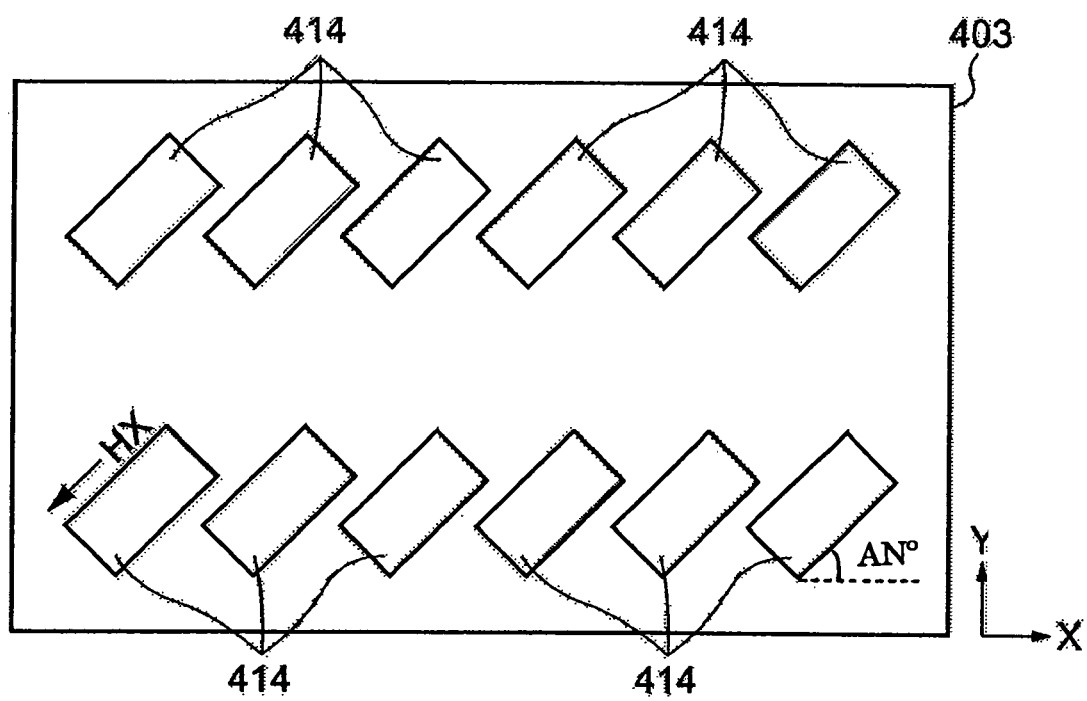
FIG. 15 is a schematic view of the carriage of the discharging device.

As depicted in FIG. 15, the carriage 403 contains a plurality of heads 414 each having the identical structure. FIG. 15 is a diagram depicting the carriage 403 viewed from the stage 406. In other words, the direction perpendicular to the paper surface of the diagram is the Z-axis direction. Two rows of six heads 414 are arranged on the carriage 403 in the present embodiment. The heads 414 are each fixedly coupled to the carriage 403 such that the longitudinal direction of the heads 414 is at an angle AN with respect to the X-axis direction.

Figure 16:
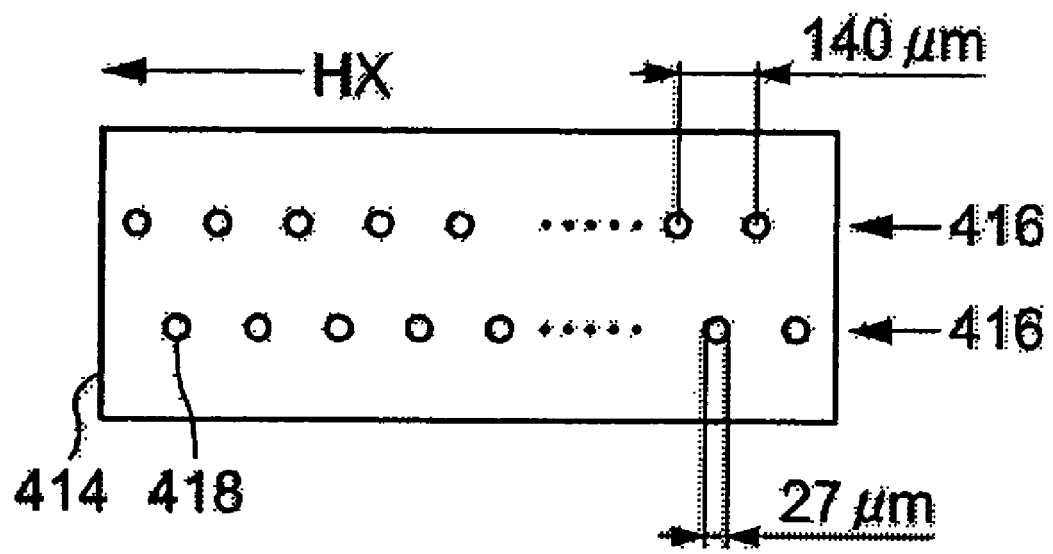
FIG. 16 is a schematic view of the head of the discharging device.

As depicted in FIG. 16, each of the heads 414 for discharging the color filter material 305R has two nozzle rows 416 extending in the longitudinal direction of the head 414. Each nozzle row 416 has 180 nozzles 418 lined up in a row. The interval between the nozzles 418 along the nozzle row direction HX is approximately 140 μm. In FIG. 16, the two nozzle rows 416 in a single head 414 are arranged with a half-pitch offset (approximately 70 μm). Furthermore, the diameter of the nozzles 418 in this embodiment is approximately 27 μm.

As described above, the longitudinal direction of the heads 414 is at an angle AN with respect to the X-axis direction. Accordingly, the nozzle row direction HX, in which the 180 nozzles 418 are lined up, is also at an angle AN with respect to the X-axis direction. The ends of the plurality of nozzles 418 are also arranged on an imaginary plane defined by the above-mentioned X-axis direction and Y-axis direction. Each of the plurality of nozzles 418 is also shaped so that the heads 414 can discharge the material in a direction substantially parallel to the Z-axis.

The angle AN is appropriately set such that at least two of the nozzles 418 simultaneously face some of the plurality of deposit portions 350R lined up in the X-axis direction. By so doing, deposit can be performed on two rows at the same time in one depositing scan. The two nozzles 418 in this case need not be adjacent to each other.

Figure 17:
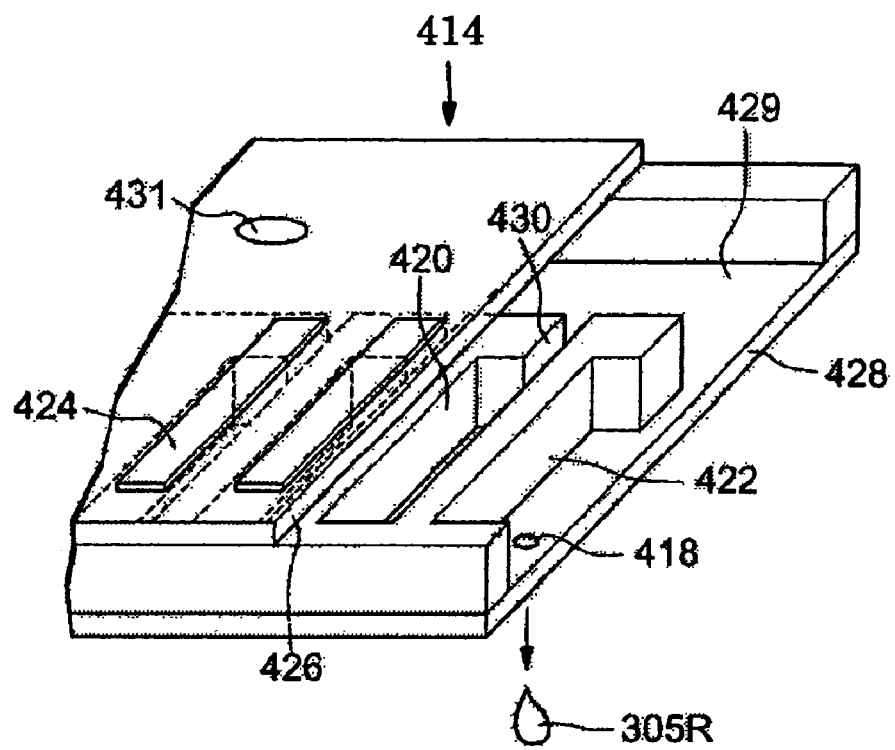
FIG. 17(a) is a detailed oblique view of the structure of the discharge head of the discharging device shown in FIG. 16.
FIG. 17(b) is a cross-sectional view of the discharge portion of the discharging device.
Figure 17:
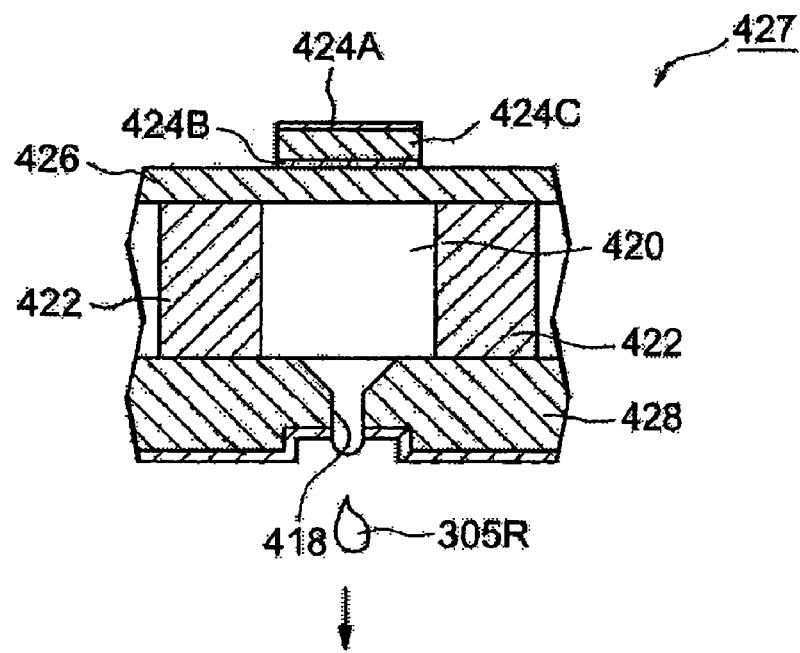

As depicted in FIGS. 17(a) and (b), each of the heads 414 is an inkjet head. More specifically, each of the heads 414 is provided with a diaphragm 426 and a nozzle plate 428. A fluid reservoir 429 that is continuously filled with the color filter material 305R fed from the tank 401R via a hole 431 is positioned between the diaphragm 426 and the nozzle plate 428. A plurality of barriers 422 is also positioned in the space between the diaphragm 426 and the nozzle plate 428. The area enclosed by the diaphragm 426, the nozzle plate 428, and a pair of barriers 422 defines a cavity 420. The cavities 420 are provided for each of the nozzles 418, so the number of cavities 420 is the same as the number of nozzles 418. The color filter material 305R is fed to the cavities 420 from the fluid reservoir 429 via a feeding port 430 positioned between the pair of barriers 422.

A transducer 424 is positioned opposite each of the cavities 420 on the diaphragm 426. The transducer 424 is composed of a piezoelement 424C and a pair of electrodes 424A and 424B that sandwich the piezoelement 424C. The color filter material 305R is discharged from corresponding nozzles 418 by a drive voltage being applied to the pair of electrodes 424A and 424B.

The controller 412 includes a processing unit 455, a storage device (RAM), an input buffer memory 451, a scanning driver 456, and a head driver 458. The processing unit 455 outputs various signals via the drivers 456 and 458 on the basis of the data in the storage device 452 and the input buffer memory 451, and selectively controls each component operatively connected to the controller 412.

The controller 412 is configured so as to give an independent signal to each of the plurality of transducers 424 selectively. The volume of color filter material 305R to be discharged from the nozzles 418 is thereby controlled for each of the nozzles 418 according to the signal from the controller 412. Furthermore, the volume of color filter material 305R to be discharged by each of the nozzles 418 can be varied between 0 pL to 42 pL (pico liters). It is therefore possible to configure the nozzles 418 such that only some of the nozzles 418 perform the discharge during application scanning operation, but not others.

The portion including one nozzle 418, the cavity 420 corresponding to the nozzle 418, and the transducer 424 corresponding to the cavity 420 is also sometimes referred to in the present specification as the discharging portion 427. According to this notation, a single head 414 has a number of discharging portions 427 equivalent to the number of nozzles 418. Alternatively, the discharging portion 427 may have an electrothermal conversion element instead of the piezoelement. In other words, the discharging portion 427 may have a configuration whereby the material is discharged using thermal expansion of the material by an electrothermal conversion element.

As described above, the carriage 403 is moved in the X-axis direction and the Z-axis direction by the first position control device 404 (FIG. 14). On the other hand, the stage 406 (FIG. 14) is moved in the Y-axis direction by the second position control device 408 (FIG. 14). As a result, the positions of the heads 414 can be moved relative to the stage 406 with the first position control device 404 and the second position control device 408. More specifically, the plurality of heads 414, the plurality of nozzle rows 416, or the plurality of nozzles 418 is moved, and therefore the scanning is performed, in a relative fashion in the X-axis direction and in the Y-axis direction while a prescribed distance is maintained in the Z-axis direction in relation to the deposit portions 350R positioned on the stage 406. In further detail, the heads 414 scan in a relative fashion in the X-axis direction and in the Y-axis direction with respect to the stage 406, and the material is discharged from the plurality of nozzles 418. In the present invention, the nozzles 418 may be scanned relatively with respect to the deposit portions 350R, 350G, and 350B, and the material may be discharged from the nozzles 418 onto the deposit portions 350R. The term "relative scanning" includes scanning by moving at least one of the discharging member or the member on which the discharged substance lands (the deposit portions 350R or the like). "Application and scanning" is also used to refer to the combination of relative scanning and material discharge.

Figure 18:
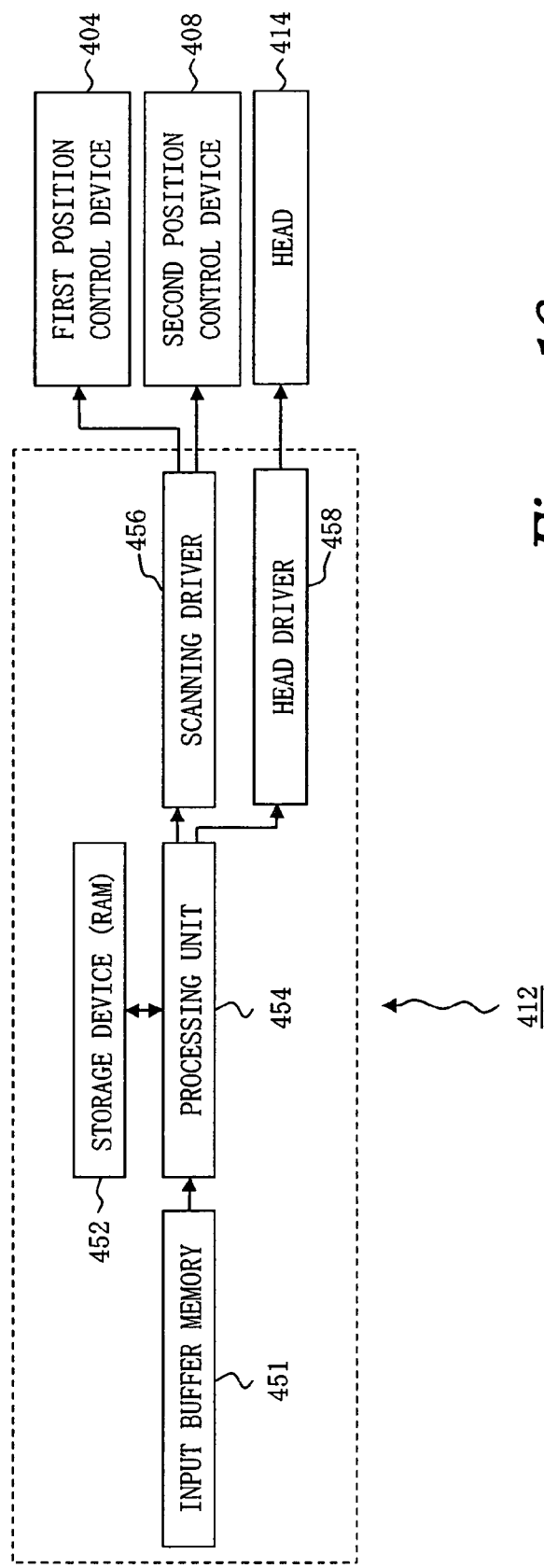
FIG. 18 is a block diagram of the controller of the discharging device.

The configuration of the controller 412 will next be described. As depicted in FIG. 18, the controller 412 is provided with an input buffer memory 451, a storage device 452, a processing unit 454, a scanning driver 456, and a head driver 458. The input buffer memory 451 and processing unit 454 are connected so as to be able to communicate with each other. The processing unit 454 and storage device 452 are connected so as to be able to communicate with each other. The processing unit 454 and scanning driver 456 are also connected so as to be able to communicate with each other. The processing unit 454 and head driver 458 are connected so as to be able to communicate with each other. The scanning driver 456, the first position control device 404, and the second position control device 408 are also connected to one another so as to be able to communicate with each other. The head driver 458 is connected so as to be able to communicate with each of the plurality of heads 414.

The input buffer memory 451 receives discharge data for discharging the color filter material 305R from an external information-processing device. The discharge data include data indicating the relative positions of all of the deposit portions 350R on the substrate 310A; data indicating the positions at which the color material 305R is to be discharged or the positions on which the color filter material 305R is to land; data indicating the number of relative scans needed until a prescribed thickness of color filter material 305R is applied to all of the deposit portions 350R; and data specifying which of the nozzles 418 should discharge the color filter material 305R and which of the nozzles 418 should not. The input buffer memory 451 feeds the discharge data to the processing unit 454, and the processing unit 454 stores the discharge data in the storage device 452. The storage device 452 includes a RAM (Random Access Memory) as shown in FIG. 18.

The processing unit 454 presents the scanning driver 456 with data indicating the relative position of the nozzle rows 416 with respect to the deposit portions 350R on the basis of the discharge data in the storage device 452. The scanning driver 456 gives a drive signal to the first position control device 404 and the second position control device 408 in accordance with these data. Accordingly, the nozzle rows 416 scan the deposit portions 350R. On the other hand, the processing unit 454 presents the head driver 458 with data indicating the discharge timing from corresponding nozzles 418 on the basis of the discharge data stored in the storage device 452. The head driver 458 presents the heads 414 with the drive signal needed to discharge the color filter material 305R on the basis of these data. Accordingly, the liquid color filter material 305R is discharged from the corresponding nozzles 418 in the nozzle rows 416.

The controller 412 is preferably a computer that includes a CPU, ROM, and RAM. In this case, the above-mentioned functions of the controller 412 are performed by a software program executed by the computer. It is apparent to a person of ordinary skill in the art that the functions of the controller 412 may also be performed by a dedicated circuit (hardware).

With the configuration described above, the discharging device 400R performs the application and scanning of the color filter material 305R according to the discharge data obtained from the controller 412.

Above is a description of the configuration of the discharging device 400R. The configurations of the discharging devices 400G, 400B, and 400C are basically the same as the configuration of the discharging device 400R. However, the configuration of the discharging device 400G differs from the configuration of the discharging device 400R in that the discharging device 400G is provided with a tank used for color filter material 305G instead of the tank 401R in the discharging device 400R. In the same manner, the configuration of the discharging device 400B differs from the configuration of the discharging device 400R in that the discharging device 400B is provided with a tank used for color filter material 305B instead of the tank 401R. Furthermore, the configuration of the discharging device 400C differs from the configuration of the discharging device 400R in that the discharging device 400C is provided with a tank used for protective film material instead of the tank 401R.

Method of Manufacturing Liquid Crystal Display Device 300

The method for manufacturing the liquid crystal display device 300 will next be described.

Figure 19:
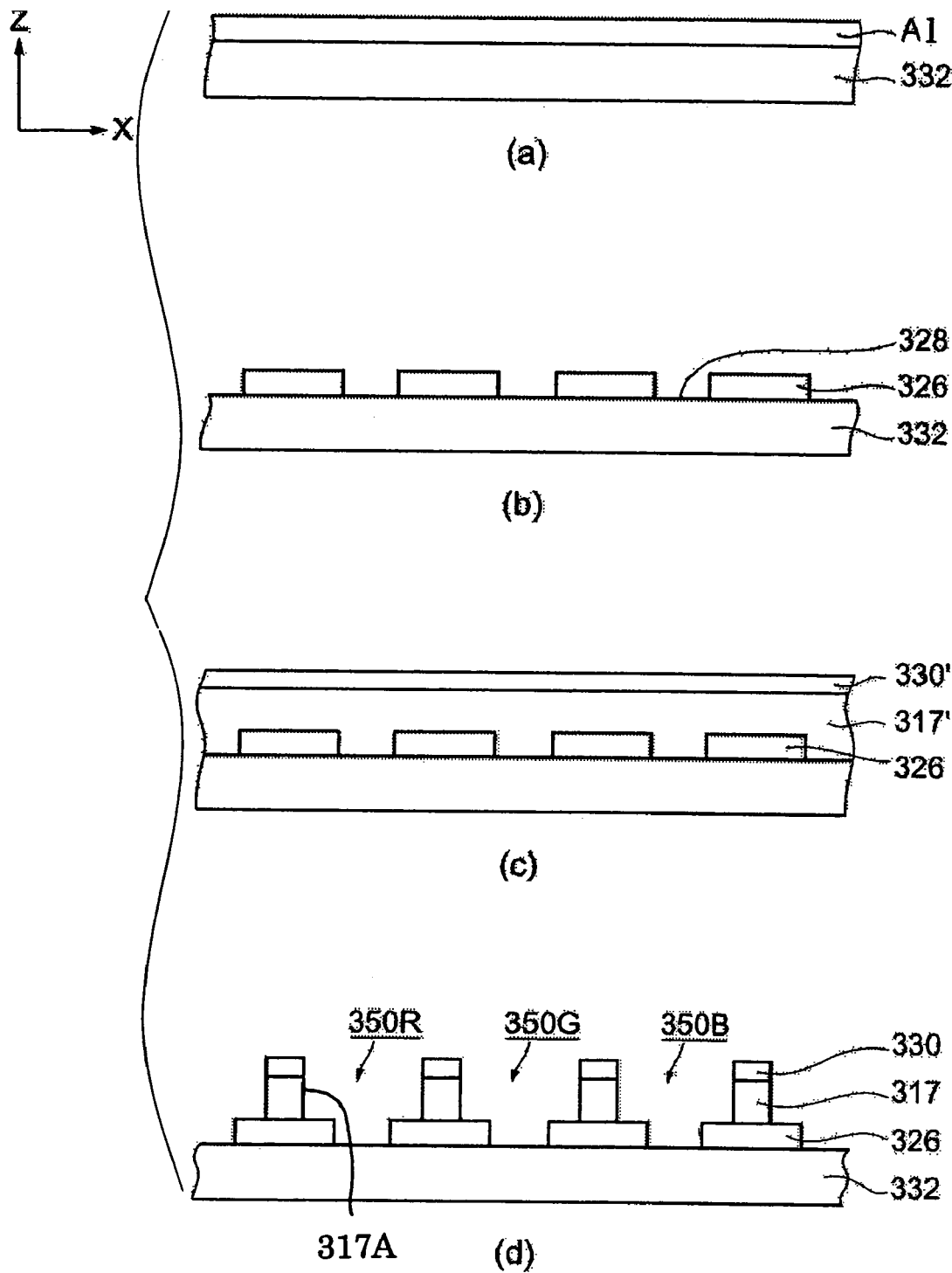
FIG. 19 is a schematic view of the manufacturing process of the color filter substrate according to the third embodiment of the present invention.

First, the reflective portion 326 and the transmissive portion 328 are formed on a light-transmissive member. Specifically, an aluminum (Al) film is formed by sputtering or the like so as to substantially cover the entire surface of a glass substrate or other light-transmissive substrate 332 as depicted in FIG. 19(a). The substrate 332 herein corresponds to the above-mentioned "light-transmissive member." As depicted in FIG. 19(b), the above-mentioned Al film is then patterned so that a reflective portion 326 and a transmissive portion 328 are formed for each pixel area G. Specifically, the Al film is patterned so that the shape of the transmissive portion 328 is substantially rectangular. The Al film remaining on the substrate 332 after the patterning is the reflective portion 326, and the portion from which the Al film is removed is the transmissive portion 328. The reflective portion 326 and the transmissive portion 328 are thereby formed on the light-transmissive member.

The reflective portion 326 is provided directly on the substrate 332 in the present embodiment. However, a protective film or other layer may be provided between the light-transmissive member and the reflective portion 326. The term "substrate 332" as used in the present specification includes the light-transmissive member as well as a protective film or other layer that is provided between the reflective portion 326 and the light-transmissive member.

A layer of first material is then formed covering the reflective portion 326 and the transmissive portion 328. In this embodiment, a thermosetting acrylic resin in which a black pigment is dispersed (resin black) is applied as the first material to a thickness of about 3 μm over the reflective portion 326 and the substrate 332, as depicted in FIG. 19(c). As a result, a resin black layer 317' is obtained. The resin black layer 317' in this case is an example of the "first material layer" of the present invention.

The second material layer is then formed by applying a resist on the first material layer. Specifically, a chemically sensitized negative-type acrylic photosensitive resist in which a fluorinated polymer is blended is applied so as to cover the entire surface of the resin black layer 317' as depicted in FIG. 19(c). As a result, a resist layer 330' is obtained on the resin black layer 317'. The resist layer 330' herein is an example of the "second material layer" of the present invention.

Patterning is then performed on the resist layer 330' and the resin black layer 317'. Specifically, the resist layer 330' is irradiated with light hv via a photomask. The photomask has light-blocking portions at positions that correspond to the pixel areas G. A plurality of portions of the resist layer 330' and the resin black layer 317' not irradiated with the light hv; in other words the portions corresponding to the plurality of pixel areas G, is then removed by etching using a prescribed etching fluid. In this manner, a black matrix 317 and banks 330 that enclose the subsequently formed filter layer are obtained simultaneously on the substrate 332 as depicted in FIG. 19(d). In other words, opening surfaces 317A that correspond to the reflective portion 326 and transmissive portion 328 are obtained.

As described above, the areas defined or enclosed by the black matrix 317, the banks 330, the reflective portions 326, and the transmissive portions 328 are the deposit portions 350R, 350G, and 350B. The banks 330 are also light-transmissive. The black matrix 317 is also an example of the "first layer" of the present invention; and the banks 330 are an example of the "second layer" of the present invention.

Areas (in other words, the deposit portions 350R, 350G, and 350B) compartmentalized by the black matrix 317 and the banks 330 are thus provided in the substrate 310A by forming the black matrix 317 and the banks 330 positioned on the black matrix 317.

Method of Discharging Color Filter Material

The method by which the discharging device 400R discharges the color filter material 305R onto the deposit portions 350R will next be described.

Figure 20:
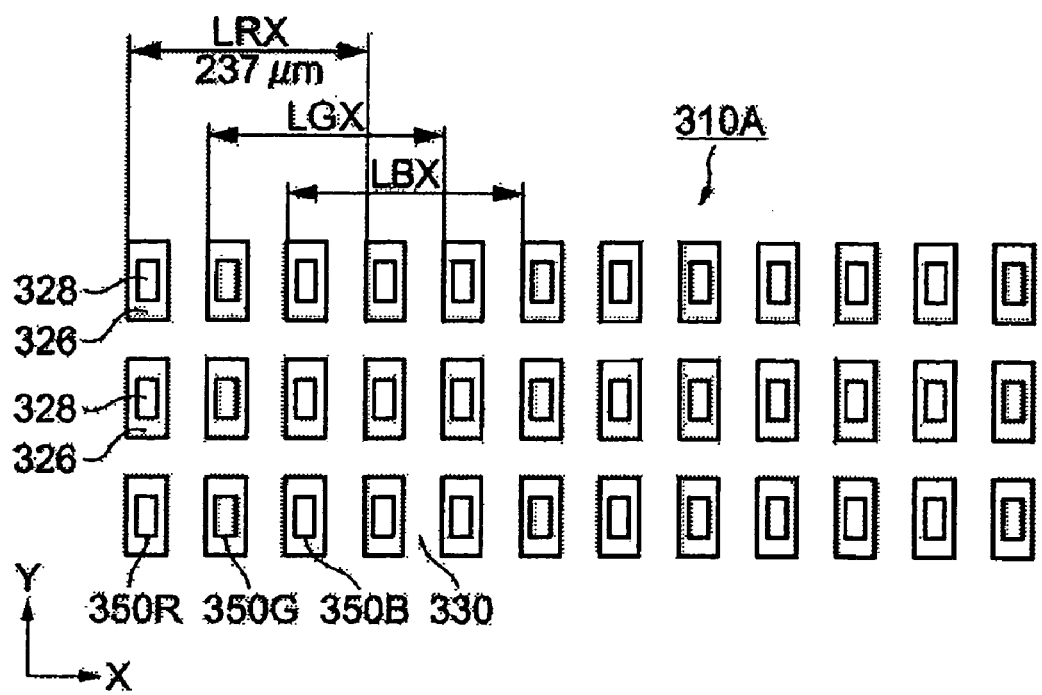
FIG. 20 is a schematic view of the deposit portions of the color filter substrate according to the first through fourth embodiments of the present invention.

In the substrate 310A depicted in FIG. 20, the row direction and column direction of the matrix formed by the plurality of deposit portions 350R, 350G, and 350B are the X-axis direction and the Y-axis direction, respectively. Furthermore, the deposit portions 350R, the deposit portions 350G, and deposit portions 350B are lined up in the X-axis direction in this order with prescribed intervals therebetween. On the other hand, the deposit portions 350R are lined up at prescribed intervals in the Y-axis direction, deposit portions 350G are lined up at prescribed intervals in the Y-axis direction, and the deposit portions 350B are lined up at prescribed intervals in the Y-axis direction.

The interval LRX at which two deposit portions 350R are arranged along the X-axis direction is about 237 μm. This interval LRX is the same as the interval LGX at which two deposit portions 350G are arranged along the X-axis direction, and also the interval LBX at which two deposit portions 350B are arranged along the X-axis direction. The length in the X-axis direction and the length in the Y-axis direction of the deposit portions 350R, 350G, and 350B are approximately 50 μm and approximately 120 μm, respectively.

In the present embodiment, the transmissive portion 328 is concavity formed on the reflective portion 326 in each of the deposit portions 350R, and a step is therefore formed between the transmissive portion 328 and the reflective portion 326 within the deposit portions 350R (FIG. 19(d)). This is because the transmissive portion 328 is an opening on the reflective portion 326 and is formed by removing a portion of the reflective portion 326. Consequently, the size of the step corresponds to the thickness of the reflective portion 326. Similarly, the transmissive portions 328 are also formed as concavities on the reflective portions 326 in the deposit portions 350R, 350G, and 350B.

The transport device 470 first positions the substrate 310A on the stage 406 of the discharging device 400R. Specifically, the row direction and column direction of the matrix formed by the plurality of deposit portions 350R, 350G, and 350B are aligned so as to be parallel to the X-axis direction and Y-axis direction, respectively.

Figure 21:
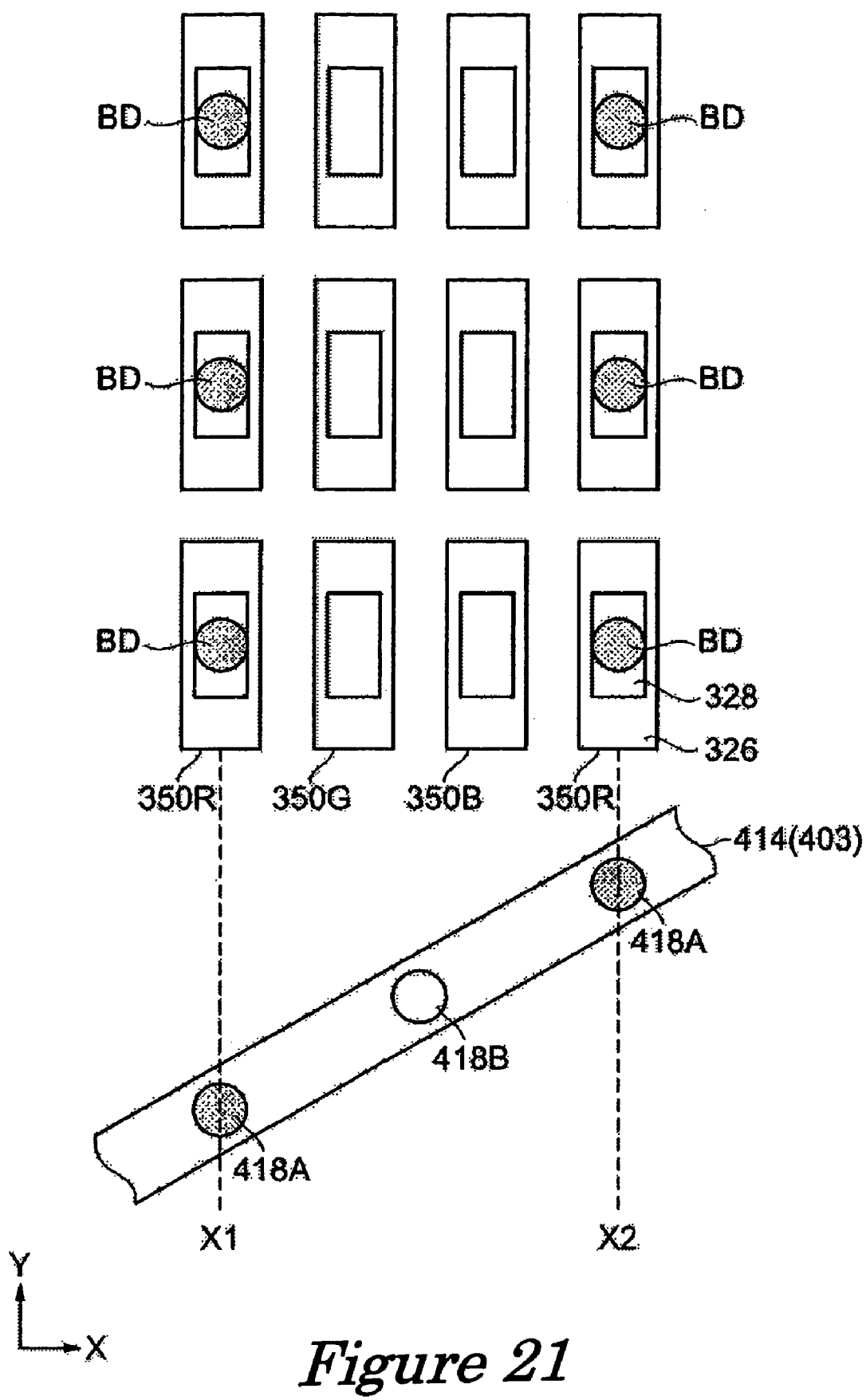
FIG. 21 is a schematic view of the discharging process according to the first through fourth embodiments of the present invention.

Before the first scanning period begins, the discharging device 400R causes the X-coordinates of the nozzles 418 to match the X-coordinates of the deposit portions 350R. Specifically, the X-coordinate of the leftmost nozzle 418 among the nozzles 418 depicted in FIG. 21 is caused to match the X-coordinate X1 of the leftmost column among the columns of deposit portions 350R depicted in FIG. 21. In the mean time, the X-coordinate of the rightmost nozzle 418 among the nozzles 418 depicted in FIG. 21 is caused to match the X-coordinate X2 of the rightmost column among the columns of deposit portions 350R depicted in FIG. 21. The nozzles 418 corresponding to the deposit portions 350R are also referred to as the first nozzles 418A. The nozzles 418 that do not correspond to the deposit portions 350R are also referred to as the second nozzles 418B.

Figure 24:
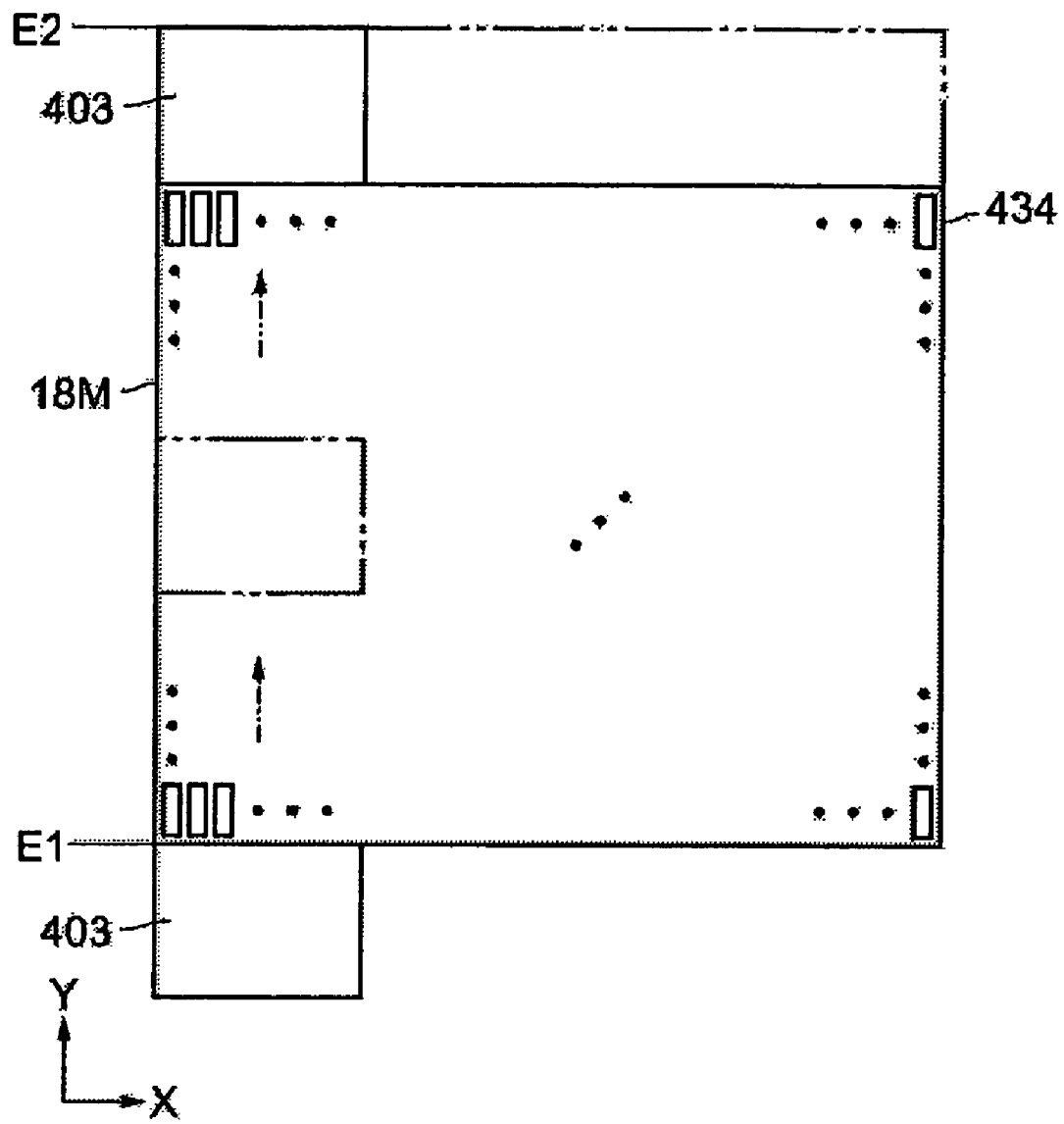
FIG. 24 is a schematic view of the scanning range according to the third and fourth embodiments of the present invention

The term "scanning period" in the present embodiment refers to the period in which one end of the carriage 403 moves along the Y-axis direction from one end E1 (or the other end E2) of the scanning range 434 to the other end E2 (or the one end E1) relatively in order to apply the material to all the deposit portions 350R that are aligned in the Y-axis direction, as depicted in FIG. 24. Furthermore, the term "scanning range 434" in the present embodiment refers to the range that one end of the carriage 403 moves relative to the matrix 18M until the color filter material 305R is applied to all of the deposit portions 350R of the matrix 18M. However, the term "scanning range" may also refer to the range of relative travel of a single nozzle 418, the range of relative travel of a single nozzle row 416, or the range of relative travel of a single head 414. The term "matrix 18M" refers to the matrix constituted by the deposit portions 350R, 350G, and 350B.

The relative travel of the carriage 403, the heads 414, or the nozzles 418 refers to the change in the relative positions of these components with respect to the deposit portions 350R. Therefore, the carriage 403, the heads 414, or the nozzles 418 are said to travel in relative fashion even when the carriage 403, the heads 414, or the nozzles 418 are absolutely still and only the deposit portions 350R are moved by the stage 406.

As depicted in FIG. 21, when the first scanning period begins, the carriage 403 moves in a relative fashion in the positive Y-axis direction (upward in the drawing) from the end E1 of the scanning range 434. When first nozzles 418A enter the area that corresponds to the deposit portions 350R, the color filter material 305R is then discharged into the corresponding deposit portions 350R from the first nozzles 418A during the first scanning period. More specifically, when the nozzles 418A enter the area that corresponds to the transmissive portion 328 in the deposit portions 350R, the first nozzles 418A discharge the color filter material 305R. In the example depicted in FIG. 21, the color filter material 305R is discharged once for each of the deposit portions 350R during the first scanning period. In FIG. 21, the positions or the landing positions BD, at which the nozzles 418A discharge the color filter material 305R, are indicated with black circles.

Figure 22:
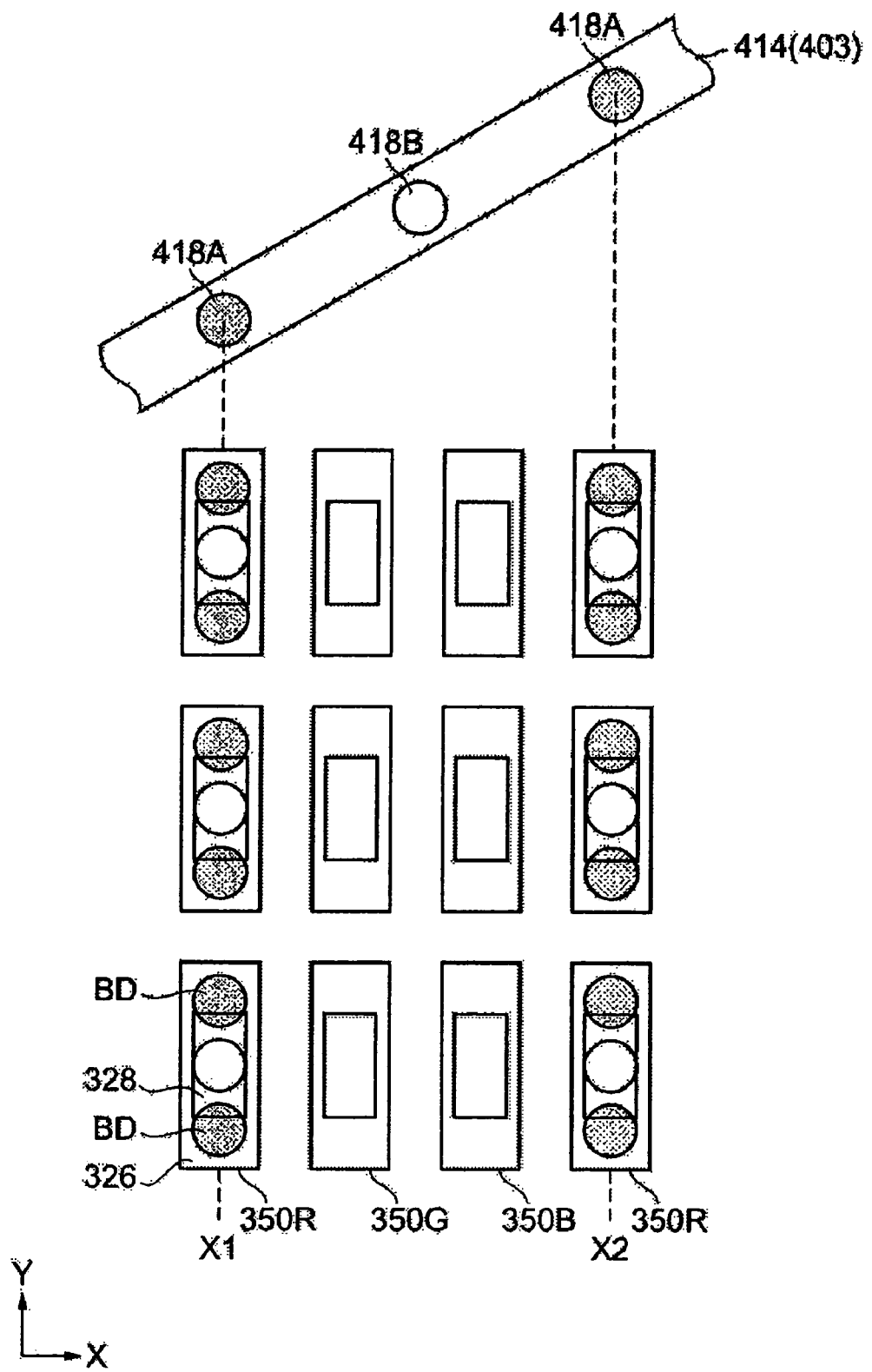
FIG. 22 is a schematic view of the discharging process according to the first through fourth embodiments of the present invention.

As depicted in FIG. 22, the second scanning period begins following the first scanning period, whereupon the carriage 403 begins to move in relative fashion from one end E2 of the scanning range 434 in the negative Y-axis direction (downward in the drawing). When the first nozzles 418A enter the area that corresponds to the deposit portions 350R, the color filter material 305R is discharged into the corresponding deposit portions 350R from the first nozzles 418A during the second scanning period. More specifically, when the nozzles 418A enter the area opposite the transmissive portion 328 in the deposit portions 350R, the first nozzles 418A discharge the color filter material 305R. In the example depicted in FIG. 22, the color filter material 305R is discharged twice onto each of the deposit portions 350R during the second scanning period. In FIG. 22, the positions at which the nozzles 418A discharge the color filter material 305R, or, the landing positions BD, are indicated with black circles. The positions at which the color filter material 305R is discharged during the first scanning period are also indicated with white circles in FIG. 22.

The discharging device 400R then moves the carriage 403 in the X-coordinate direction in a stepwise fashion and discharges the color filter material 305R as described above in all of the deposit portions 350R in the substrate 310A.

The discharging method described above will be described with reference to FIG. 23 with regard to one of the deposit portions 350R.

Figure 23:
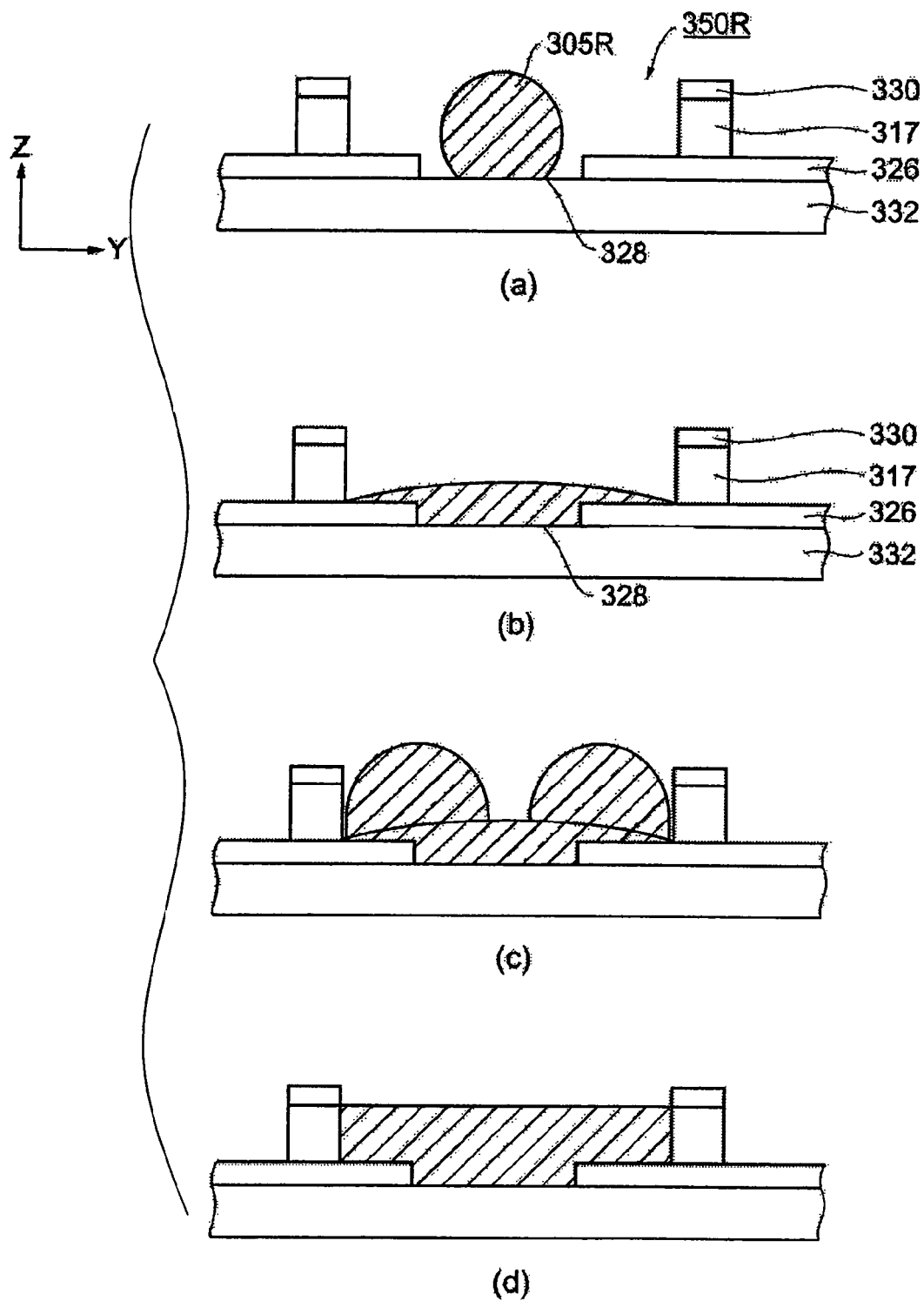
FIG. 23 is a schematic view of the discharging process according to the third embodiment of the present invention.

FIG. 23 is a Y-Z cross-sectional diagram depicting a deposit portion 350R. In other words, the left-right direction of the paper in FIG. 23 is the longitudinal direction of the deposit portion 350R. As depicted in FIG. 23(*a*), the color filter material 305R is discharged onto the transmissive portion 328 during the first scanning period. As depicted in FIG. 23(*b*), when the color filter material 305R lands in the transmissive portion 328, the color filter material 305R covers not only the transmissive portion 328 but also spreads out to cover the step positions at the boundary between the transmissive portion 328 and the reflective portions 326. As depicted in FIG. 23(*c*), the color filter material 305R is discharged into the portions substantially corresponding to the reflective portions 326 during the second scanning period. In this case, the droplets of the color filter material 305R may be caused to land such that a portion thereof overlaps the transmissive portion 328. As depicted in FIG. 23(*d*), the solvent is then evaporated from the color filter material 305R discharged in the first and second scanning periods, and a layer of color filter material 305R is formed in the deposit portion 350R. The filter layer 305FR is formed by further drying the layer in FIG. 23(*d*).

With the discharging method described above, a liquid material is first discharged onto the concaved transmissive portion, and then onto the reflective portion. Accordingly, the liquid material not only covers the concaved transmissive portion and the reflective portion, but also the vicinity of the step between the reflective portion and the concaved transmissive portion. As a result, the color filter substrate 310 of the semi light-transmissive reflective display device 300 can easily be manufactured with an ink-jet device or other discharging device.

The discharging method described above is also applicable in discharging droplets 150 to form the color filters 40 and 45 of the first and second embodiments. In the cases of the color filters 40 and 45, the droplet is first deposited onto the deposit portion 7, and then onto the transparent coat layer 25.

Method of Manufacturing Color Filter Substrate 310

In the method described above, the discharging device 400R discharges the color filter material 305R into the deposit portion 350R. The series of methods by which the color filter substrate 310 is manufactured by the manufacturing apparatus 400 will be described below.

Figure 25:
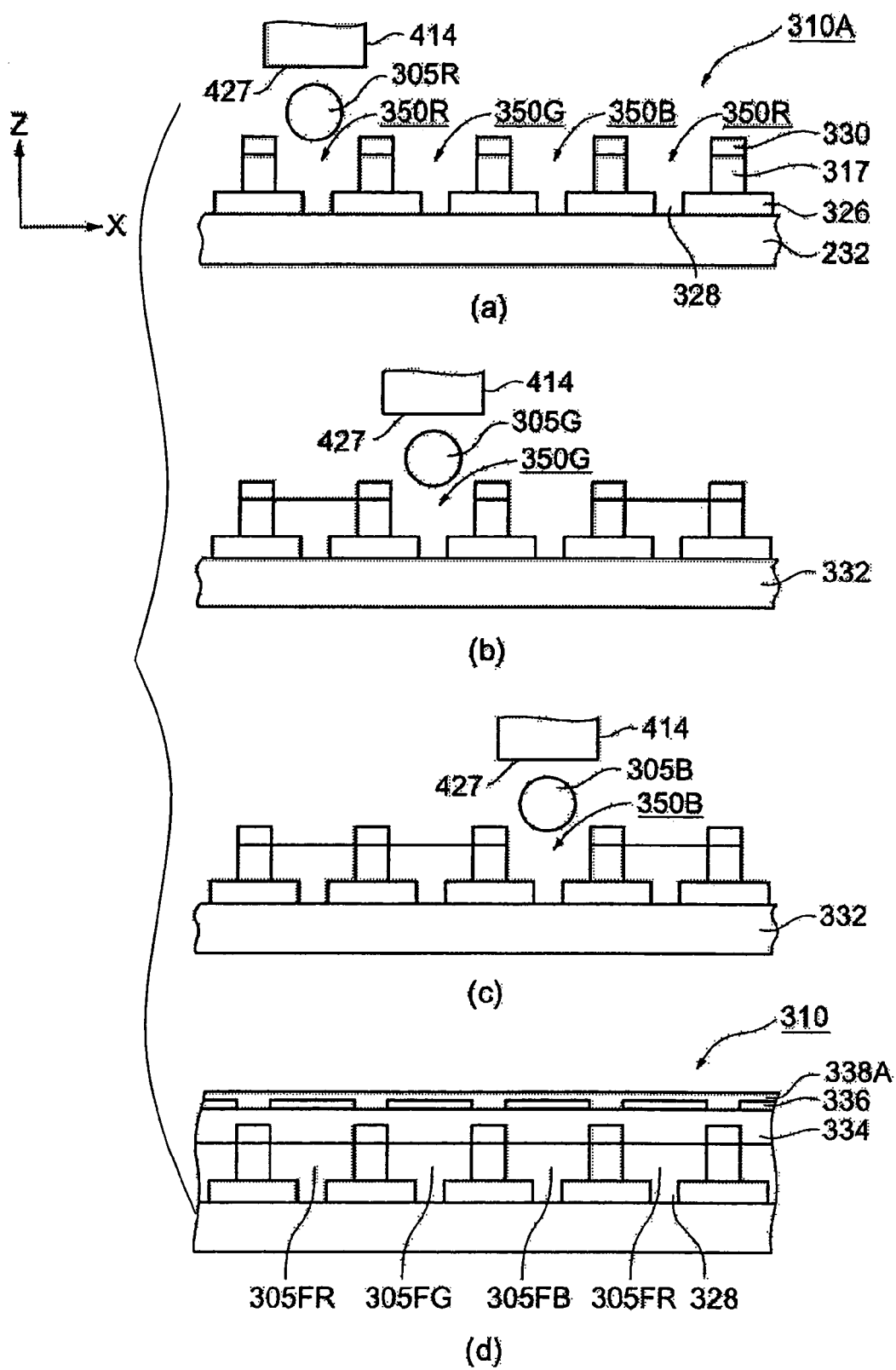
FIG. 25 is a schematic view of the discharging process according to the third embodiment of the present invention.

Referring to FIG. 13, the substrate 310A on which the deposit portions 350R, 350G, and 350B are formed is transported to the stage 406 of the discharging device 400R by the transport device 470. The manufacturing apparatus 400 then discharges the color filter material 305R from the discharging portion 427 of the head 414 so that a layer of color filter material 305R is formed in all of the deposit portions 350R as depicted in FIG. 25(*a*). The method whereby the discharging device 400G discharges the color filter material 305R was described with reference to FIGS. 21, 22, and 23. When a layer of color filter material 305R is formed in all of the deposit portions 350R of the substrate 310A, the transport device 470 positions the substrate 310A in the drying device 450R. The filter layer 305FR is obtained on the deposit portion 350R by completely drying the color filter material 305R on the deposit portions 350R.

The transport device 470 then positions the substrate 310A on the stage 406 of the discharging device 400G. As depicted in FIG. 25(*b*), the discharging device 400G discharges the color filter material 305G from the discharging portion 427 of the head 414 so that a layer of color filter material 305G is formed in all of the deposit portions 350G. The method whereby the discharging device 400G discharges the color filter material 305G is the same as the method of discharging the color filter material 305R described with reference to FIGS. 21, 22, and 23. When a layer of the color filter material 305G is formed in all of the deposit portions 350G of the substrate 310A, the transport device 470 positions the substrate 310A in the drying device 450G. The filter layer 305FG is obtained on the deposit portion 350G by completely drying the color filter material 305G on the deposit portions 350G.

The transport device 470 then positions the substrate 310A on the stage 406 of the discharging device 400B. As depicted in FIG. 25(*c*), the discharging device 400B discharges the color filter material 305B from the discharging portion 427 of the head 414 so that a layer of the color filter material 305B is formed in all of the deposit portions 350B. The method whereby the discharging device 400B discharges the color filter material 305B is the same as the method of discharging the color filter material 305R described with reference to FIGS. 21, 22, and 23. When the layer of color filter material 305B is formed in all of the deposit portions 350B of the substrate 310A, the transport device 470 positions the substrate 310A in the drying device 450B. The filter layer 305FB is obtained on the deposit portion 350B by completely drying the color filter material 305B on the deposit portions 350B.

The banks 330 in the present embodiment possess a liquid repellency against the liquid color filter materials 305R, 305G, and 305B. Furthermore, the liquid repellency of the black matrix 317 against the color filter materials 305R, 305G, and 305B is smaller than the liquid repellency of the banks 330 against the color filter materials 305R, 305G, and 305B. The black matrix 317 rather possesses lyophilic properties toward the liquid color filter materials 305R, 305G, and 305B. This is because a fluorinated polymer is blended into the banks 330, whereas the black matrix 317 does not contain a fluorinated polymer. Generally, a surface of a resin that contains fluorine demonstrates a higher liquid repellency against a dispersion medium contained in a liquid color filter material than a surface of a resin that does not contain fluorine therein. On the other hand, most resins that do not contain fluorine are lyophilic toward the above-mentioned liquid material.

According to the present embodiment, the banks 330 have a relatively high liquid repellency. Therefore, droplets of color filter material that have just landed on the deposit portions 350R, 350G, and 350B flow out towards the black matrix 317, instead of flowing over the banks 330 and out of the deposit portions 350R, 350G, and 350B. Furthermore, since both a layer having the desired liquid repellency and a lyophilic layer are formed, there is no need to perform a surface modification process for making the black matrix 317 and the banks 330 liquid repellent or lyophilic. For instance, there is no need to perform a plasma treatment that uses tetrafluoromethane as a treatment gas or an oxygen plasma treatment, for example.

Referring back to FIG. 13, the transport device 470 then positions the substrate 310A inside the oven 460. The oven 460 reheats (post-bakes) the filter layers 305FR, 305FG, and 305FB.

The transport device 470 then positions the substrate 310A on the stage 406 of the discharging device 400C. The discharging device 400C discharges a liquid material so that the flattening layer 334 is formed covering the filter layers 305FR, 305FG, and 305FB and the banks 330. After the flattening layer 334 is formed to cover the filter layers 305FR, 305FG, and 305FB and the banks 330, the transport device 470 positions the substrate 310A inside the drying device 450C. The drying device 450C completely dries the flattening layer 334, and then the curing device 465 heats and completely cures the flattening layer 334.

A plurality of electrodes 336 is then formed on the flattening layer 334, and an orientation film 338A is provided for covering the plurality of electrodes 336 and the flattening layer 334. In this manner, the substrate 310A becomes the color filter substrate 310 as depicted in FIG. 25(d).

The color filter substrate 310 and the separately manufactured opposing substrate 312 are then bonded to each other such that the orientation film 338A and the orientation film 338B face each other across an intervening spacer. Liquid crystal material is then filled into the space between the orientation films 338A and 338B. Polarizing plates 320A and 320B are provided, and then a light source 316 is provided. In this manner, a liquid crystal display device 300 is obtained.

Fourth Embodiment

Figure 26:
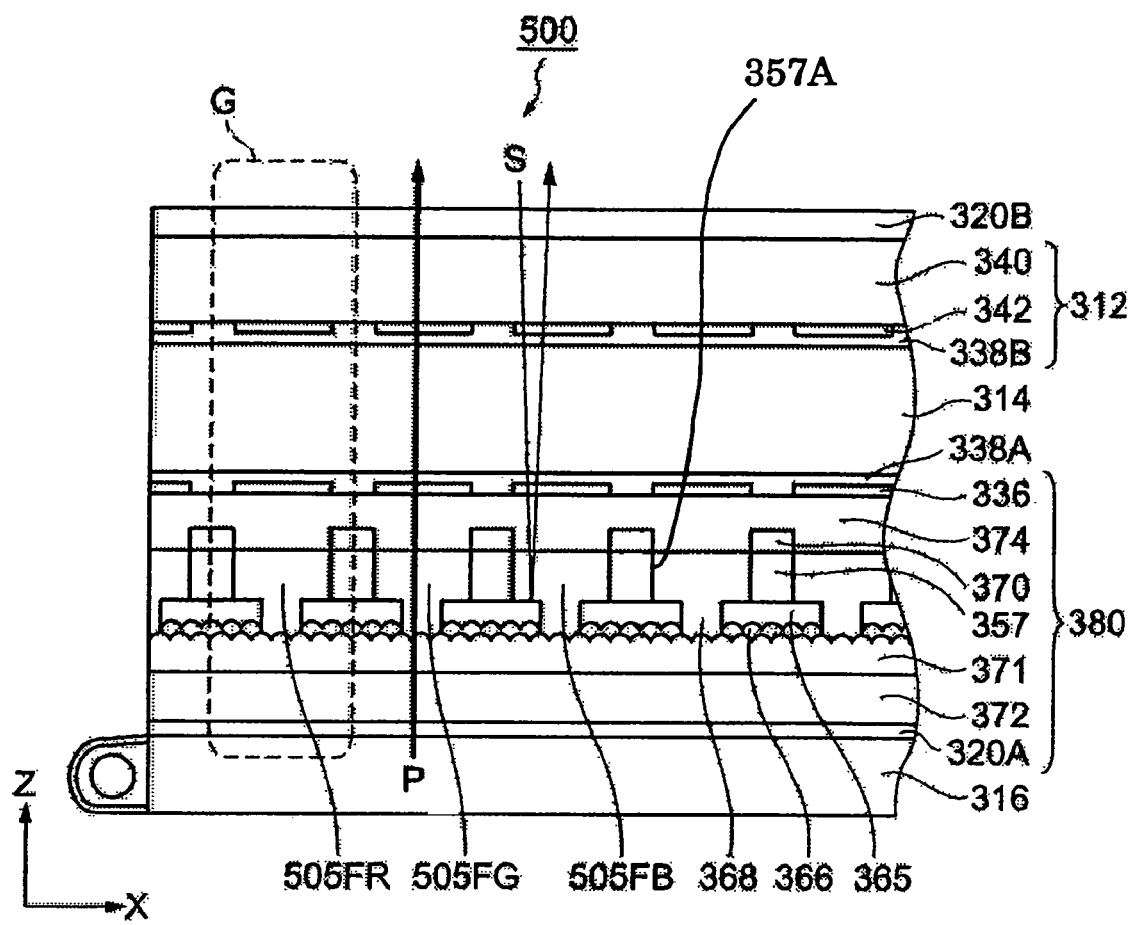
FIG. 26 is a cross-sectional view of the liquid crystal display device according to the fourth embodiment of the present invention.
Figure 27:
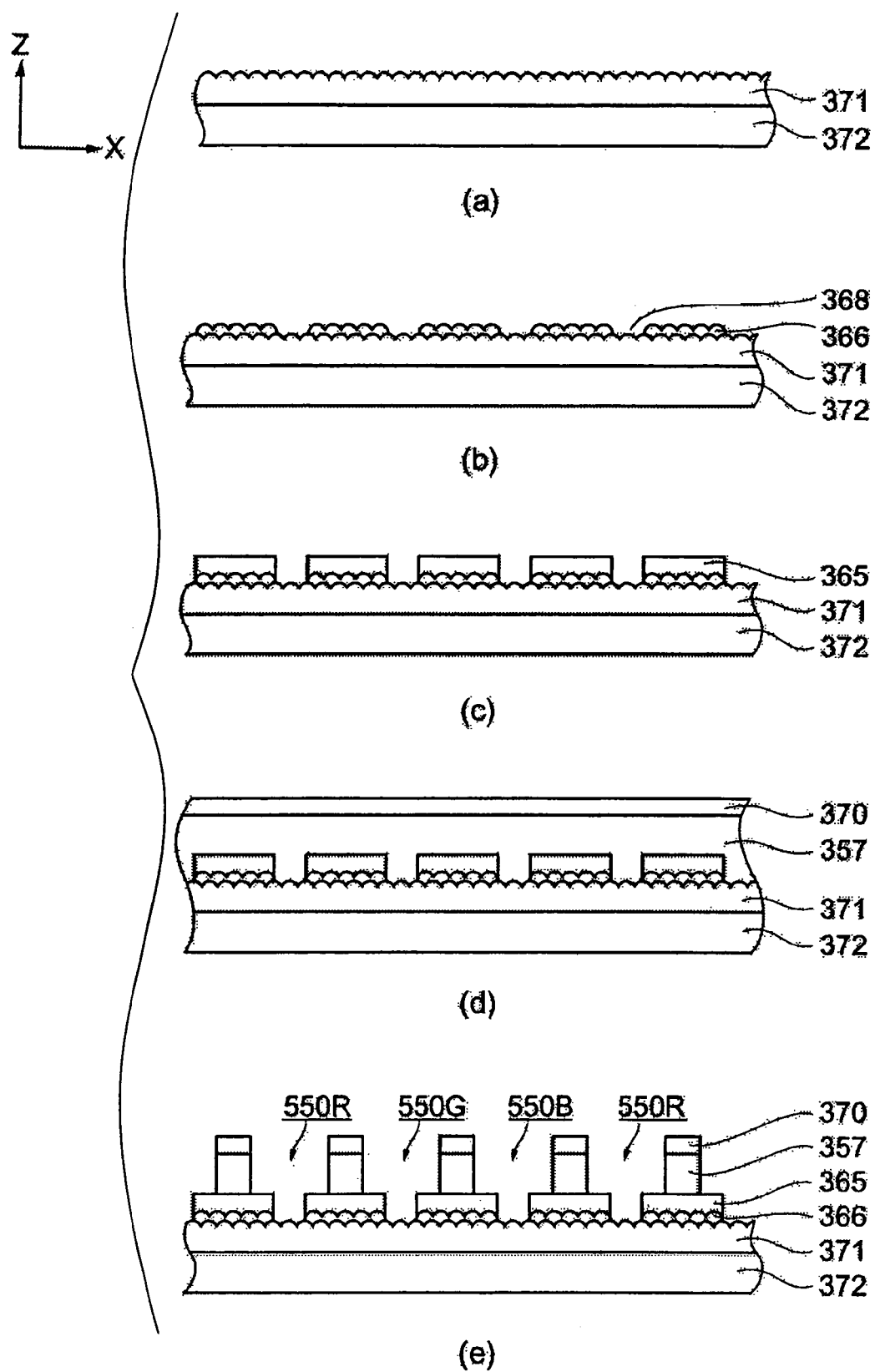
FIG. 27 is a schematic view of the process of manufacturing the color filter substrate according to the fourth embodiment of the present invention.
Figure 28:
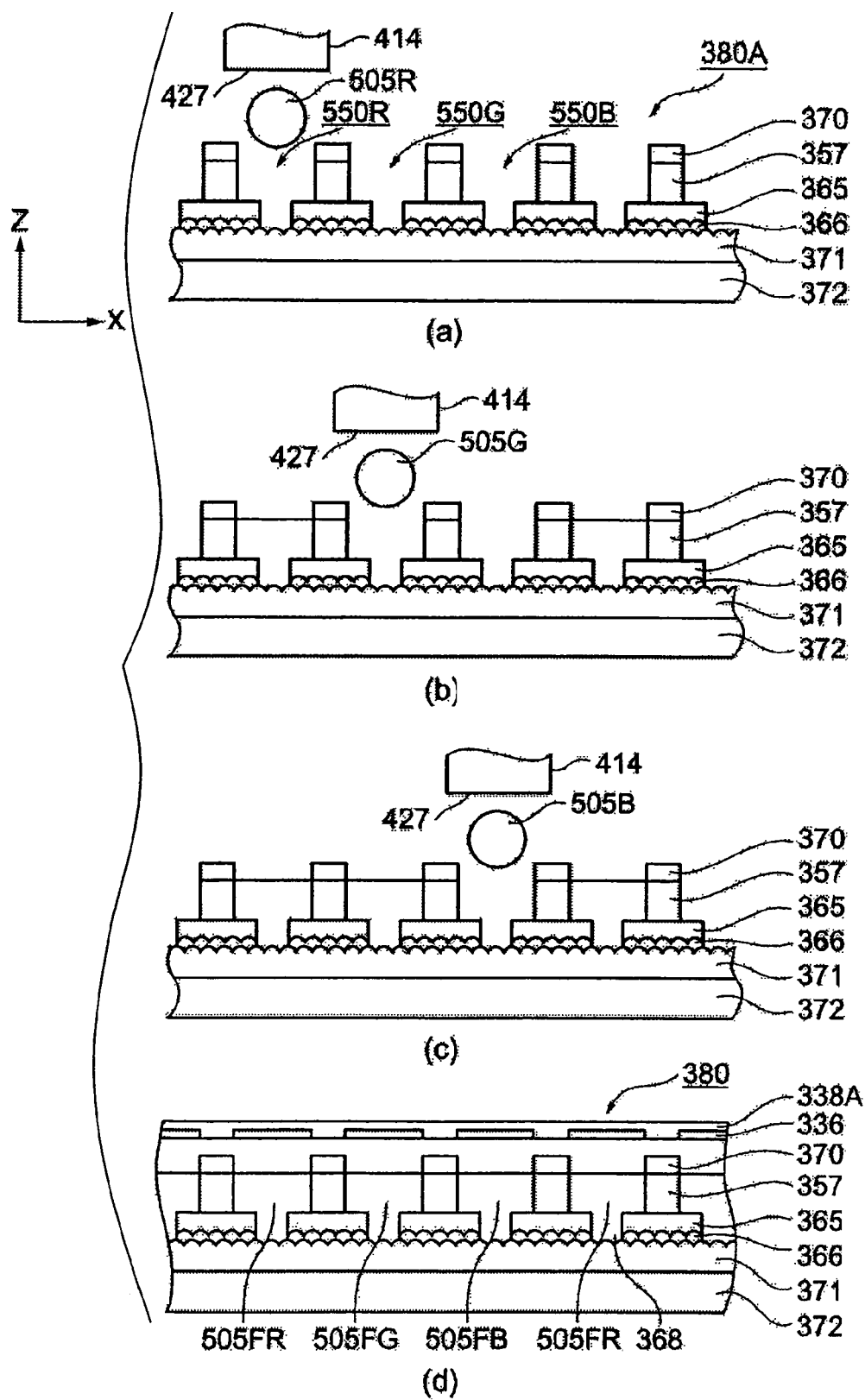
FIG. 28 is a schematic view of the discharging process according to the fourth embodiment of the present invention.

Referring now to FIG. 26-28, a liquid crystal display 500 in accordance with a fourth embodiment will now be explained. The structure of the liquid crystal display device 500 of the fourth embodiment is essentially the same as the structure of the liquid crystal display device 300 of the third embodiment, except that the color filter substrate 310 in the liquid crystal display device 300 of the third embodiment is substituted with the color filter substrate 380 in the fourth embodiment. In view of the similarities between the third and fourth embodiments, the same referential numerals are used for constituent elements in FIG. 26 that are the identical to the constituent elements described of the third embodiment. Furthermore, descriptions of the identical elements will be omitted herein.

The liquid crystal display device 500 depicted in FIG. 26 is provided with a polarizing plate 320A, a polarizing plate 320B, a color filter substrate 380, an opposing substrate 312, a liquid crystal layer 314, and a light source 316. The liquid crystal layer 314 is positioned between the color filter substrate 380 and the opposing substrate 312. The color filter substrate 380 is also positioned between the liquid crystal layer 314 and the light source 316. The color filter substrate 380, the liquid crystal layer 314, and the opposing substrate 312 are positioned between the polarizing plates 320A and 320B.

The color filter substrate 380 includes a light-transmissive substrate 372; a resin scattering layer 371; a reflective portion 366; a transmissive portion 368; a transparent coat layer 365; a plurality of filter layers 505FR, 505FG, and 505FB; a black matrix 357; banks 370; a flattening layer 374; a plurality of electrodes 336; and an orientation film 338A. In the present embodiment, the light-transmissive substrate 372 is positioned between the polarizing plate 320A on the one side, and the reflective portions 366 and transmissive portions 368 on the other side.

The resin scattering layer 371 is provided so as to cover the substrate 372. Furthermore, the reflective portion 366 and the transmissive portion 368 are positioned on the resin scattering layer 371. The reflective portion 366 and the transmissive portion 368 are both positioned in areas opposite the plurality of filter layers 505FR, 505FG, and 505FB, respectively. In the present embodiment, the reflective portions 366 are formed by an aluminum film, while the transmissive portions 368 are openings formed on the aluminum film.

The resin scattering layer 371 is provided with an irregular surface. The reflecting surface of the reflective portions 366 formed on the resin scattering layer 371 is therefore also formed with an irregular, rugged surface. The reflecting surface of the reflective portion 366 has an irregular shape, and thereby functions to reflect light in random directions.

The transparent coat layer 365 provided positioned on the reflective portion 366. The transparent coat layer 365 is patterned in the same shape as the reflective portion 366. One object of providing the transparent coat layer 365 is to reduce the color purity of the reflected light.

The black matrix 357 is positioned on a portion of the transparent coat layer 365. The black matrix 357 has a plurality of opening surfaces 357A. Specifically, the black matrix 357 is a light-blocking portion having a shape that defines the plurality of opening surfaces 357A. The plurality of opening surfaces 357A is arranged in a matrix, such that each of the opening surfaces 357A corresponds to a pixel area G. The black matrix 357 is an example of the "first layer" of the present invention.

Each of the plurality of filter layers 505FR, 505FG, and 505FB corresponds to one of the three colors. Specifically, the filter layer 505FR is a filter corresponding to red, the filter layer 505FG is a filter corresponding to green, and the filter layer 505FB is a filter corresponding to blue. The plurality of filter layers 505FR, 505FG, and 505FB is positioned on each of the plurality of opening surfaces 357A.

The banks 370 are formed on the black matrix 357. The planar shape of the banks 370 is the same as the planar shape of the black matrix 357. As described in detail hereinafter, the liquid repellency of the banks 370 against the liquid color filter material for forming the filter layers 505FR, 505FG, and 505FB is higher than the liquid repellency of the black matrix 357 against the color filter material. The banks 350 are an example of the "second layer" of the present invention.

The flattening layer 374 is positioned so as to cover the plurality of filter layers 505FR, 505FG, and 505FB and the banks 370. Specifically, the flattening layer 374 covers a step formed between the filter layers 505FR, 505FG, and 505FB and the banks 370, such that a substantially flat surface is obtained. A plurality of electrodes 336 is positioned on the flattening layer 374. The electrodes 336 are arranged in stripes that extend in the Y-axis direction (the direction perpendicular to the plane of paper in FIG. 26) and are parallel to each other. The orientation film 338A is positioned so as to cover the plurality of electrodes 336 and the flattening layer 374. A rubbing treatment is performed on the orientation film 338A in a prescribed direction.

As described above, reflective portions 366 and a transmissive portion 368 are each positioned in the color filter substrate 380 opposite one of the filter layers 505FR, 505FG, and 505FB. The liquid crystal display device 500 having this type of color filter substrate 380 functions in the manner described below.

When the backlight (light source 316) is used, a light beam P from the backlight passes through the transmissive portion 368 after being transmitted through the polarizing plate 320A and the substrate 372. The light beam that passed through the transmissive portion 368 then enters one of the filter layers 505FR, 505FG, and 505FB, such that a light beam of the corresponding wavelength exits from the filter layers 505FR, 505FG, and 505FB. The light beam (colored light) from the filter layers 505FR, 505FG, and 505FB is further transmitted through the liquid crystal layer 314 and the opposing substrate 312 and exits from the polarizing plate 320B. The intensity of the light beam that exits from the polarizing plate 320B can be adjusted by adjusting the light beam from the backlight according to the voltage applied between the electrodes 336 and the electrodes 342.

On the other hand, when external light is used, the external light S is transmitted through the polarizing plate 320B, the opposing substrate 312, and the liquid crystal layer 314, and is directed to one of the filter layers 505FR, 505FG, and 505FB. From among the light beams transmitted through the filter layers 305FR, 305FG, and 305FB, the light beam that is reflected by the reflective portion 326 is transmitted again through the filter layers 305FR, 305FG, and 305FB, and is colored in the corresponding color. Each type of colored light is again transmitted through the liquid crystal layer 314 and the opposing substrate 312, and is emitted from the polarizing plate 320B. The intensity of the light beam that originates as the external or other light beam and exits from the polarizing plate 320B is adjusted by adjusting the voltage applied between the electrodes 336 and the electrodes 342.

With the configuration described above, the first light beam that enters from the first side (upper side in FIG. 26) of the black matrix 357 and passes through one of the filter layers 505FR, 505FG, and 505FB is reflected to the first side by the reflective portion 366. On the other hand, the second light beam that enters from the second side (bottom side in FIG. 26) of the black matrix 357 exits to the first side via the transmissive portion 368 and one of the filter layers 505FR, 505FG, and 505FB. The first side of the black matrix 357 is defined as the side on which the flattening layer 374 and liquid crystal layer 314 are positioned. The second side of the black matrix 357 is defined as the side on which the light source 316 is positioned.

Thus, the liquid crystal display device 500 is capable of displaying an image using both external light and light from a backlight. The liquid crystal display device 500 having this type of functionality is referred to as a semi light-transmissive reflective display device.

The filter layers 505FR, 505FG, and 505FB in the color filter substrate 380 are formed on the opening surfaces 357A of the black matrix 357 by discharging a color filter material from an inkjet device or other discharging device.

In the present embodiment, the color filter substrate 380 prior to being provided with the filter layers 505FR, 505FG, and 505FB is referred to as the "substrate 350A." The areas in which the filter layers 505FR, 505FG, and 505FB are to be provided are also referred to as the "deposit portions 550R, 550G, and 550B" in the present embodiment. According to this notation, the concave portions in the substrate 380A enclosed by the banks 370, the black matrix 357, the transparent coat layer 365, and the transmissive portion 368 correspond to the deposit portions 550R, 550G, and 550B, in the present embodiment.

Method of Manufacturing Liquid Crystal Display Device 500

The method for manufacturing the liquid crystal display device 500 will next be described.

First, the reflective portion 326 and the transmissive portion 328 are formed on a light-transmissive member. Specifically, a polyimide or other light-transmissive resin layer is formed by spin coating or other method so as to substantially cover the entire surface of a glass substrate or other light-transmissive substrate 372 as depicted in FIG. 27(a), such that the surface of the resin layer is given an irregular rugged shape by blasting or other method. As a result, a resin scattering layer 371 is obtained. The resin scattering layer 371 herein corresponds to the above-mentioned "light-transmissive member." An aluminum (Al) film is then formed on the resin scattering layer 371 by sputtering or other method. As depicted in FIG. 27(b), the above-mentioned Al film is then patterned so that reflective portions 366 and a transmissive portion 368 are formed for each pixel area G. The Al film remaining on the resin scattering layer 371 after patterning is the reflective portions 366, and the portions from which the Al film is removed are the transmissive portions 368. The reflective portions 366 and the transmissive portion 368 are thereby formed on the light-transmissive member.

The transparent coat layer 365 is then applied to cover the reflective portion 366 and the resin scattering layer 371, and is patterned in the same shape as the reflective portion 366, as depicted in FIG. 27(c). As a result, the light-transmissive coat layers 365 are obtained on the reflective portions 366.

A layer of first material is then formed covering the reflective portions 366 and the transmissive portions 368. In this embodiment, as depicted in FIG. 27(d), a thermosetting acrylic resin in which a black pigment is dispersed (resin black) is applied, up to a thickness of about 3 μm, as the first material over the light-transmissive coat layers 365 as well as over the substrate 372 that is exposed between the light-transmissive coat layers 365 (in other words, between the reflective portion 366). As a result, a resin black layer 357' is obtained. The resin black layer 357' in this case is an example of the "first material layer" of the present invention.

The second material layer is then formed by applying a resist on the first material layer. Specifically, a chemical amplification-type acrylic photosensitive resist in which a fluorinated polymer is blended is applied so as to cover the entire surface of the resin black layer 357' as depicted in FIG. 27(d). As a result, a resist layer 370' is obtained on the resin black layer 357'. The resist layer 370' herein is an example of the "second material layer" of the present invention.

Patterning is then performed on the resist layer 370' and the resin black layer 357'. Specifically, the resist layer 370' is irradiated with light hv via a photomask. The photomask has light-blocking portions in positions that correspond to pixel areas G. A plurality of portions of the resist layer 370' and the resin black layer 357' not irradiated with light hv, which are the portions corresponding to the plurality of pixel areas G, are then removed by etching using a prescribed etching fluid. A black matrix 357 and banks 370 that enclose the subsequently formed filter layer are thus obtained simultaneously on the substrate 372 as depicted in FIG. 27(e). In other words, the opening surfaces 357A opposite the reflective portion 366 and t the ransmissive portion 368 are obtained.

As described previously, the areas defined or enclosed by the black matrix 357, the banks 370, the light-transmissive coat layers 365, and the transmissive portions 368 are the deposit portions 550R, 550G, and 550B. The banks 370 are also light-transmissive. As described previously, the black matrix 317 is also an example of the "first layer" of the present invention; and the banks 330 are an example of the "second layer" of the present invention.

Areas (in other words, the deposit portions 550R, 550G, and 550B) compartmentalized by the black matrix 357 and the banks 370 are thus provided in the substrate 380A by forming the black matrix 357 and the banks 370 positioned on the black matrix 357 on the substrate 372.

Method of Manufacturing Color Filter Substrate 380

The substrate 380A on which the deposit portions 550R, 550G, and 550B are formed is transported to the stage 406 of the discharging device 400R by the transport device 470 (FIG. 13). The discharging device 400R then discharges the color filter material 505R from the head 414 so that a layer of color filter material 505R is formed in all of the deposit portions 550R as depicted in FIG. 28(a). The method whereby the discharging device 400R discharges the color filter material 505R is the same as the method of discharging the color filter material 305R in the previous embodiment described with reference to FIGS. 21, 22, and 23. When a layer of color filter material 505R is formed in all of the deposit portions 550R of the substrate 380A, the transport device 470 positions the substrate 380A in the drying device 450R. The filter layer 505FR is obtained on the deposit portion 550R by completely drying the color filter material 505R on the deposit portions 550R.

The transport device 470 then positions the substrate 380A on the stage 406 of the discharging device 400G. As depicted in FIG. 28(b), the discharging device 400G discharges the color filter material 505G from the head 414 so that a layer of color filter material 505G is formed in all of the deposit portions 550G. The method whereby the discharging device 400G discharges the color filter material 505G is the same as the method of discharging the color filter material 305R in the third embodiment described with reference to FIGS. 21, 22, and 23. When a layer of color filter material 505G is formed in all of the deposit portions 550G of the substrate 380A, the transport device 470 positions the substrate 380A in the drying device 450G. The filter layer 505FG is obtained on the deposit portion 550G by completely drying the color filter material 505G on the deposit portions 550G.

The transport device 470 then positions the substrate 380A on the stage 406 of the discharging device 400B. As depicted in FIG. 28(c), the discharging device 400B discharges the color filter material 505B from the head 414 so that a layer of color filter material 505B is formed in all of the deposit portions 550B. The method whereby the discharging device 400B discharges the color filter material 505B is the same as the method of discharging the color filter material 305R in the previous embodiment described with reference to FIGS. 21, 22, and 23. When a layer of color filter material 505B is formed in all of the deposit portions 550B of the substrate 380A, the transport device 470 positions the substrate 380A in the drying device 450B. The filter layer 505FB is obtained on the deposit portions 550B by completely drying the color filter material 505B on the deposit portions 550B.

The banks 370 in the present embodiment possess a liquid repellency against the liquid color filter materials 505R, 505G, and 505B. Furthermore, the liquid repellency of the black matrix 357 against the color filter materials 505R, 505G, and 505B is smaller than the liquid repellency of the banks 370 against the color filter materials 505R, 505G, and 505B. The black matrix 357 rather possesses lyophilic properties toward the liquid color filter materials 505R, 505G, and 505B. This is because a fluorinated polymer is blended into the banks 370, whereas the black matrix 357 does not contain a fluorinated polymer. Generally, the surface of a resin that contains fluorine demonstrates a higher liquid repellency against the above-mentioned liquid material than the surface of a resin that does not contain fluorine. On the other hand, most resins that do not contain fluorine are lyophilic toward the above-mentioned liquid material.

According to the present embodiment, the banks 370 have a relatively high liquid repellency. Therefore, droplets of color filter material that have just landed on the deposit portions 550R, 550G, and 550B flow out towards the black matrix 357, instead of flowing over the banks 370 and out of the deposit portions 550R, 550G, and 550B. Furthermore, since a layer having the desired liquid repellency and a lyophilic layer are formed, there is no need to perform a surface modification process for making the black matrix 357 and the banks 370 liquid repellent or lyophilic. For instance, there is no need for a plasma treatment that uses tetrafluoromethane as a treatment gas or an oxygen plasma treatment, for example.

Referring back to FIG. 13, the transport device 470 then positions the substrate 380A inside the oven 460. The oven 460 then reheats (post-bakes) the filter layers 505FR, 505FG, and 505FB.

The transport device 470 then positions the substrate 380A on the stage 406 of the discharging device 400C. The discharging device 400C discharges a liquid material so that the flattening layer 374 is formed covering the filter layers 505FR, 505FG, and 505FB and the banks 370. After the flattening layer 374 is formed covering the filter layers 505FR, 505FG, and 505FB and the banks 370, the transport device 470 positions the substrate 380A inside the drying device 450C. The drying device 450C completely dries the flattening layer 374, and then the curing device 465 heats and completely cures the flattening layer 374.

A plurality of electrodes 336 is then formed on the flattening layer 374, and an orientation film 338A is provided for covering the plurality of electrodes 336 and the flattening layer 374. In this manner, the substrate 380A becomes a color filter substrate 380 as depicted in FIG. 28(d).

The color filter substrate 380 and the separately fabricated opposing substrate 312 are then bonded to each other such that the orientation film 338A and the orientation film 338B face each other across an intervening spacer. Liquid crystal material is then filled into the space between the orientation films 338A and 338B. Polarizing plates 320A and 320B are then provided, and then a light source 316 is provided. In this manner, a liquid crystal display device 500 is obtained.

Fifth Embodiment

Figure 29:
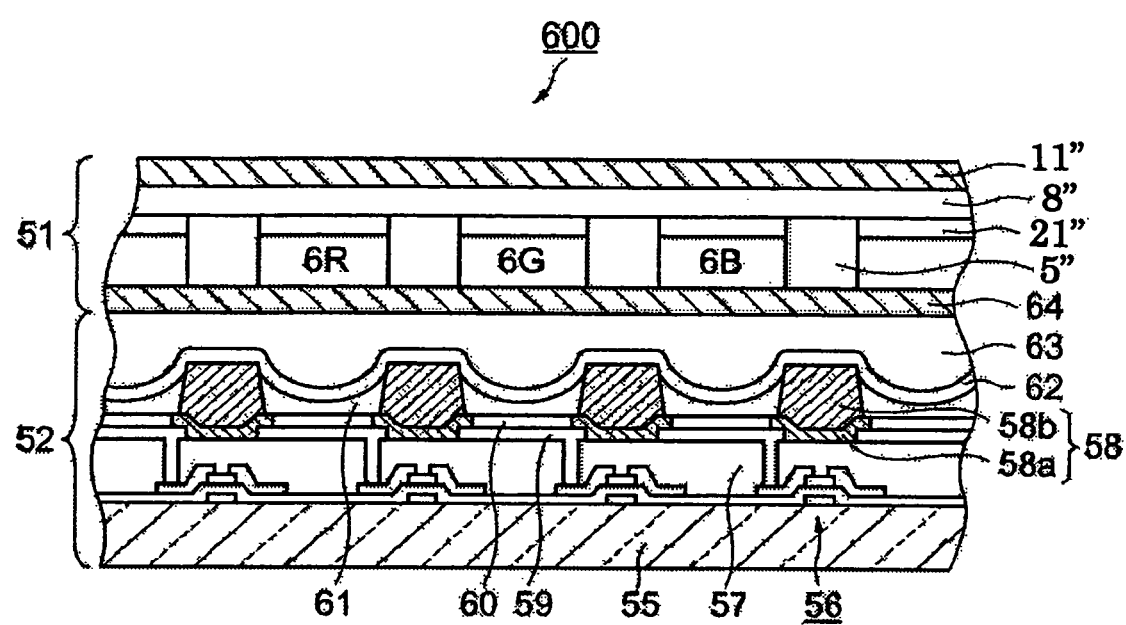
FIG. 29 is a cross-sectional view of the electro-optic device according to the fifth embodiment of the present invention.

Following is a description of an electro-optic device 600 having a display device in which a color filter provided with the light-transmissive colorless boundary layer 5 of the first and seconds embodiments s combined with an organic EL (electroluminescence) for emitting white light. As depicted in FIG. 29, this electro-optic device 600 is composed of a color filter unit 51 and an organic EL unit 52.

The color filter unit 51 includes a front substrate 11"; a shared substrate 64 disposed opposite the front substrate 11";

a colorless boundary layer 5" formed on the front substrate 11" side of the shared substrate 64; a colored boundary layer 21"; red, green, and blue coloring layers 6R", 6G", and 6B"; a colorless boundary layer 5"; a colored boundary layer 21"; and an overcoat layer 8" for covering the colored layers 6R", 6G", and 6B".

The organic EL unit 52 includes an EL substrate 55, a plurality of switching elements 56 formed on the EL substrate 55, an insulating film 57 formed on the switching elements 56, a plurality of EL pixel electrodes 59 formed on the insulating film 57, banks 58 each having an inorganic bank 58a and an organic bank 58b and formed between the plurality of EL pixel electrodes 59, a positive-hole transport layer 60 formed on the EL pixel electrodes 59, a white luminescent layer 61 formed on the positive-hole transport layer 60, and an EL counter electrode 62 provided so as to cover the luminescent layer 61 and the banks 58. Furthermore, the shared substrate 64 of the color filter unit 51, which is attached to the EL substrate 55 at its periphery, is arranged on the EL counter electrode 62. An inert gas 63 is inserted between the shared substrate 64 and the EL counter electrode 62, thus forming the electro-optic device 600.

The EL substrate 55, the shared substrate 64, and the front substrate 11" in the electro-optic device 600 thus configured are light-transmissive glass substrates, for example. The coloring layers 6R", 6G", and 6B" of the color filter unit 51 are arranged in a grid such as the one depicted in FIG. 2. The luminescent layer 61, the EL pixel electrodes 59, the positive-hole transport layer 60, the luminescent layer 61, and the EL counter electrode 62 of the organic EL unit 52 are each arranged opposite the coloring layers 6". The positive-hole transport layer 60 is positioned between the EL pixel electrodes 59 and the luminescent layer 61, and is designed to increase the efficiency of light emission by the luminescent layer 61. The EL pixel electrodes 59 and EL counter electrode 62 may, for example, be light-transmissive ITO electrodes. Each of the EL pixel electrodes 59 and the EL counter electrode 62 is electrically connected to the switching elements 56 to control the luminescence of the luminescent layer 61. The luminescent layer 61 emits white light. This white light is colored by either of the red, green, and the blue coloring layers 6" to be converted to colored light, and is emitted from the front substrate 11". Specifically, the organic EL unit 52 acts as a light source that corresponds to each of the coloring layers 6R", 6G", and 6B".

The positive-hole transport layer 60 and the luminescent layer 61, which are essential components of the organic EL unit 52, can be efficiently formed by the droplet-discharging device 100. First, the EL substrate 55, on which the switching elements 56, the insulating film 57, the EL pixel electrodes 59, and the banks 58 are formed, is mounted on the mounting platform 121 as the work 120. The X-axis direction and Y-axis direction of the mounting direction are determined so as to correspond with those of the coloring layers 6R", 6G", and 6B" as depicted in FIG. 2. Droplets of material for forming the positive-hole transport layer 60 are discharged from the nozzles 117 while the discharge heads 116 move in a relative fashion in the X-axis direction. Accordingly, droplets are deposited in the concave portions that are defined by the banks 58 and the EL pixel electrodes 59 and are lined up in the X-axis direction. The positive-hole transport layer 60 is completed by repeating this relative movement several times as necessary. The number of times this depositing operation must be performed is determined according to the arrangement of the nozzles 117 and the number of rows of the concave portions in the Y-axis direction. After the droplets of the positive-hole transport layer-forming material are dried, droplets of an EL luminescent material are discharged onto the positive-hole transport layer 60, and a luminescent layer 61 is formed in the same manner as the manner by which the positive-hole transport layer 60 was formed. After the process involving the droplet-discharging device 100 is completed, the luminescent layer 61 is dried, the EL counter electrode 62 is formed, and both components are bonded together so as to provide a match between the coloring layers 6" of the color filter unit 15 and the luminescent layer 61 of the organic EL unit 52. Lastly, an inert gas 63 is filled into the space between the EL counter electrode 62 and the shared substrate 64.

With this electro-optic device 600, the luminescent layer 61 of the organic EL unit 52 is arranged opposite the coloring layers 6R", 6G", and 6B" of the color filter unit 51. Only parts of the luminescent layer 61 that correspond to coloring layers 6" of the necessary color emit light. Therefore, it is possible to obtain an extremely low-power display device. Due to the colorless boundary layer 5 of the color filter unit 51, colorless bright light exits from the front substrate 11", and the overall display is brightened and made easier to see. Alternatively, the organic EL unit 52 may also include an electronic emission element FED (Field Emission Display) and a SED (Surface-Conduction Electron-Emitter Display).

Electronic Instrument

Examples of an electronic instrument provided with the liquid crystal display device of the first, second, third, and fourth embodiments will be described below.

Figure 30:
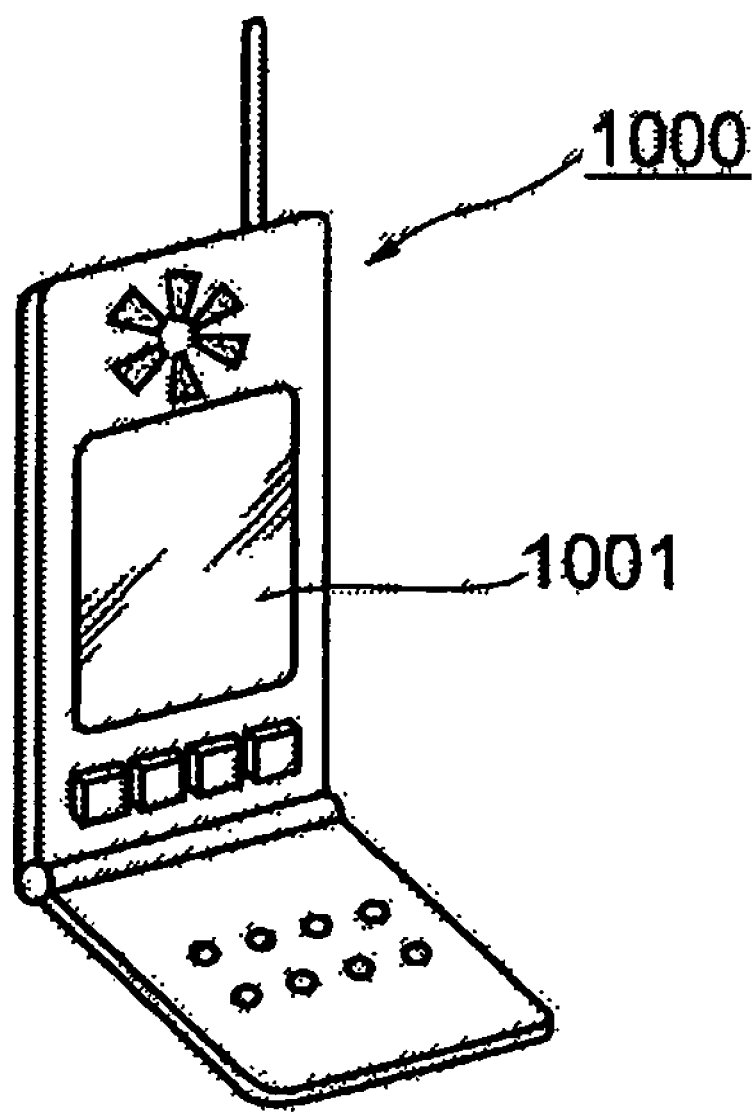
FIG. 30 is a schematic view of a mobile telephone, having a display device in accordance with one of the first through fourth embodiments of the present invention.

FIG. 30 is an oblique view of an example of a mobile telephone 1000. As depicted in FIG. 30, the mobile telephone 1000 is provided with a liquid crystal display unit 1001. Any of the semi light-transmissive reflecting liquid crystal display devices 1 and 30, the liquid crystal display devices 300 and 500 of the first through fourth embodiments described above can be used as the liquid crystal display unit 1001.

Figure 31:
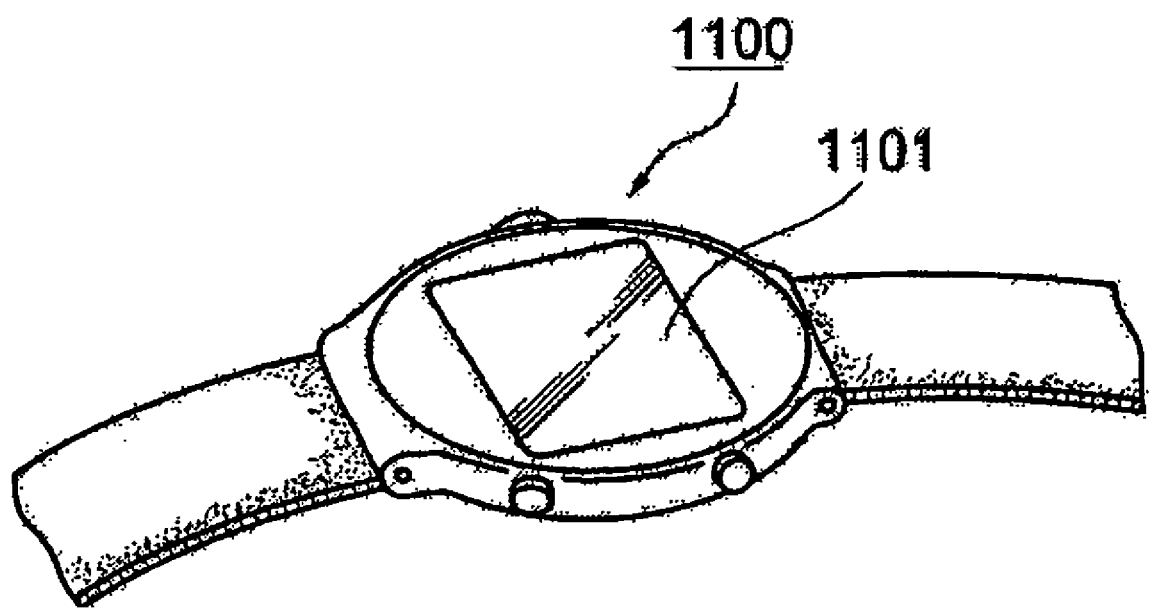
FIG. 31 is a schematic view of a wristwatch-type electronic instrument having a display device in accordance with the first through fourth embodiment of the present invention.

FIG. 31 is an oblique view of an example of a wristwatch-type electronic instrument 1100. In FIG. 31, the wristwatch-type electronic instrument 1100 is provided with a liquid crystal display unit 1101. Any of the semi light-transmissive reflecting liquid crystal display devices 1 and 30, the liquid crystal display devices 300 and 500 of the first through fourth embodiments described above can be used as the liquid crystal display unit 1101.

Figure 32:
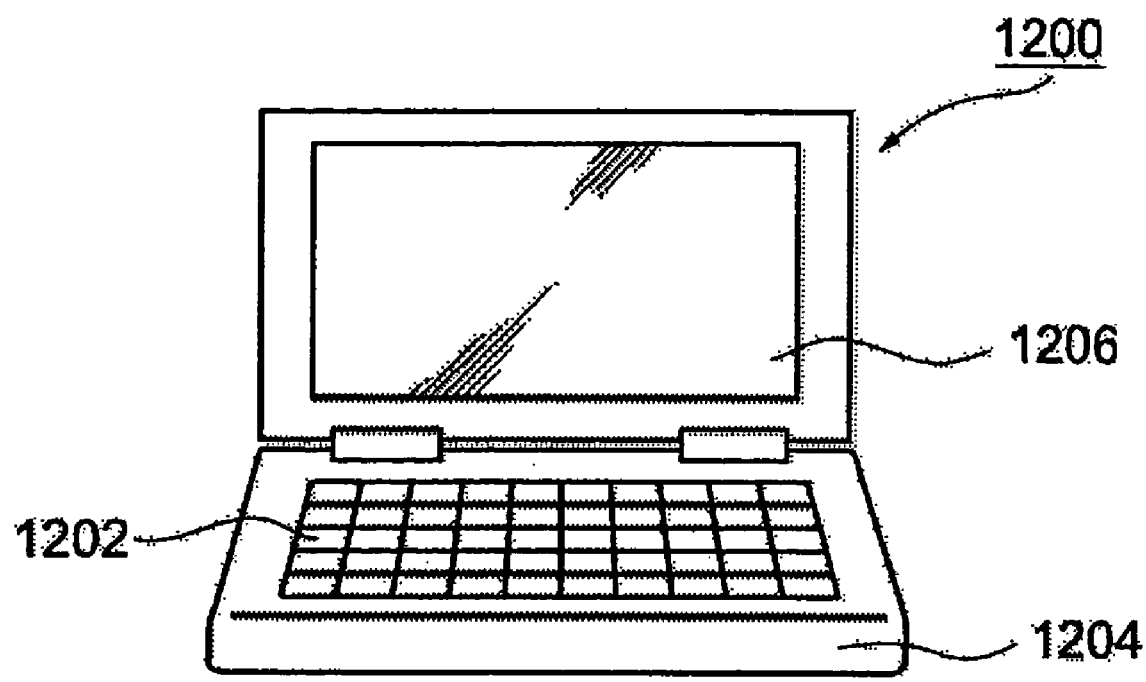
FIG. 32 is a schematic diagram depicting a mobile information processing device having a display device in accordance with one of the first through fourth embodiments of the present invention.

FIG. 32 is an oblique view of an example of a mobile information processing device 1200 such as a personal computer. In FIG. 32, the information processing device 1200 has a keyboard or other input unit 1202; an information processing device chassis 1204; and a liquid crystal display unit 1206. Any of the semi light-transmissive reflecting liquid crystal display devices 1 and 30, the liquid crystal display devices 300 and 500 of the first through fourth embodiments described above can be used as the liquid crystal display unit 1206.

The electronic instruments depicted in FIGS. 30 through 32 are provided with a liquid crystal display unit that uses the liquid crystal display device described in the above-mentioned embodiments. Accordingly, the electronic instrument is provided with a liquid crystal display unit that can display in a clear coloration both in the reflective mode the transmissive mode, and have excellent visibility.

The scope of the present invention is not limited by the embodiments described above, and such modifications as the followings are also possible.

Figure 33:
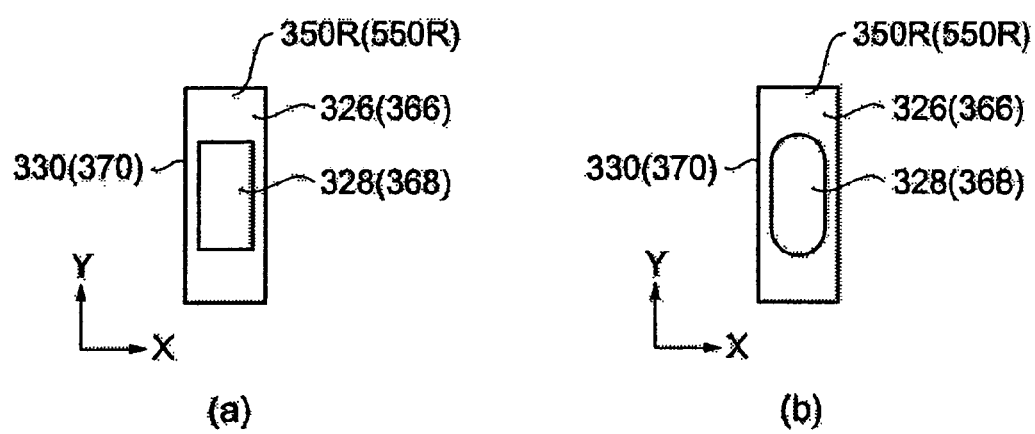
FIG. 33 is a schematic view of the shape of the transmissive portion.

(1) The shape of the transmissive portion 328 and the shape of the transmissive portion 368 were rectangular in the third and fourth embodiments, as replicated in FIG. 33(a). However, the shape of the transmissive portion 328 and the shape of the transmissive portion 368 are not limited to a rectangular shape, and may be round, ellipsoid, or an oval shape as depicted in FIG. 33(b). The transmissive portions 328 and 368 are concavities on the reflective portions 326 and 366. Therefore, as long as there are no sharp angles in the shapes of the transmissive portions 328 and 368, the fluid material flows and spreads so as to completely cover the insides of the transmissive portions 328 and 368. This is also the same for the shape of the openings 4 of the first and second embodiments.

(2) The color filters 40 and 45 and the color filter substrates 310 and 380 are applied in a liquid crystal display device in the first through fourth embodiments described above. However, the color filters 40 and 45 and the color filter substrates 310 and 380 of first through fourth embodiments may also be applied in an electronic instrument other than a liquid crystal display device. The term "electronic instrument" in the present specification refers to, but is not limited to, a plasma display device; a liquid crystal display device; an electroluminescent display device; an FED, SED, or other image display device provided with an electron emission element.

(3) The electro-optic device 600 of the fifth embodiment may be equipped in an electronic instrument, in the same way the color filter 40 or 45, or the color filter substrate 310 or 380 of the first through fourth embodiments is equipped in an electronic instrument.

The color filter, the display device, the liquid crystal display device, and the electro-optic device of the present invention as described above can be installed in various electronic instruments that have a display unit. Specific examples of such electronic instruments include mobile telephones, wristwatches, electronic dictionaries, mobile gaming devices, calculators, miniature televisions, personal computers, navigation devices, POS terminals, and the like.

With the color filter of the present invention, a difference in color saturation of colored light in the reflective display mode and the transmissive display mode can be eliminated by providing a light-transmissive coat layer between the reflecting layer and the boundary layer and changing the thickness of the coloring layer area according to the number of times the light passes through the coloring layers. Furthermore, a structure can be provided in which a liquid material can be appropriately coated on a stepped portion at the boundary between the reflective portion and the transmissive portion.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications No. 2003-278433, 2003-304566, 2004-165766. The entire disclosure of Japanese Patent Applications No. 2003-278433, 2003-304566, 2004-165766 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method of discharging a liquid material in a deposit portion, the discharging method comprising:
    providing a substrate on which the deposit portion is formed, the deposit portion having a reflective portion and a transmissive portion, the transmissive portion being concaved from the reflective portion;
    discharging the liquid material onto the transmissive portion; and
    discharging the liquid material onto the reflective portion after discharging the liquid material onto the transmissive portion so that at least a portion of the liquid material discharged onto the reflective portion covers at least a portion of the liquid material discharged onto the transmissive portion.

2. A method of manufacturing a color filter, comprising:
    providing a substrate on which a deposit portion is formed, the deposit portion having a reflective portion and a transmissive portion, the transmissive portion being concaved from the reflective portion;
    discharging a color filter material onto the transmissive portion; and
    discharging the color filter material onto the reflective portion after discharging the color filter material onto the transmissive portion so that at least a portion of the color filter material discharged onto the reflective portion covers at least a portion of the color filter material discharged onto the transmissive portion.

3. A method of manufacturing a liquid crystal display device, comprising:
    providing a substrate on which a deposit portion is formed, the deposit portion having a reflective portion and a transmissive portion, the transmissive portion being concaved from the reflective portion;
    discharging a color filter material onto the transmissive portion; and
    discharging the color filter material onto the reflective portion after discharging the color filter material onto the transmissive portion so that at least a portion of the color filter material discharged onto the reflective portion covers at least a portion of the color filter material discharged onto the transmissive portion.

4. A method of manufacturing an electronic instrument, comprising:
   providing a substrate on which a deposit portion is formed, the deposit portion having a reflective portion and a transmissive portion, the transmissive portion being concaved from the reflective portion;
   discharging a color filter material onto the transmissive portion; and
   discharging the color filter material onto the reflective portion after discharging the color filter material onto the transmissive portion so that at least a portion of the color filter material discharged onto the reflective portion covers at least a portion of the color filter material discharged onto the transmissive portion.

* * * * *